US011783437B2

(12) United States Patent
Hsieh et al.

(10) Patent No.: US 11,783,437 B2
(45) Date of Patent: Oct. 10, 2023

(54) LEAD MANAGEMENT SYSTEM AND METHODS THEREOF INCLUDING DIGITAL REAL-ESTATE REFERRALS

(71) Applicant: loanDepot.com, LLC, Foothill Ranch, CA (US)

(72) Inventors: Anthony Li Hsieh, Foothill Ranch, CA (US); Tsutomu Yebisu, Newport Beach, CA (US); John Hoon Lee, Frisco, TX (US); Saeed Ghasemzadeh, Mission Viejo, CA (US); Christian Min Kim, Irvine, CA (US)

(73) Assignee: loanDepot.com, LLC, Foothill Ranch (CA)

( * ) Notice: Subject to any disclaimer, the term of this patent is extended or adjusted under 35 U.S.C. 154(b) by 303 days.

(21) Appl. No.: 16/444,594

(22) Filed: Jun. 18, 2019

(65) Prior Publication Data
US 2019/0385252 A1    Dec. 19, 2019

Related U.S. Application Data

(60) Provisional application No. 62/853,634, filed on May 28, 2019, provisional application No. 62/687,005, filed on Jun. 19, 2018.

(51) Int. Cl.
*G06Q 50/16* (2012.01)
*G06Q 10/06* (2012.01)
*G06Q 10/0631* (2023.01)

(52) U.S. Cl.
CPC ..... *G06Q 50/16* (2013.01); *G06Q 10/063112* (2013.01)

(58) Field of Classification Search
None
See application file for complete search history.

(56) References Cited

U.S. PATENT DOCUMENTS

| 6,438,526 B1 * | 8/2002 | Dykes | G06Q 30/0601 |
| | | | 705/35 |
| 7,925,579 B1 * | 4/2011 | Flaxman | G06Q 40/02 |
| | | | 705/38 |

(Continued)

OTHER PUBLICATIONS

Sirignano, Justin, Apaar Sadhwani, and Kay Giesecke, "Deep learning for mortgage risk", 2018, arXiv, pp. 1-35 (Year: 2018).*

(Continued)

*Primary Examiner* — Sarah M Monfeldt
*Assistant Examiner* — Michael J. Monaghan
(74) *Attorney, Agent, or Firm* — Rutan & Tucker LLP; Ravi Mohan; Hani Z. Sayed

(57) ABSTRACT

Disclosed herein is a method of lead routing with a lead-management system including, in some embodiments, sending borrower information for a potential borrower from a database server of a lending platform to a database server of a brokering platform to supply buyer information for a potential buyer of real estate. The method also includes, in some embodiments, capturing real estate-buying criteria of the potential buyer. The method also includes, in some embodiments, matching the potential buyer with up to five licensed real-estate professionals associated with the brokering platform using at least in part some of the real estate-buying criteria. The method also includes, in some embodiments, notifying each real-estate professional of the up-to-five licensed real-estate professionals of the potential buyer by way of at least a text message sent by a web server of the brokering platform through an SMS gateway.

20 Claims, 52 Drawing Sheets

(56) References Cited

U.S. PATENT DOCUMENTS

| | | | |
|---|---|---|---|
| 10,025,842 B1* | 7/2018 | Charyk | G06F 21/604 |
| 10,037,558 B1* | 7/2018 | Thomas | G06Q 40/025 |
| 10,204,141 B1* | 2/2019 | Semprevivo | G06Q 30/02 |
| 10,255,610 B1* | 4/2019 | Semprevivo | G06Q 30/02 |
| 10,373,198 B1* | 8/2019 | Cook | G06Q 30/0609 |
| 10,453,093 B1* | 10/2019 | Leteux | G06Q 40/025 |
| 10,832,319 B1* | 11/2020 | Lister | G06Q 40/025 |
| 2006/0080229 A1* | 4/2006 | Masella | G06Q 40/025 705/38 |
| 2008/0071606 A1* | 3/2008 | Whiteley | G06Q 30/02 705/7.29 |
| 2008/0109444 A1* | 5/2008 | Williams | G06Q 30/02 |
| 2008/0208651 A1* | 8/2008 | Johnston | G06Q 10/06312 705/7.13 |
| 2010/0063890 A1* | 3/2010 | Huckleby | G06Q 30/02 705/26.1 |
| 2011/0282755 A1* | 11/2011 | Suba | G06Q 30/08 705/26.3 |
| 2012/0066176 A1* | 3/2012 | Martignoni | G06Q 50/18 707/E17.005 |
| 2013/0179328 A1* | 7/2013 | Hu | G06Q 10/06 705/38 |
| 2014/0046792 A1* | 2/2014 | Ganesan | G06Q 30/06 705/26.4 |
| 2014/0279330 A1* | 9/2014 | Triebwasser | G06Q 40/02 705/35 |
| 2015/0127524 A1* | 5/2015 | Jacobs | G06Q 40/025 705/38 |
| 2015/0134483 A1* | 5/2015 | Barenblatt | G06Q 30/0613 705/26.41 |
| 2016/0125364 A1* | 5/2016 | Field | H04L 29/12433 705/7.21 |
| 2016/0140168 A1* | 5/2016 | Rankin, Jr. | G06F 16/2425 707/769 |
| 2016/0277580 A1* | 9/2016 | Charlson | H04M 3/5166 |

OTHER PUBLICATIONS

Charlyne H. McWilliams, "Opening the black box: Automated underwriting technology comes in many different shapes and sizes. Here's a guide to some of the options out there." 2001, The Free Library, pp. 1-5 (Year: 2001).*

* cited by examiner

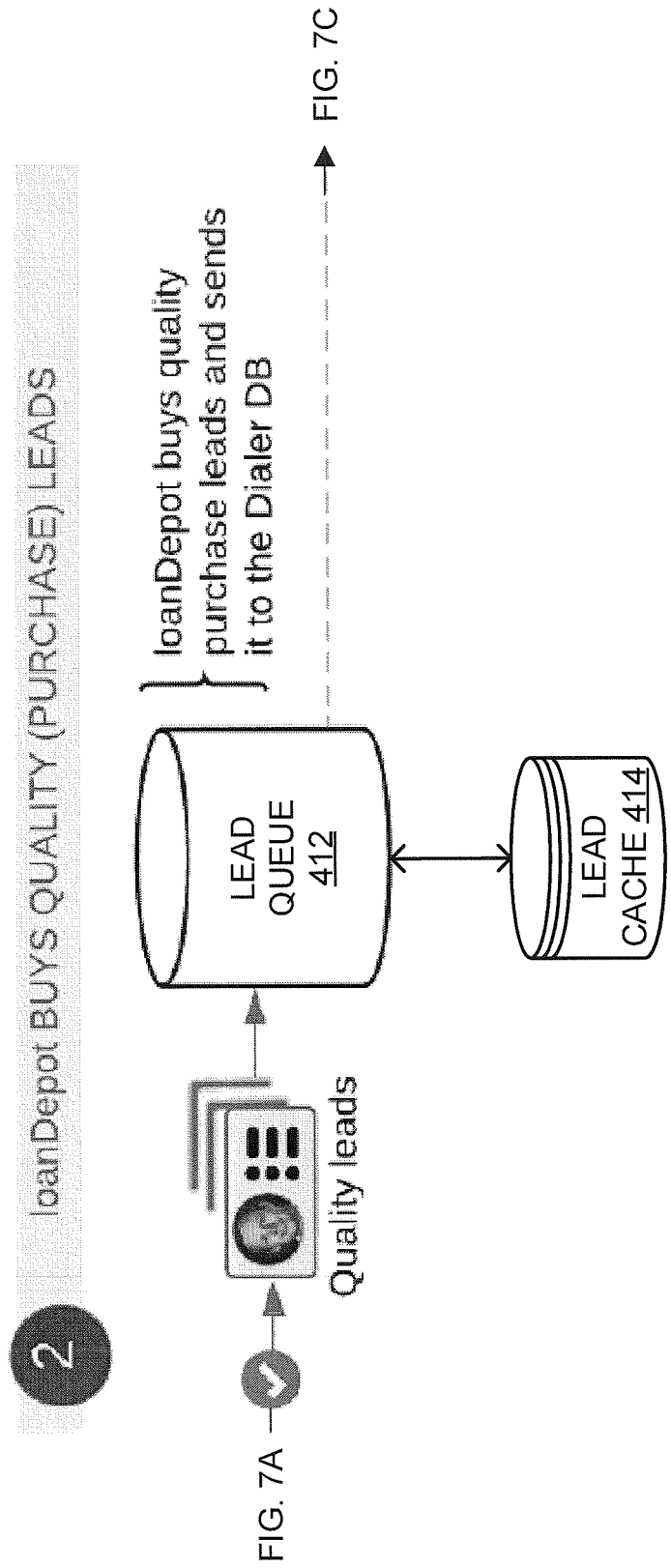

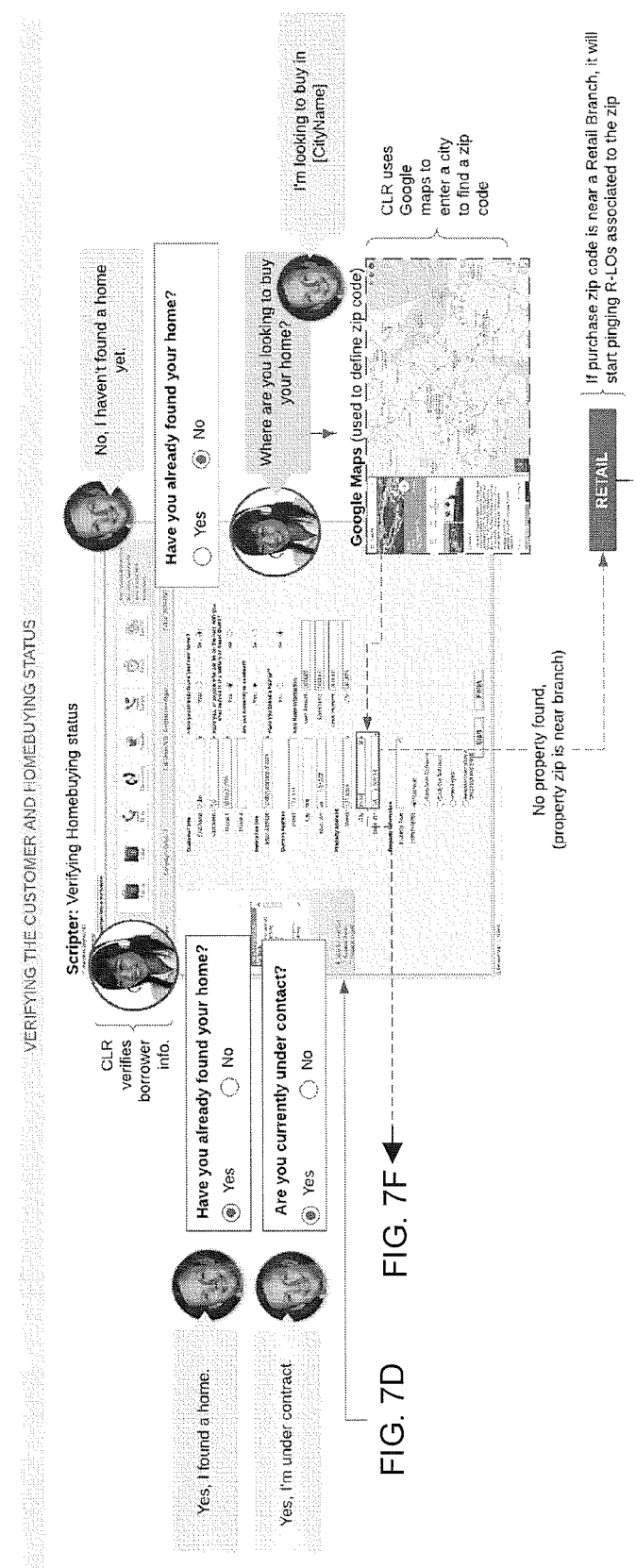

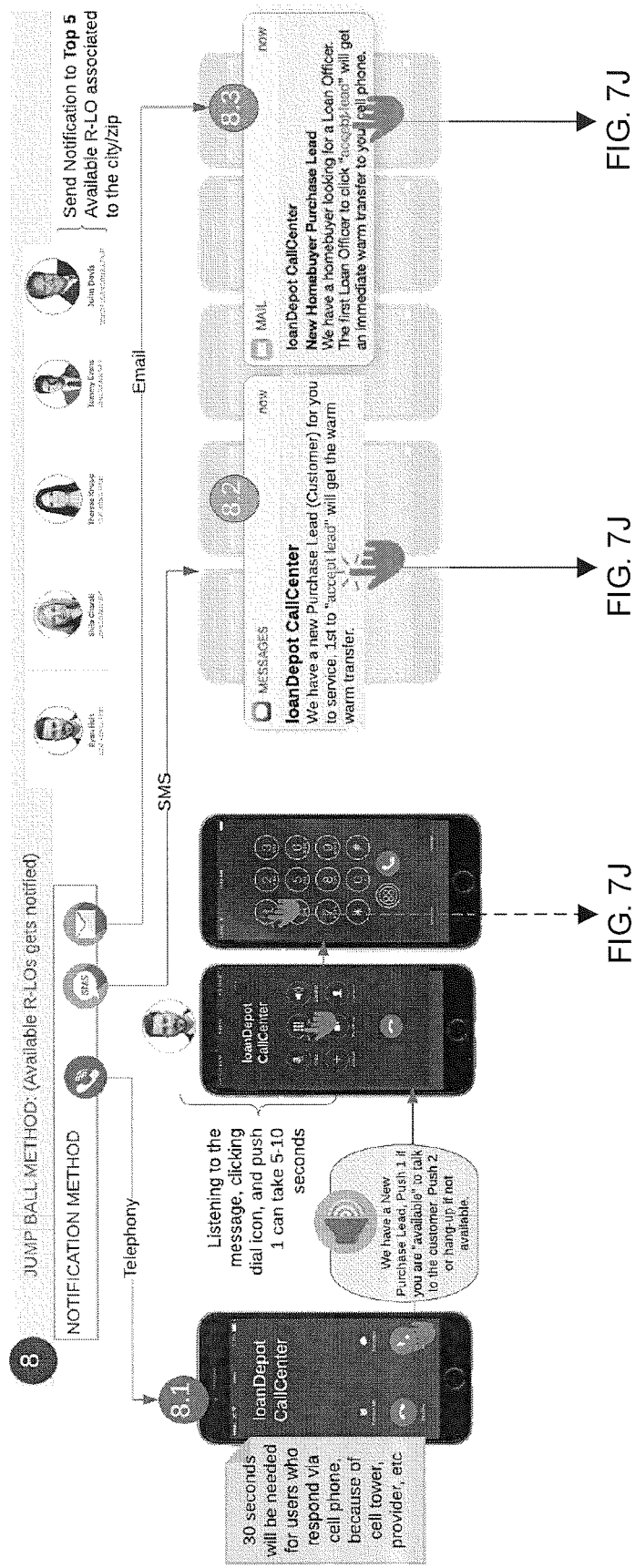

PRE-QUAL / PRE-APPROVAL PROCESS

FIG. 7M

POS: (D-LO will have POS in April)

D-LO generates PreQual

Within POS, LO can generate a Pre-Qual letter

Pre-qualification Letter

From POS, an email can be sent to the borrower

Marketing Cloud

470

Email Borrower: Pre-qual attachment

FIG. 7S

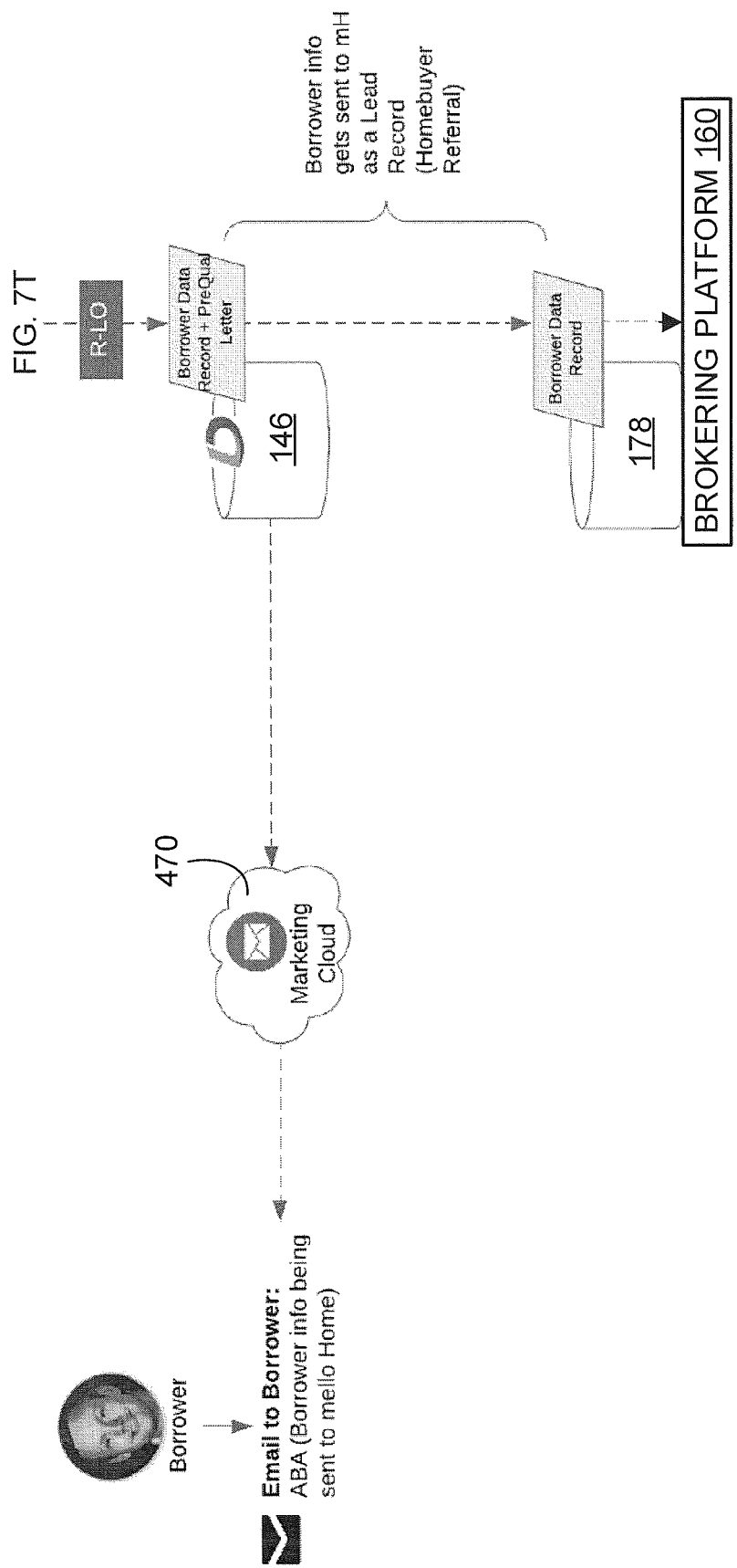

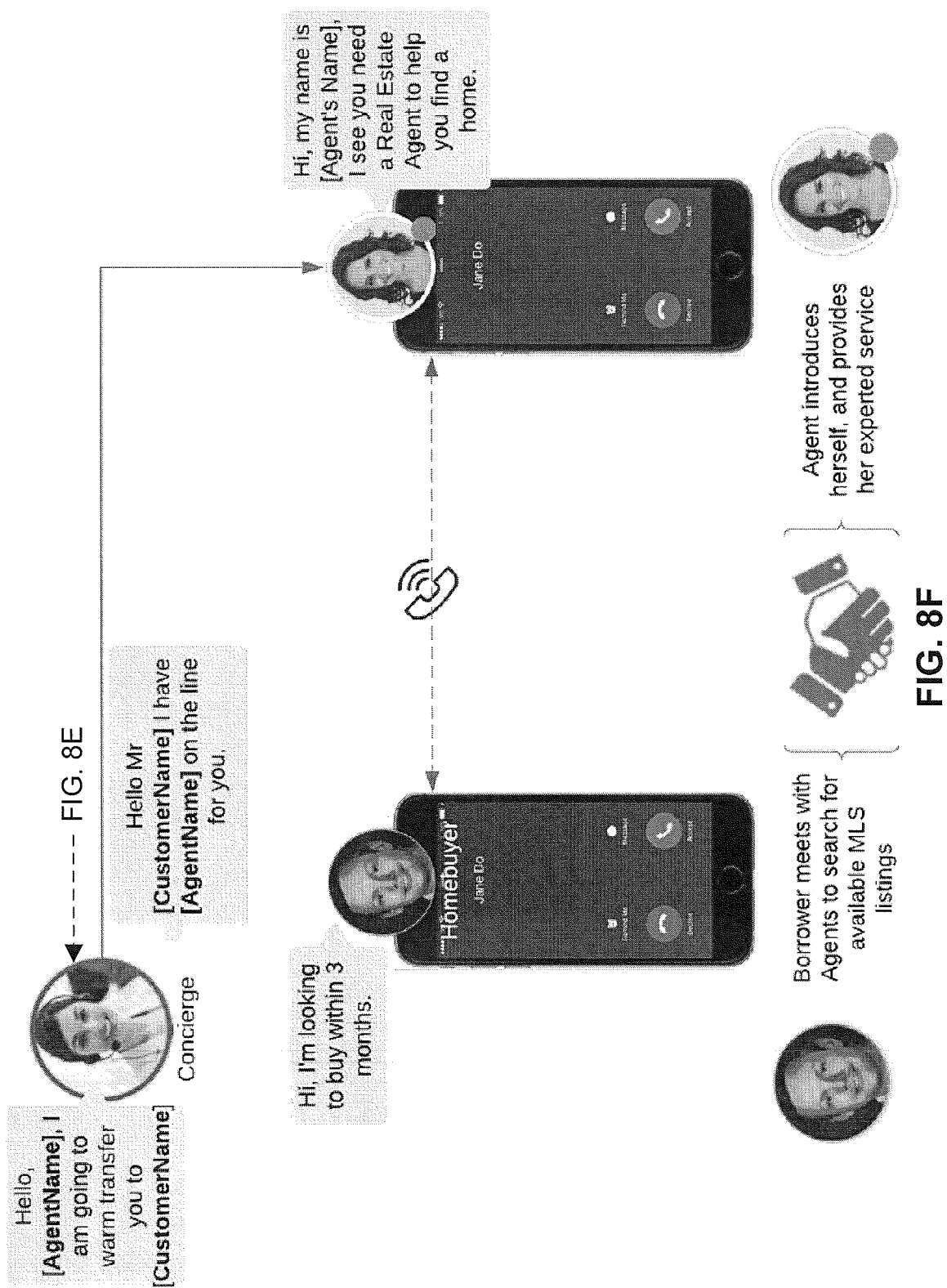

FIG. 8J
↑
|
|
|
mellohome

Concierge can see the status of the homeshopping transaction record

Concierge mellohome CRM (Homeshopping Transaction Record: Homebuyer + Agent + LO)

| mellohome CRM | Search Salesforce | | | | | | | | |
|---|---|---|---|---|---|---|---|---|---|
| Concierge | Home | Leads ∨ | Accounts ∨ | Contacts ∨ | Opportunities ∨ | People ∨ | Chatter ∨ | Tasks ∨ | Reports ∨ | Dashboards ∨ |

Opportunities/Transactions
Armstrong-Smith-20180530

+ Follow    New Note    New Case ▼

| Transaction Type | Homebuyer | Real Estate Agent | Loan Officer | Concierge | Last Status Update |
|---|---|---|---|---|---|
| Buying Only | Neil Armstrong | Rebecca Smith | Marc Bui | Ric Cheng | 05/30/2018 |

Actively Searching | Offer Submitted | Offer Accepted | Under Contract | Closed on a Home | ✓ Mark Status as Complete

DETAILS    RELATED    PERFORMANCE

ACTIVITY    CHATTER

∨ Homebuyer's Preferences

New Task    Log a Call    New Event    Email

| First Time Homebuyer | Transaction Type |
|---|---|
| Yes | Buying Only |

Create a task...    Add

| Cities of Interest | Buying Time Frame |
|---|---|
| Mission Viejo, Aliso Viejo, Irvine | Next 3 Months |

Filter Timeline ▼    Expand All

Next Steps

| PreQualified | Pre-Qual Amount |
|---|---|
| Yes | $800,0000 |

No next steps. To get things moving, add a task or set up a meeting.

Past Activity

| Occupancy Type | Price Range |
|---|---|
| Primary Residence | $600,000 – $700,000 |

No past activity. Past meetings and tasks marked as done show up here.

| Type of Home | Home Style |
|---|---|
| Single Family, Townhouse | Contemporary |

| # of Bedrooms | # of Baths |
|---|---|
| 3 or more | 2.5 or more |

| Preferred Sq Ft | Preferred Lot Size |
|---|---|
| 2000 or more | 4000 or more |

| Year Built | HOA |
|---|---|
| 1980 or older | |

| Amenities | Schools |
|---|---|
| | |

| Other Notes | Must Haves |
|---|---|
| Would like a yard for dogs and kids to play | 2 Car Garage |

∨ Offers Submitted on Properties

| PROPERTY ADDRESS ↓ | PROPERTY TYPE | LIST PRICE | OFFER AMT | OFFER ACCEPTED | LISTING AGENT | DATE VISITED |
|---|---|---|---|---|---|---|
| 1234 Main St, Irvine, CA 95302 | Single Family | $600,000 | $590,000 | No | Cole Simmons | 04/05/2018 |
| 2324 Aviation Rd, Irvine, CA 99339 | Condo | $400,000 | $390,000 | Pending | Calvin Hobbs | 05/01/2018 |

FIG. 8I

FIG. 8J ----▶ mello CRM (Loan Transaction Record: Homebuyer + LO + Agent)

FIG. 8K

Profile Section

FIG. 8L melloHome Agent App Experience

Stats

STATS

Referrals
Active: (3)
Closed: (5)
Cancelled: (2)
Total: (10)

Conversion Rate
50% Closed

Customer Reviews
★★★★★
4.5 Stars
Reviews: (5)

Client Section

CLIENTS (3)

Neil Armstrong (NEW)
Cities: Newport Beach, CA, Laguna Beach
Status: Actively Searching Report New Status
Last Status Update: Today, 4:35PM (PST)

Ron Swanson
Cities: Irvine, CA, Tustin, CA, Aliso Viejo, CA
Status: Offer Submitted Report New Status
Last Status Update: Yesterday, 2:45PM (PST)

Nicky Santoro
Cities: Irvine, CA, Mission Viejo, CA, Aliso Viejo, CA
Status: Under Contract Report New Status
Last Status Update: 04/15/2018, 2:15PM (PST)

{ Agent can quickly provide homeshopping status from the summary page. }

CONTACT | DETAILS | STATUS

Neil Armstrong
Email: neil.armstrong@gmail.com
Cell: 949-555-6161
Home Phone: 714-949-6868
Work Phone: 949-555-6448 ext. 123
Best Method of Contact: Cell
Best Time to Call: 8-9AM, 5-7PM (PST)
Current Address: 1234 Main St, Irvine, CA 92614

Mary Armstrong
Email: mary.armstrong@gmail.com
Cell: 949-555-6161
Home Phone: 714-949-6868
Work Phone: 949-555-6448 ext. 123

FIG. 8N

LEAD MANAGEMENT SYSTEM AND METHODS THEREOF INCLUDING DIGITAL REAL-ESTATE REFERRALS

PRIORITY

This application claims the benefit of priority to U.S. Provisional Patent Application No. 62/853,634, filed May 28, 2019, and U.S. Provisional Patent Application No. 62/687,005, filed Jun. 19, 2018, each of which is titled "LEAD MANAGEMENT SYSTEM AND METHODS THEREOF INCLUDING DIGITAL REAL-ESTATE REFERRALS," and each of which is incorporated by reference in its entirety into this application.

BACKGROUND

An important financial service provided by financial institutions is lending, which can include originating loans, servicing loans, or both originating and serving loans. There are many different types of loans available through such financial institutions. Broadly, the different types of loans are divided between secured loans and unsecured loans, wherein the secured loans are secured against borrowers' assets. Secured loans include, for example, mortgages, home equity loans, home equity lines of credit, or automotive loans. Unsecured loans include, for example, personal loans, personal lines of credit, student loans, or credit cards.

Lending, particularly originating loans such as mortgages, requires many fragmented, often manual processes of both borrowers and lenders. For a borrower, such processes include filling out a mortgage application and providing information in support of the mortgage application, the supporting information including, for example, employment, income, asset, and liability information. For a lender, such processes include processing the borrower's mortgage application and verifying the supporting information, underwriting a potential mortgage and performing a detailed risk assessment in view of the supporting information, and, ultimately, funding the mortgage. Such fragmented processes obviate any financial benefit from economies of scale that could otherwise be passed onto borrowers and lenders alike if such processes were more tightly integrated—particularly with respect to timely connecting borrowers with appropriate lending and brokering personnel such as licensed real-estate professionals. Accordingly, there is a need for a tightly integrated lending-and-brokering environment configured for at least timely connecting borrowers with appropriate lending personnel and brokering personnel.

Disclosed herein is a method of lead routing with a lead-management system of an integrated lending-and-brokering environment.

SUMMARY

Disclosed herein is a method of lead routing with a lead-management system including, in some embodiments, sending borrower information for a potential borrower from a database server of a lending platform to a database server of a brokering platform to supply the brokering platform and brokering personnel associated with the brokering platform buyer information for a potential buyer of real estate. The potential borrower and the potential buyer include the same entity. The method also includes, in some embodiments, capturing real estate-buying criteria of the potential buyer including at least a geographical area in which the potential buyer is seeking real estate. The method also includes, in some embodiments, matching the potential buyer with up to five licensed real-estate professionals associated with the brokering platform using at least in part some of the real estate-buying criteria. The method also includes, in some embodiments, notifying each real-estate professional of the up-to-five licensed real-estate professionals of the potential buyer by way of at least a Short Message Service ("SMS")-text message sent by a web server of the brokering platform through an SMS gateway.

In some embodiments, capturing the real estate-buying criteria is effected by asking scripted questions in a telephone call with the potential buyer. Alternatively, capturing the real estate-buying criteria is effected by collecting the real estate-buying criteria from a digitally finable form to which the potential buyer has been given access. The real estate-buying criteria of the potential buyer also includes a real estate-buying time frame, a target purchase price or price range, a type of real estate, a preferred lot size, a type of home, a home style, a preferred square footage, a number of bedrooms, a number of bathrooms, or a combination thereof.

In some embodiments, matching the potential buyer with the up-to-five licensed real-estate professionals is effected at least in part by matching at least the geographical area in which the potential buyer is seeking real estate with that of the up-to-five licensed real-estate professionals.

In some embodiments, sending the borrower information from the database server of the lending platform to the database server of the brokering platform to supply the lending platform the buyer information includes pushing the borrower information from a customer relationship-management ("CRM") database of the lending platform to a CRM database of the brokering platform. Sending the borrower information from the database server occurs at a time of the potential borrower providing consent for referring the potential borrower to one or more persons of the brokering personnel associated with the brokering platform. In addition, the consent includes consent for sending the borrower information to the brokering platform.

In some embodiments, the method also includes generating a transaction record in the CRM database of the brokering platform for the potential buyer at a time a first-responding real-estate professional responds to the SMS-text message. The method also includes, in some embodiments, assigning to the potential buyer an assigned real-estate professional corresponding to the first-responding real-estate professional at the time the first-responding real-estate professional responds to the SMS-text message.

In some embodiments, the method also includes setting permissions in the CRM database of the brokering platform for the transaction record, thereby allowing the assigned real-estate professional to view the buyer information for the potential buyer.

In some embodiments, the method also includes sending the potential buyer an e-mail by way of an e-mail server at a time of generating the transaction record in the CRM database, thereby notifying the potential buyer of the assigned real-estate professional.

In some embodiments, sending the potential buyer the e-mail includes copying e-mail recipients including the assigned real-estate agent and a loan officer associated with the potential borrower.

In some embodiments, the method also includes initiating a warm transfer of the potential buyer from a concierge of the brokering personnel to the assigned real-estate professional. The concierge initiates the warm transfer of the potential buyer to the assigned real-estate professional after the concierge notifies each real-estate professional of the up-to-five licensed real-estate professionals of the potential buyer.

In some embodiments, the method also includes updating the transaction record in the CRM database of the brokering platform for the potential buyer with any updates to real estate-buying status for the potential buyer. The method also includes, in some embodiments, pushing any of the updates to the real-estate-buying status for the potential buyer to the CRM database of the lending platform for access by one or more persons of lending personnel associated with the lending platform.

Also disclosed herein is a method of lead routing with a lead-management system including, in some embodiments, pushing borrower information for a potential borrower from a CRM database of the lending platform by a database server of a lending platform to a CRM database of the brokering platform through a database server of a brokering platform to supply the brokering platform and brokering personnel associated with the brokering platform buyer information for a potential buyer of real estate. The potential borrower and the potential buyer include the same entity. The method also includes, in some embodiments, assigning the potential buyer to an assigned real-estate professional selected from up to five licensed real-estate professionals associated with the brokering platform using at least in part some real estate-buying criteria of the potential buyer. The method also includes, in some embodiments, generating a transaction record in the CRM database of the brokering platform for the potential buyer at a time of matching the potential buyer with the assigned real-estate professional. The method also includes, in some embodiments, updating the transaction record in the CRM database of the brokering platform for the potential buyer with any updates to real estate-buying status for the potential buyer. The method also includes, in some embodiments, pushing any of the updates to the real-estate-buying status for the potential buyer to the CRM database of the lending platform for access by one or more persons of lending personnel associated with the lending platform.

In some embodiments, assigning the potential buyer to the assigned real-estate professional includes notifying each real-estate professional of the up-to-five licensed real-estate professionals of the potential buyer by way of at least an SMS-text message sent by a web server of the brokering platform through an SMS gateway. Additionally, assigning the potential buyer to the assigned real-estate professional includes assigning to the potential buyer a first-responding real-estate professional as the assigned real-estate professional at a time the first-responding real-estate professional responds to the SMS-text message.

In some embodiments, the transaction record in the CRM database of the brokering platform is generated for the potential buyer at the time the first-responding real-estate professional responds to the SMS-text message.

In some embodiments, the method also includes setting permissions in the CRM database of the brokering platform for the transaction record at a time of assigning the potential buyer to the assigned real-estate professional, thereby allowing the assigned real-estate professional to view the buyer information for the potential buyer.

In some embodiments, the method also includes sending the potential buyer an e-mail by way of an e-mail server at a time of generating the transaction record in the CRM database, thereby notifying the potential buyer of the assigned real-estate professional.

In some embodiments, sending the potential buyer the e-mail includes copying e-mail recipients including the assigned real-estate agent and a loan officer associated with the potential borrower.

In some embodiments, the method also includes capturing the real estate-buying criteria of the potential buyer, the real estate-buying criteria including a geographical area in which the potential buyer is seeking real estate, a real estate-buying time frame, a target purchase price or price range, a type of real estate, a preferred lot size, a type of home, a home style, a preferred square footage, a number of bedrooms, a number of bathrooms, or a combination thereof. Matching the potential buyer with the up-to-five licensed real-estate professionals is effected at least in part by matching at least the geographical area in which the potential buyer is seeking real estate with that of the up-to-five licensed real-estate professionals In some embodiments, the real estate-buying criteria of the potential buyer is captured by asking scripted questions in a telephone call with the potential buyer. Alternatively, the real estate-buying criteria of the potential buyer is captured by collecting the real estate-buying criteria from a digitally fillable form to which the potential buyer has been given access, or a combination thereof.

In some embodiments, pushing the borrower information from the lending platform to the brokering platform occurs at a time of the potential borrower providing consent for referring the potential borrower to one or more persons of the brokering personnel associated with the brokering platform. In addition, the consent includes consent for sending the borrower information to the brokering platform.

In some embodiments, the method also includes initiating a wan transfer of the potential buyer from a concierge of the brokering personnel to the assigned real-estate professional. The concierge initiates the warm transfer of the potential buyer to the assigned real-estate professional after the concierge notifies each real-estate professional of the up-to-five licensed real-estate professionals of the potential buyer.

These and other features of the concepts provided herein will become more apparent to those of skill in the art in view of the accompanying drawings and following description, which disclose particular embodiments of such concepts in greater detail.

DRAWINGS

FIG. 7B illustrates a lead queue queueing incoming sales leads in accordance with some embodiments.

FIG. 7I illustrates notifying available RLOs of a potential borrower that is ready for retail sales in accordance with some embodiments.

FIG. 7S illustrates a transaction record in a CRM database in a first state in accordance with some embodiments.

FIG. 8N a number of screens of a graphical user interface configured for use by real estate professionals in accordance with some embodiments.

Figure 8A:
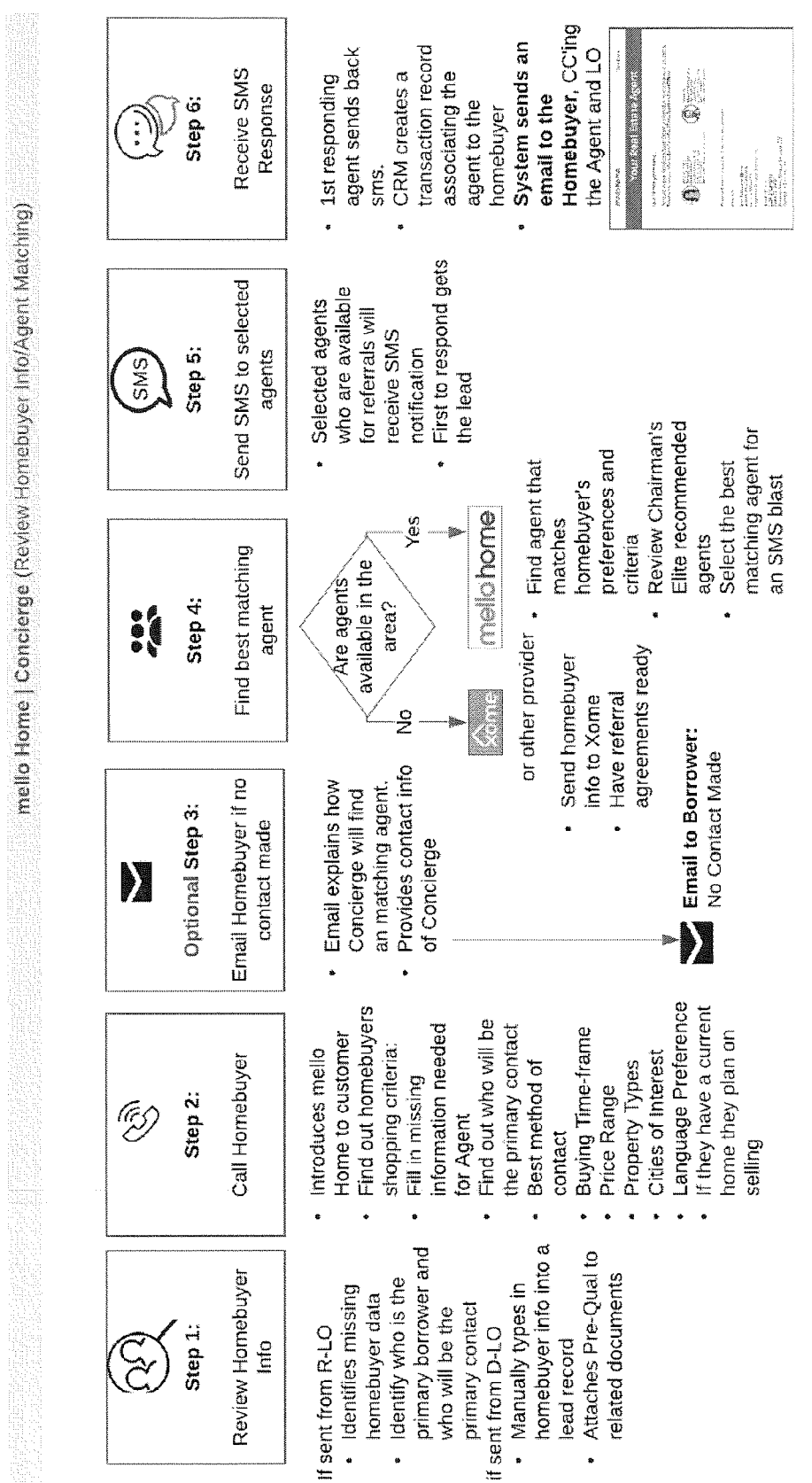
FIG. 8A illustrates a method of lead routing with a lead-management system in accordance with some embodiments.
Figure 8B:
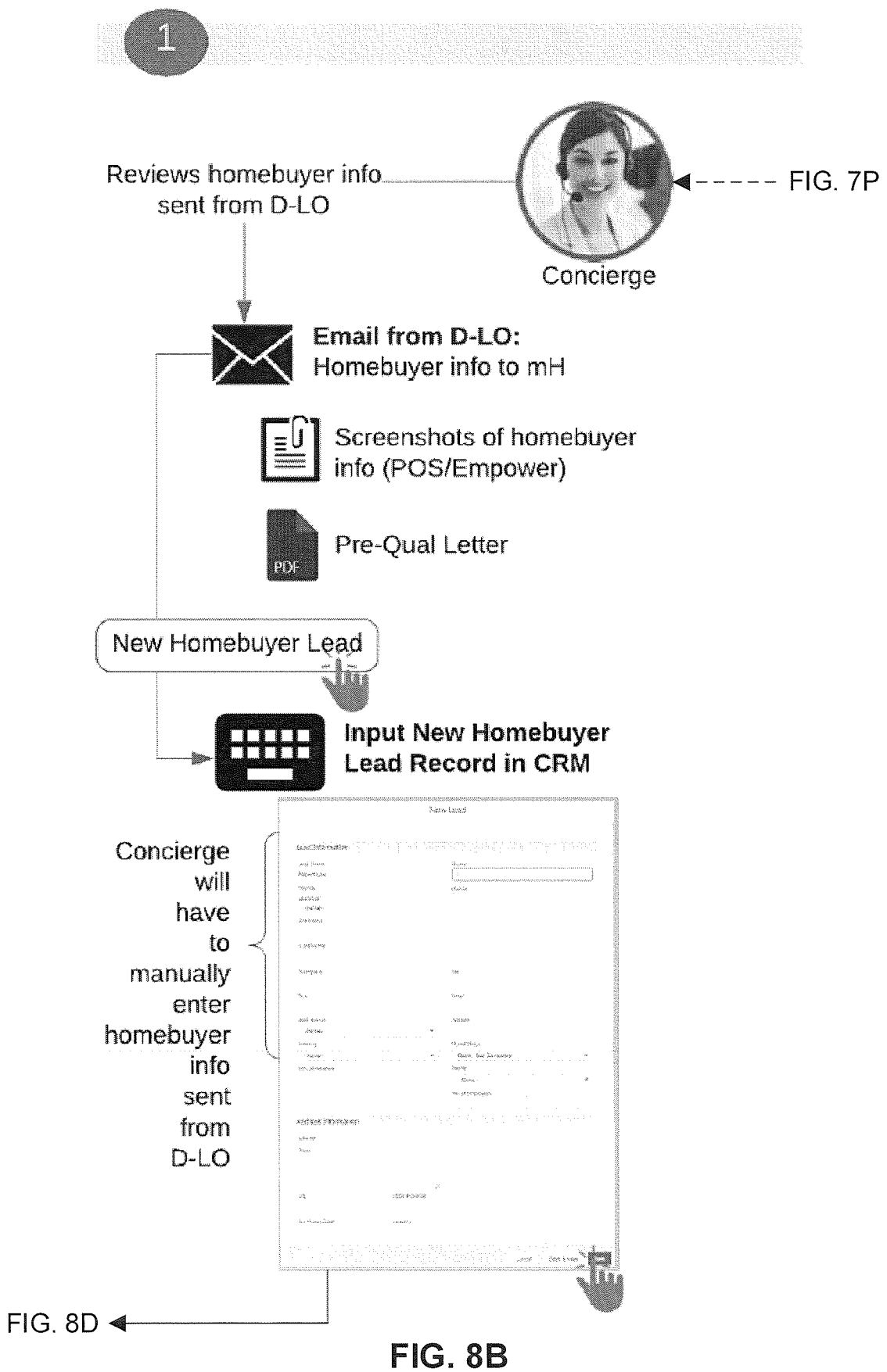
FIG. 8B illustrates receiving borrower information for a potential borrower from a lending platform by a brokering platform for buyer information for a potential buyer in accordance with some embodiments.
Figure 8C:
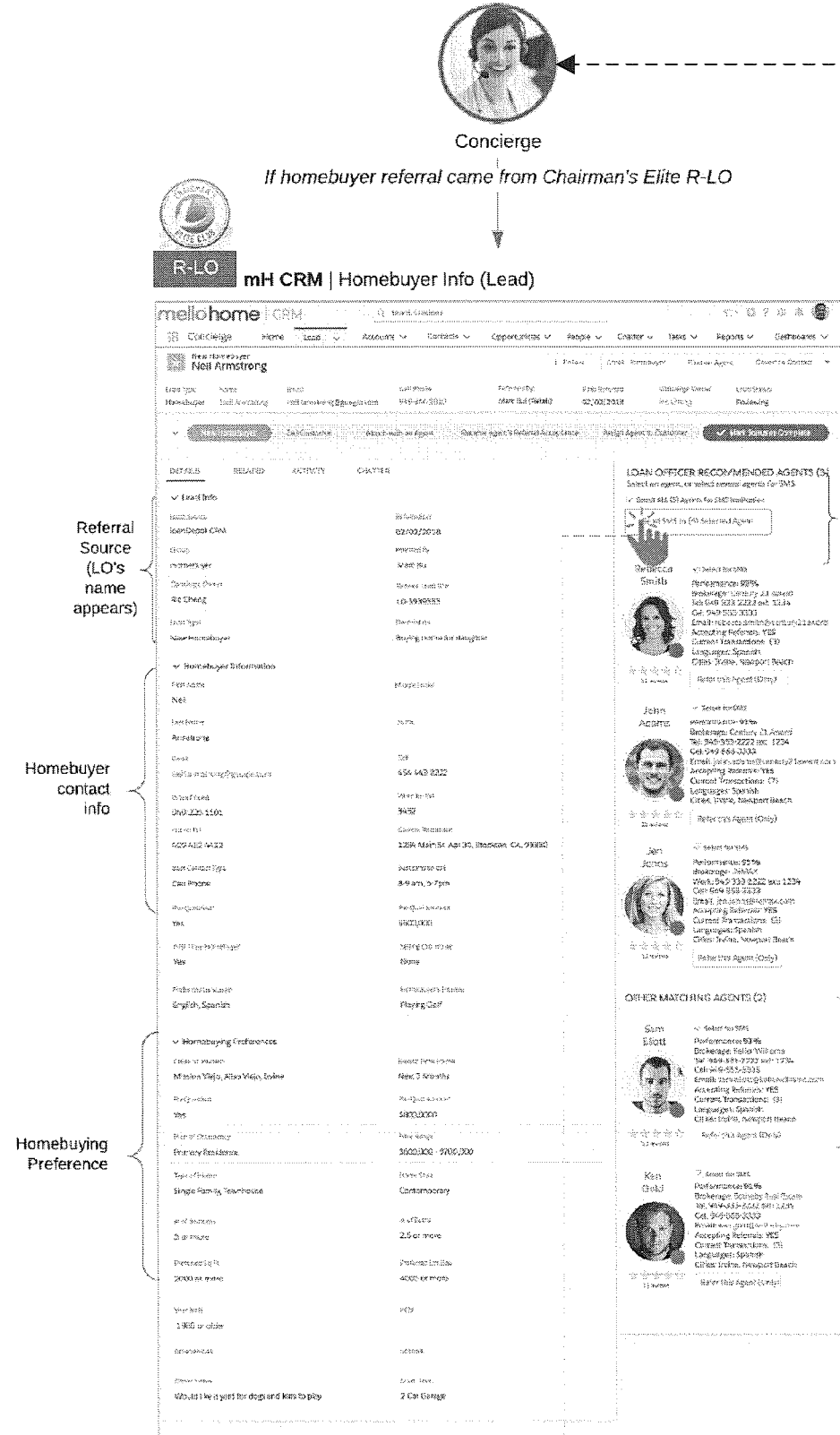
FIG. 8C illustrates receiving borrower information for a potential borrower from a lending platform by a brokering platform for buyer information for a potential buyer in accordance with some embodiments.
Figure 8D:
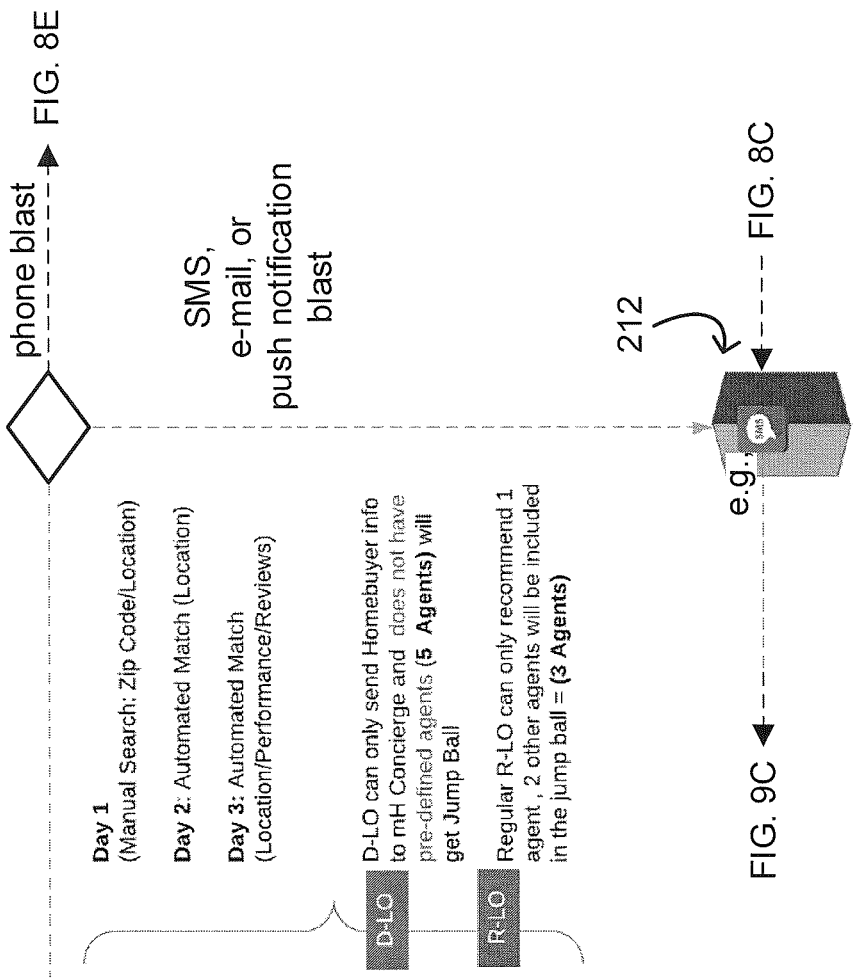
FIG. 8D illustrates buyer information in a graphical user interface configured to display the buyer information in accordance with some embodiments.
Figure 8E:
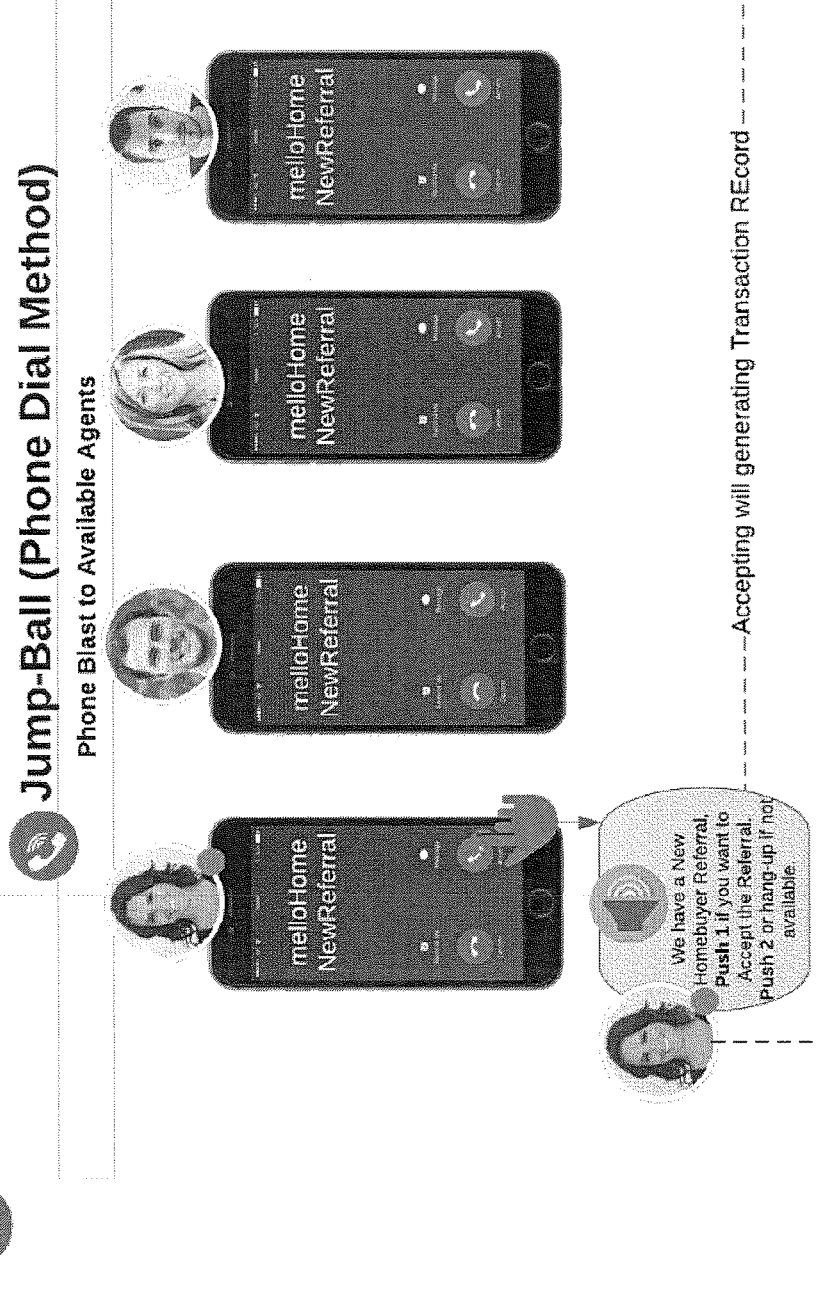
FIG. 8E illustrates notifying licensed real-estate professionals of the potential buyer in accordance with some embodiments.
Figure 8G:
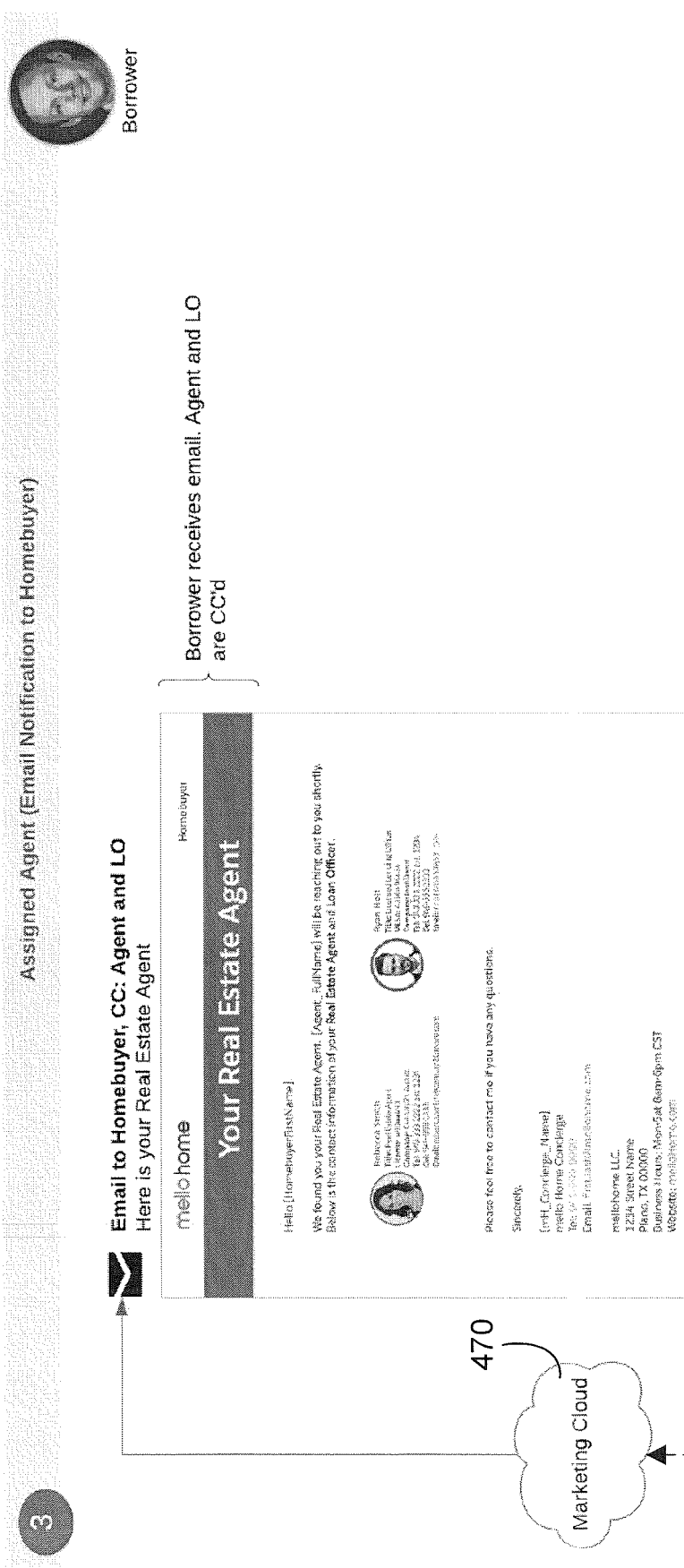
FIG. 8G illustrates sending an e-mail to a potential buyer notifying the potential buyer of his or her assigned real-estate professional in accordance with some embodiments.
Figure 8H:
FIG. 8H illustrates buyer information in a number of screens of a mobile graphical user interface configured to display the buyer information in accordance with some embodiments.
Figure 8J:
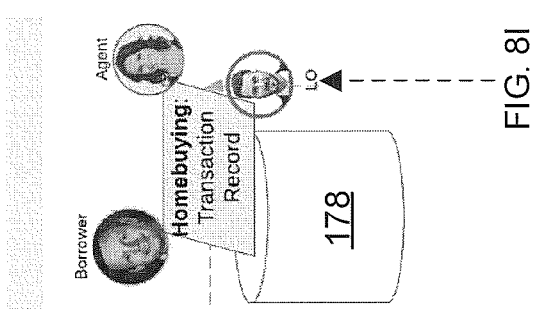
FIG. 8J illustrates pushing updates to real-estate-buying status for a potential buyer to a lending platform in accordance with some embodiments.
Figure 8J:
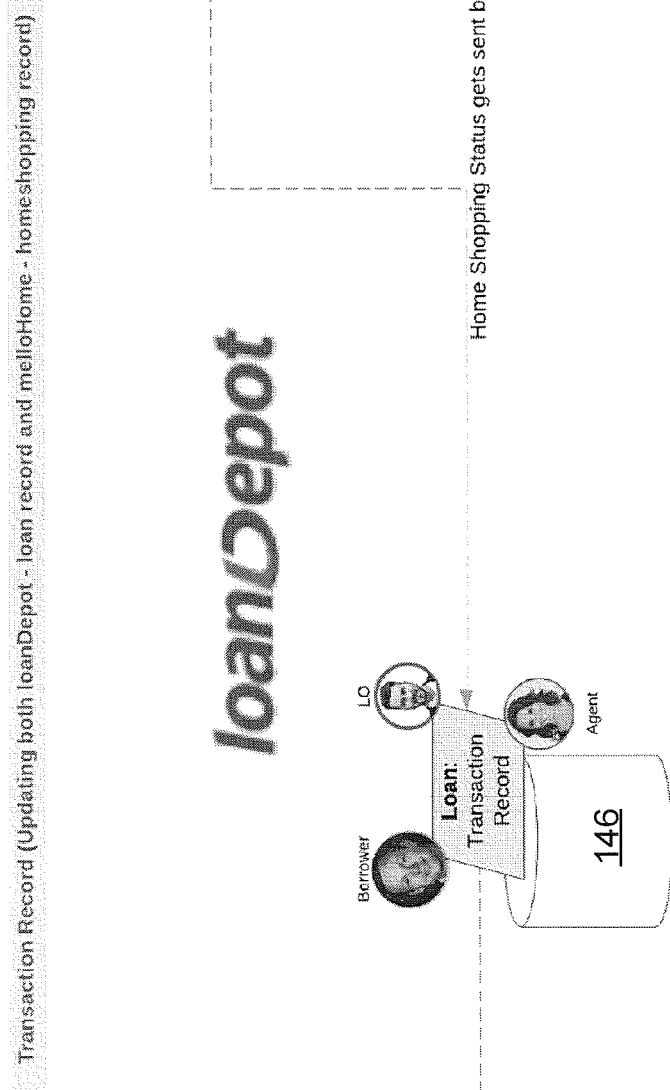
Figure 8L:
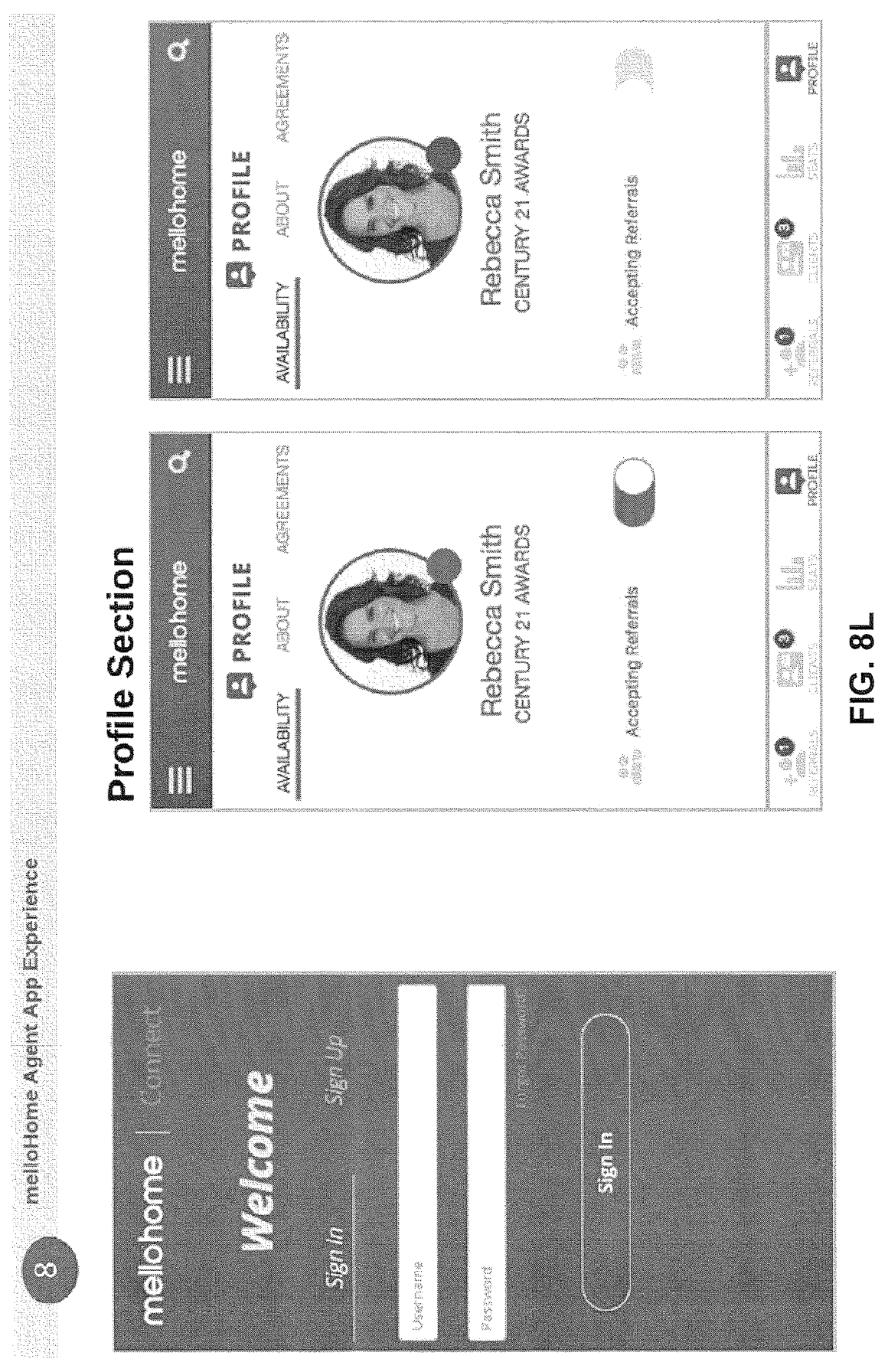
Figure 8M:
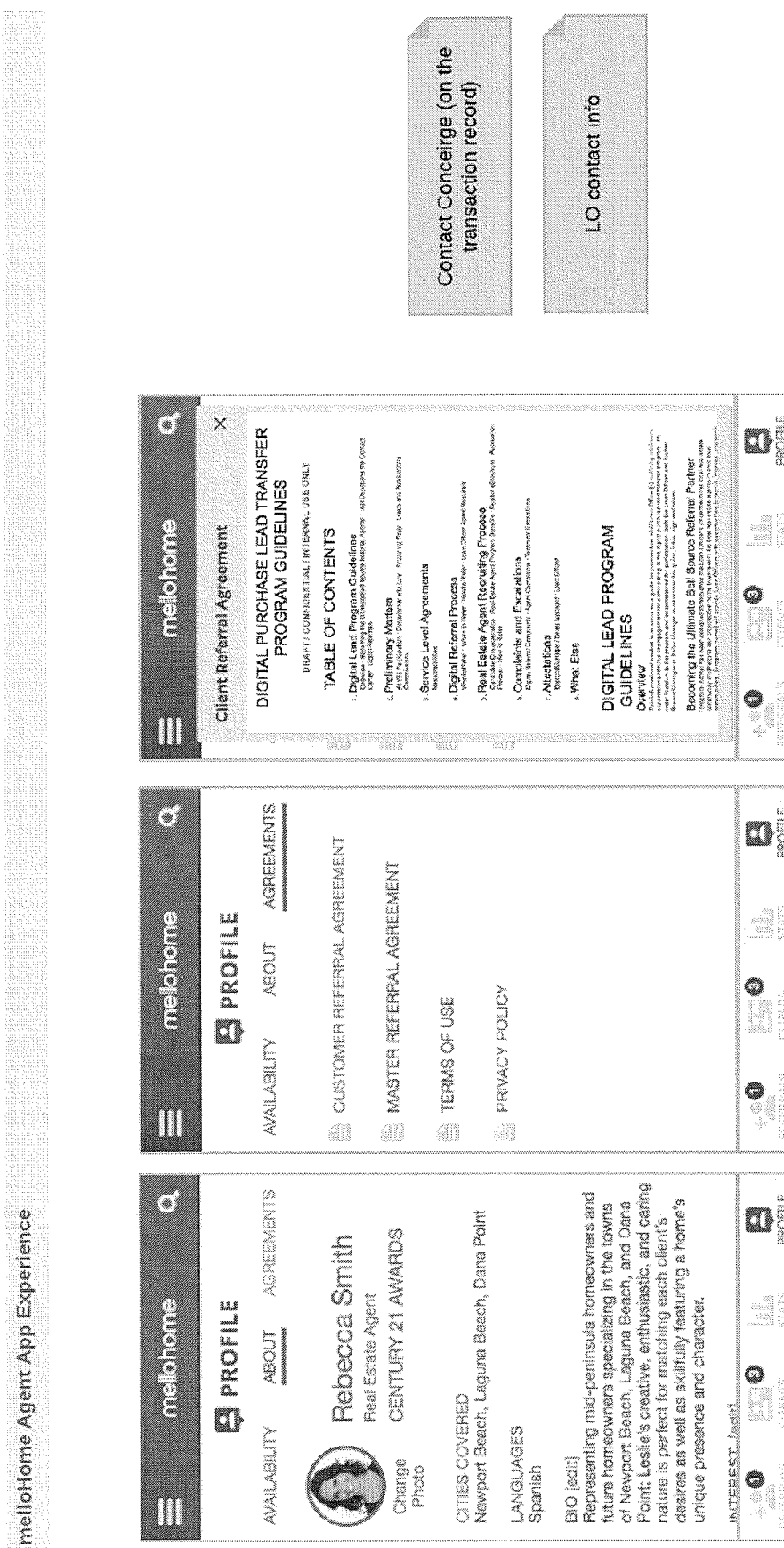
FIG. 8M illustrates a number of screens of a graphical user interface configured for use by real estate professionals in accordance with some embodiments.
Figure 8O:
FIG. 8F illustrates initiating a warm transfer of a potential buyer from a concierge to an assigned real-estate professional in accordance with some embodiments.
FIG. 8I illustrates buyer information in a graphical user interface configured to display the buyer information and any updates to real estate-buying status in accordance with some embodiments.
FIG. 8K illustrates borrower information in a graphical user interface configured to display the borrower information and any updates to real estate-buying status in accordance with some embodiments.
FIG. 8L illustrates a number of screens of a graphical user interface configured for use by real estate professionals in accordance with some embodiments.

FIG. 8O a number of screens of a graphical user interface configured for use by real estate professionals in accordance with some embodiments.

Figure 8P:

FIG. 8P a screen of a graphical user interface configured for use by a potential buyer in accordance with some embodiments.

Figure 9A:
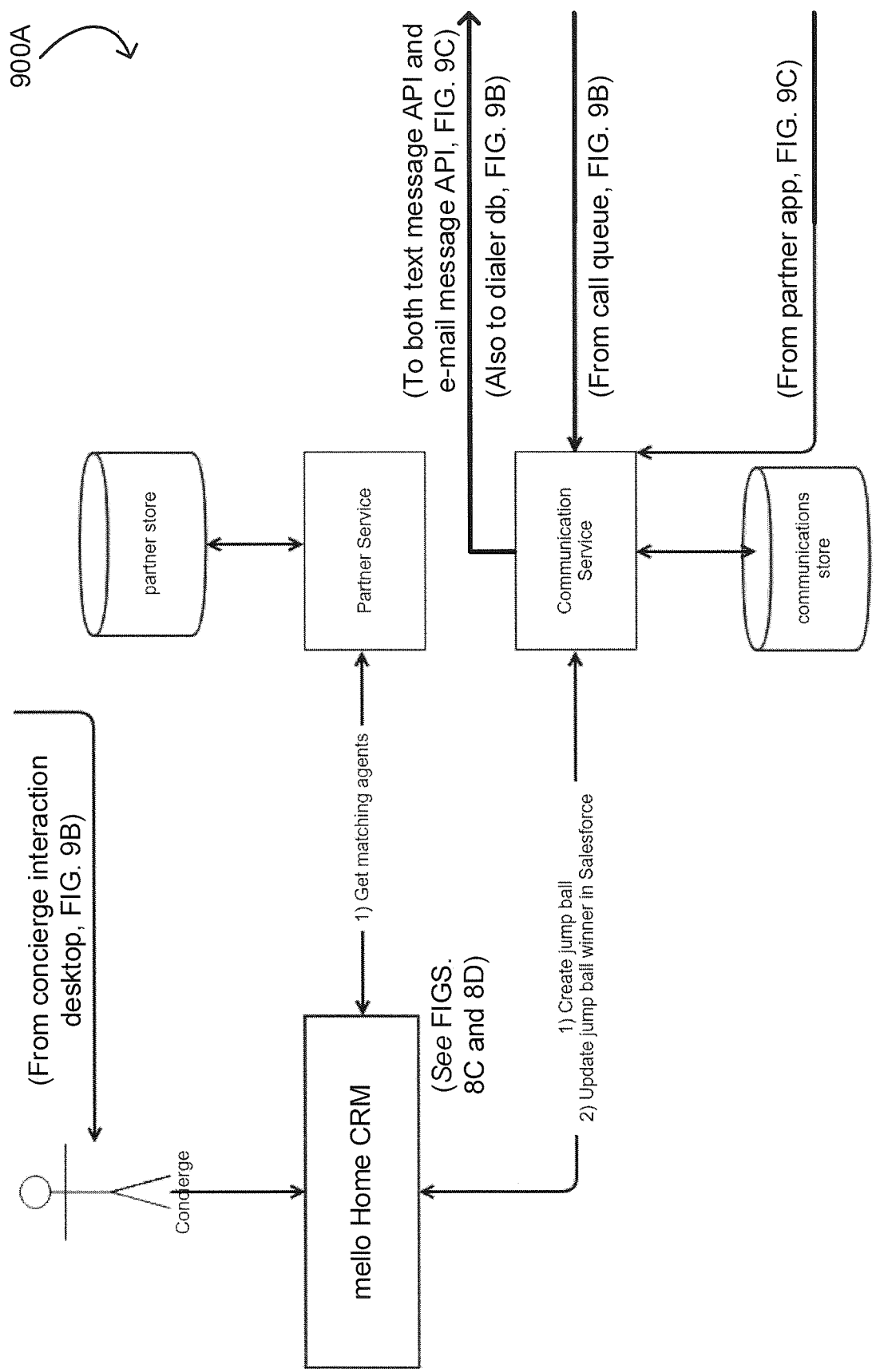

FIG. 9A illustrates a first portion of a lead-management system in accordance with some embodiments.

Figure 9B:
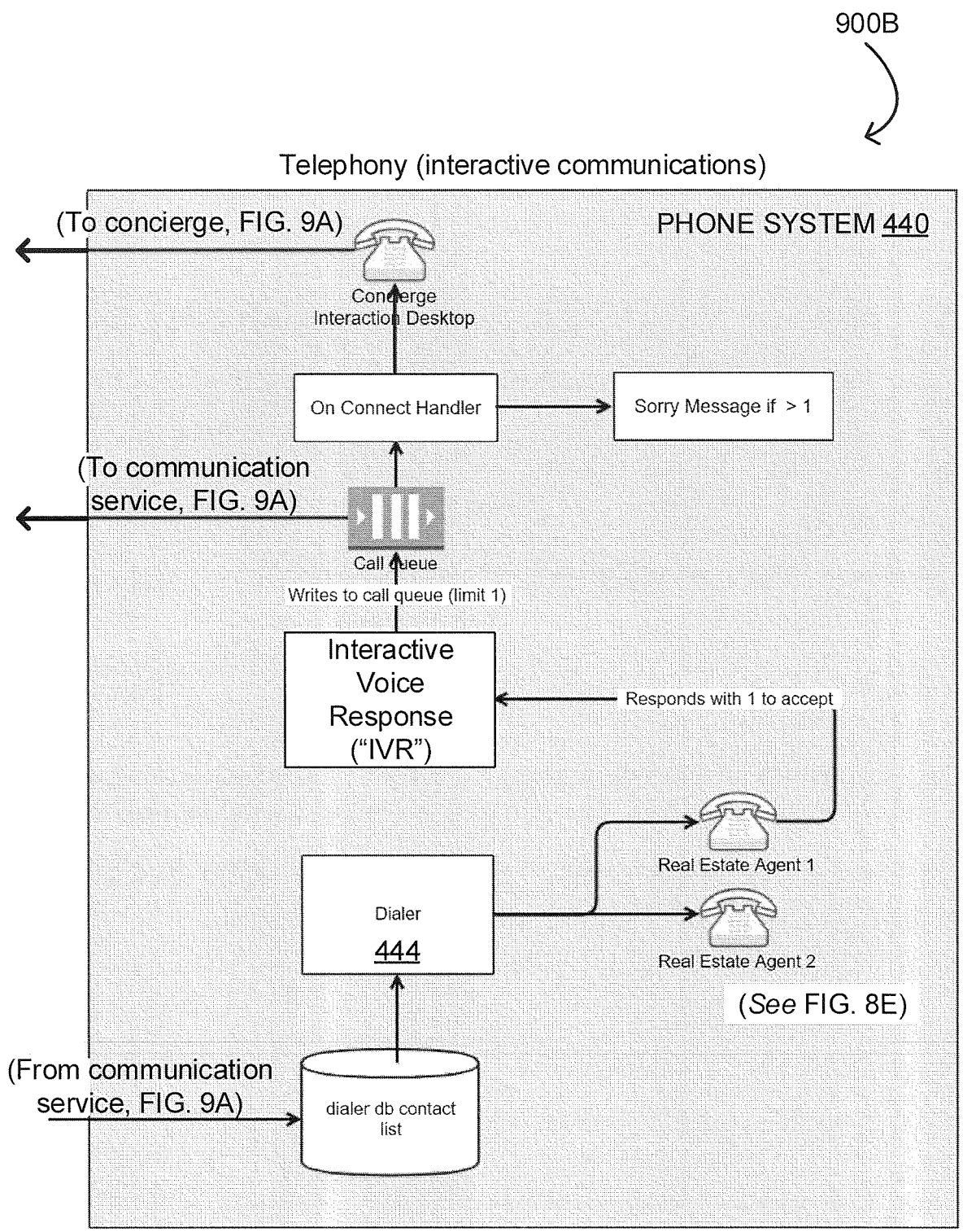

FIG. 9B illustrates a second portion of a lead-management system in accordance with some embodiments.

Figure 9C:
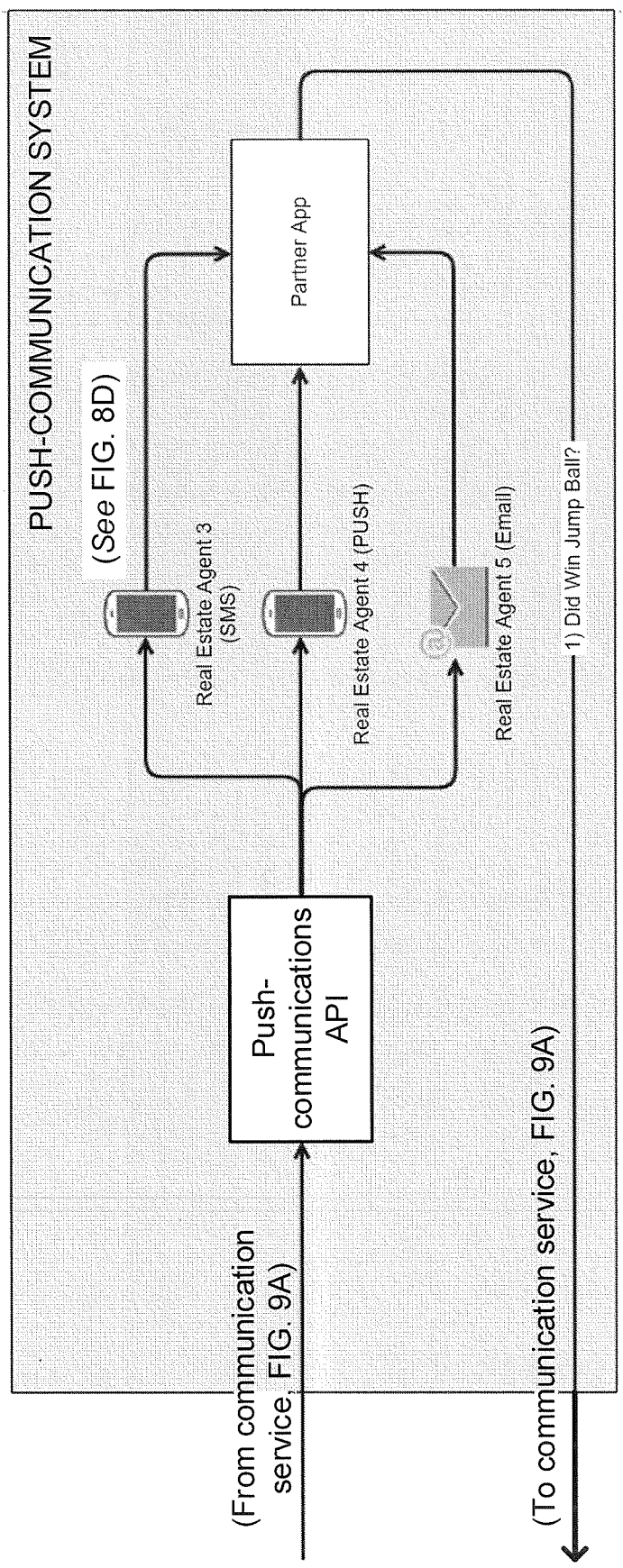

FIG. 9C illustrates a third portion of a lead-management system in accordance with some embodiments.

Figure 10:
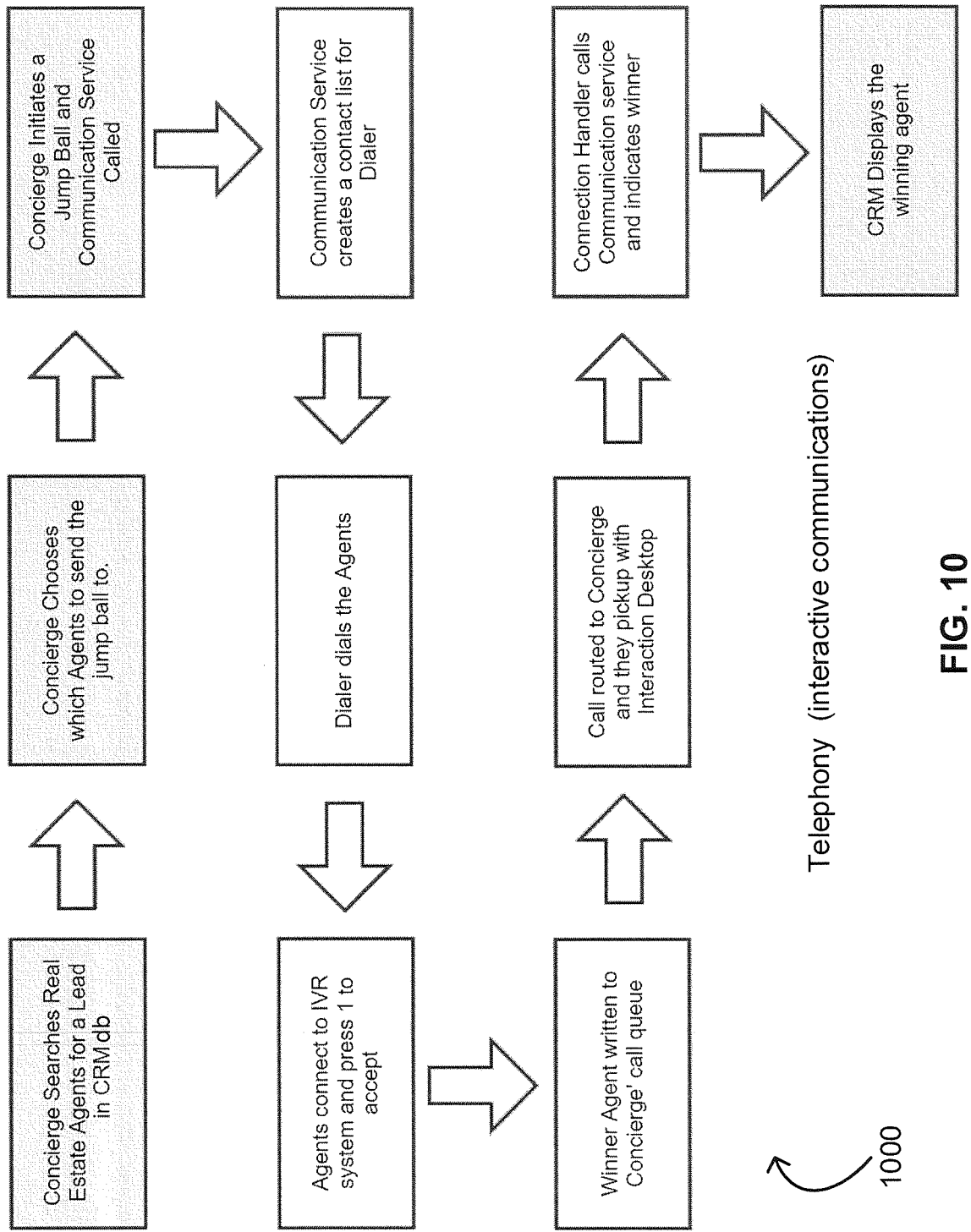

FIG. 10 illustrates a method for interactive communications over a phone system in accordance with some embodiments.

Figure 11:
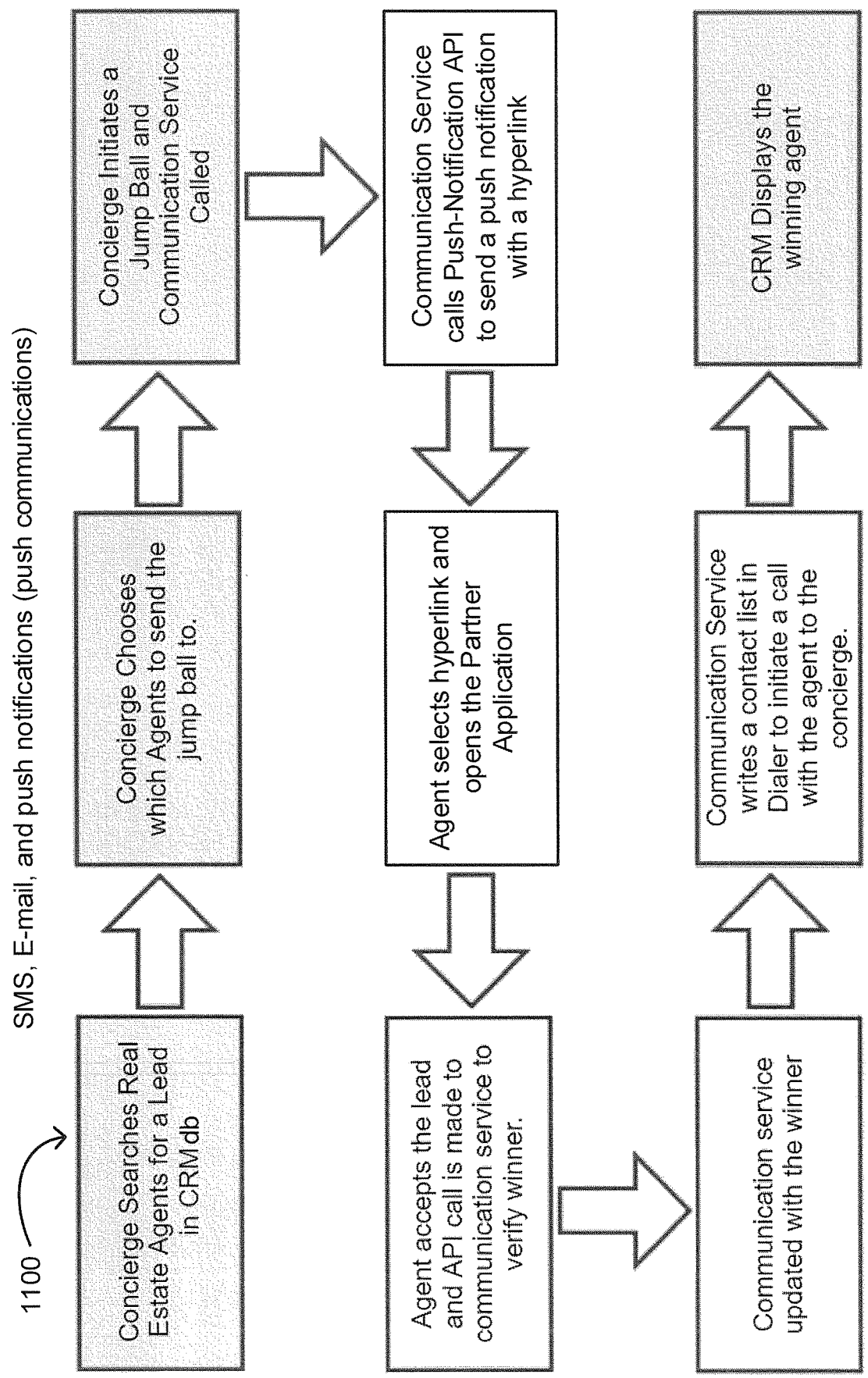

FIG. 11 illustrates a method flow for push communications over a push communications system in accordance with some embodiments.

DESCRIPTION

Before some particular embodiments are disclosed in greater detail, it should be understood that the particular embodiments disclosed herein do not limit the scope of the concepts provided herein. It should also be understood that a particular embodiment disclosed herein can have features that can be readily separated from the particular embodiment and optionally combined with or substituted for features of any of a number of other embodiments disclosed herein.

Regarding terms used herein, it should also be understood the terms are for the purpose of describing some particular embodiments, and the terms do not limit the scope of the concepts provided herein. Ordinal numbers (e.g., first, second, third, etc.) are generally used to distinguish or identify different features or steps in a group of features or steps, and do not supply a serial or numerical limitation. For example, "first," "second," and "third" features or steps need not necessarily appear in that order, and the particular embodiments including such features or steps need not necessarily be limited to the three features or steps. Labels such as "left," "right," "front," "back," "top," "bottom," "forward," "reverse," "clockwise," "counterclockwise," or the like are used for convenience and are not intended to imply, for example, any particular fixed location, orientation, or direction. Instead, such labels are used to reflect, for example, relative location, orientation, or directions. Singular forms of "a," "an," and "the" include plural references unless the context clearly dictates otherwise.

Unless defined otherwise, all technical and scientific terms used herein have the same meaning as commonly understood by those of ordinary skill in the art.

As previously set forth, lending requires many fragmented, often manual processes of both borrowers and lenders. Such fragmented processes obviate any financial benefit from economies of scale that could otherwise be passed onto borrowers and lenders alike if such processes were more tightly integrated—particularly with respect to timely connecting borrowers with appropriate lending and brokering personnel such as licensed real-estate professionals. Accordingly, there is a need for a tightly integrated lending-and-brokering environment configured for at least timely connecting borrowers with appropriate lending personnel and brokering personnel.

Disclosed herein is a method of lead routing with a lead-management system of an integrated lending-and-brokering environment including, in some embodiments, sending borrower information for a potential borrower from a database server of a lending platform to a database server of a brokering platform to supply buyer information for a potential buyer of real estate. The method also includes, in some embodiments, capturing real estate-buying criteria of the potential buyer. The method also includes, in some embodiments, matching the potential buyer with up to five licensed real-estate professionals associated with the brokering platform using at least in part some of the real estate-buying criteria. The method also includes, in some embodiments, notifying each real-estate professional of the up-to-five licensed real-estate professionals of the potential buyer by way of at least a text message sent by a web server of the brokering platform through an SMS gateway.

These and other features of at least the method of lead routing with the lead-managements system will become more apparent to those of skill in the art with the following description, which begins with an integrated lending-and-brokering environment of which the lead management system is a part.

Integrated Lending-and-Brokering Environment

Figure 1A:
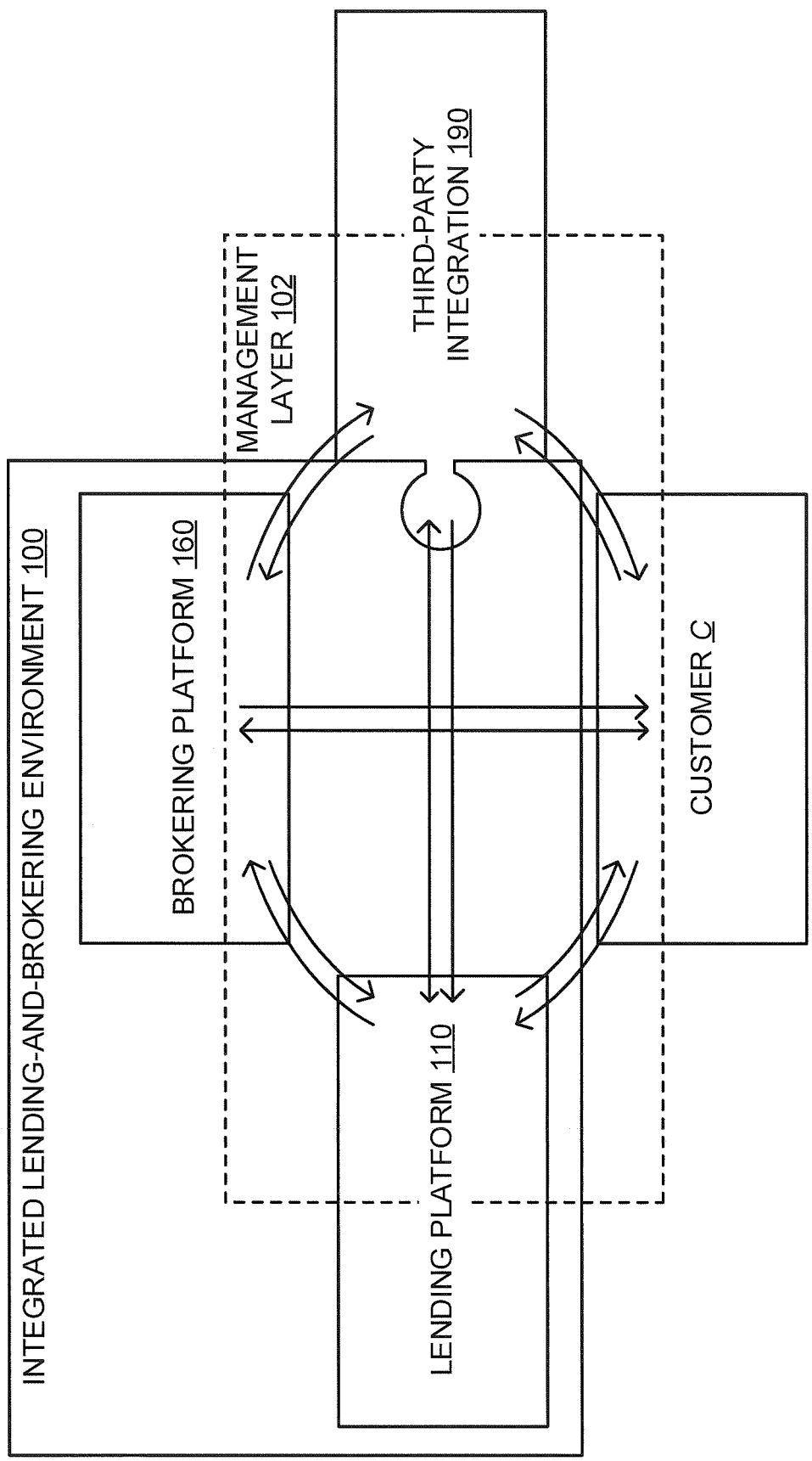
FIG. 1A illustrates an integrated lending-and-brokering environment in accordance with some embodiments.

FIG. 1A provides an integrated lending-and-brokering environment 100 in accordance with some embodiments.

As shown in FIG. 1A, the integrated lending-and-brokering environment 100 includes, in some embodiments, a lending platform 110, a brokering platform 160, third-party integration 190, and an entity-relationship management layer 102 configured for information sharing among the lending platform 110, the brokering platform 160, and one or more third parties through the third-party integration 190. The lending platform 110 is configured to facilitate processing of lending-related information among lending personnel. (See FIGS. 7A-7U.) The brokering platform 160 is configured to facilitate processing of brokering-related information among brokering personnel. (See FIGS. 8A-8P.) The third-party integration 190 includes one or more interfaces with the lending-and-brokering environment 100 such as one or more application programming interfaces ("APIs"), one or more web applications, or at least one API and at least one web application. The third-party integration 190 allows the one or more third-parties to at least contribute additional information for the processing of the lending-related information, the brokering-related information, or both. By information sharing among the lending platform 110, the brokering platform 160, and the one or more third parties through the third-party integration 190, the entity-relationship management layer 102 facilitates selling one or more assets such as real estate, buying one or more assets such as real estate, or a combination thereof for a customer without a need for the customer to provide duplicative customer information to the lending personnel, the brokering personnel, or the one or more third parties. For example, the integrated lending-and-brokering environment 100 allows a customer to improve existing real estate through the brokering platform 160, sell the existing real estate through the brokering platform 160, buy new real estate through the brokering platform 160 (see FIGS. 8A-8P), and fund the purchase of the new real estate with a bridge loan through the lending platform 110 (see FIGS. 7A-7U).

Lending Platform

Figure 1B:
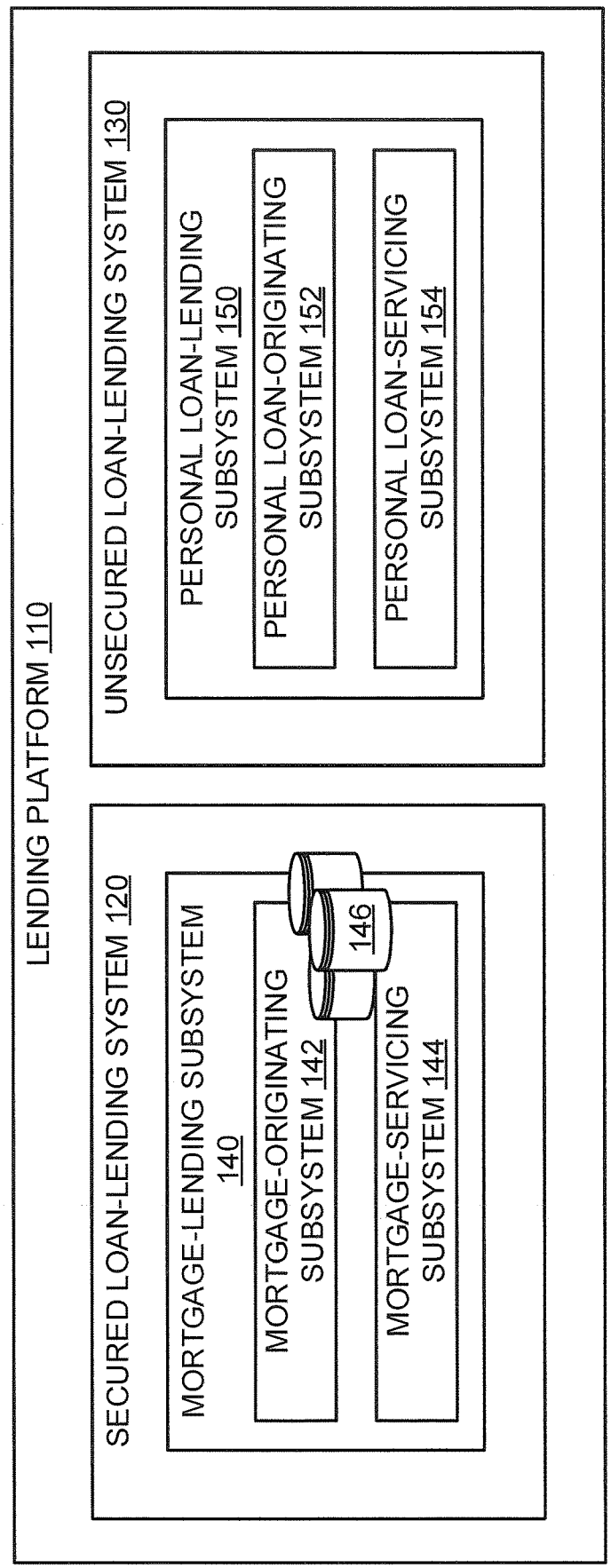
FIG. 1B illustrates a lending platform in accordance with some embodiments.

FIG. 1B provides the lending platform 110 in accordance with some embodiments.

As shown in FIG. 1B, the lending platforms 110 includes a secured loan-lending system 120 and an unsecured loan-lending system 130. The secured loan-lending system 120 includes at least a mortgage-lending subsystem 140 having a mortgage-originating subsystem 142 and a mortgage-servicing subsystem 144. The unsecured loan-lending system 130 includes at least a personal loan-lending subsystem 150 having a personal loan-originating subsystem 152 and a personal loan-servicing subsystem 154.

Brokering Platform

Figure 1C:
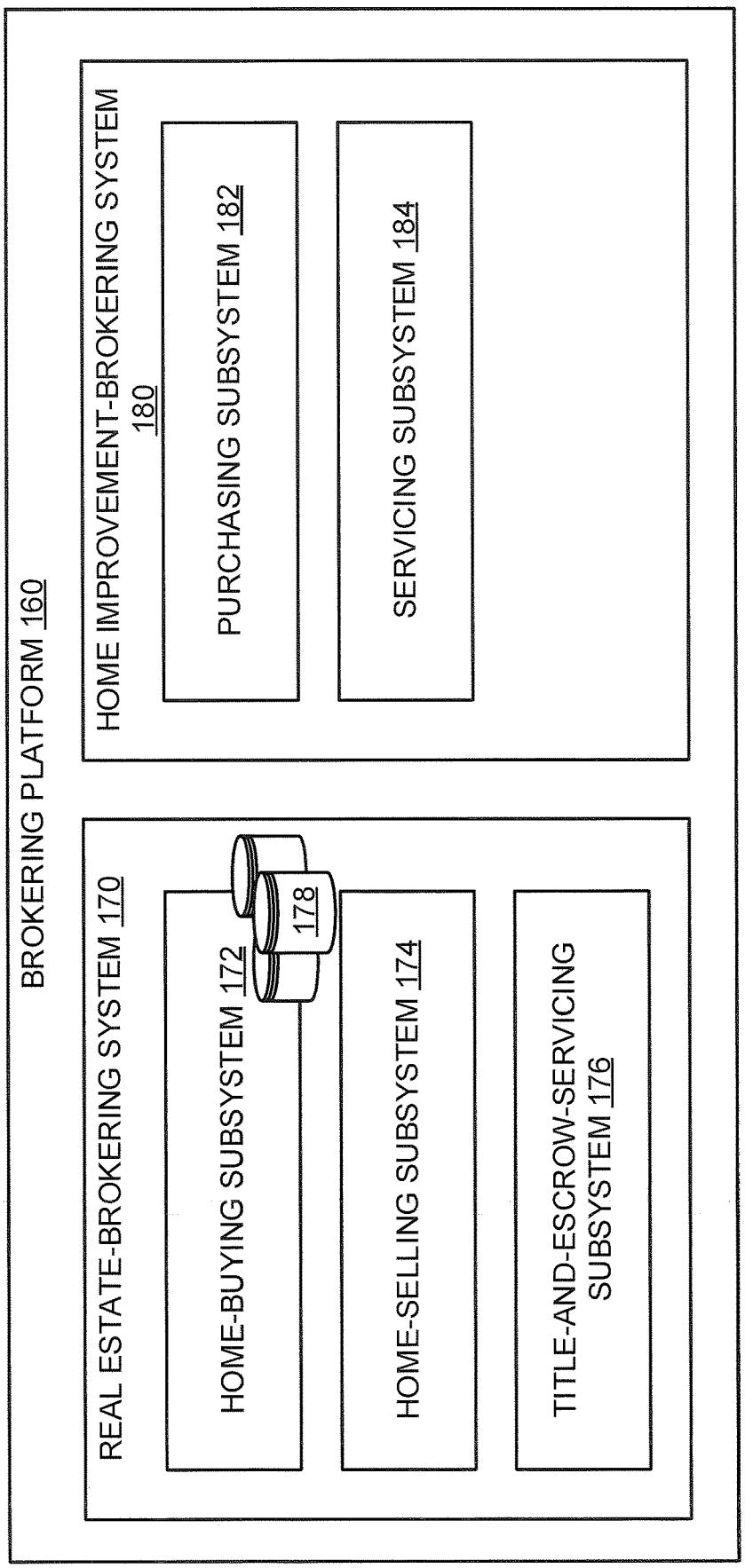
FIG. 1C illustrates a brokering platform in accordance with some embodiments.

FIG. 1C provides the brokering platform 160 in accordance with some embodiments.

As shown in FIG. 1C, the brokering platform 160 includes a real estate-brokering system 170 and a home improvement-brokering system 180. The real estate-brokering system 170 includes at least a home-buying subsystem 172, a home-selling subsystem 174, and a title-and-escrow-servicing subsystem 176. The home improvement-brokering system 180 includes at least a purchasing subsystem 182 and a servicing subsystem 184.

Figure 1D:
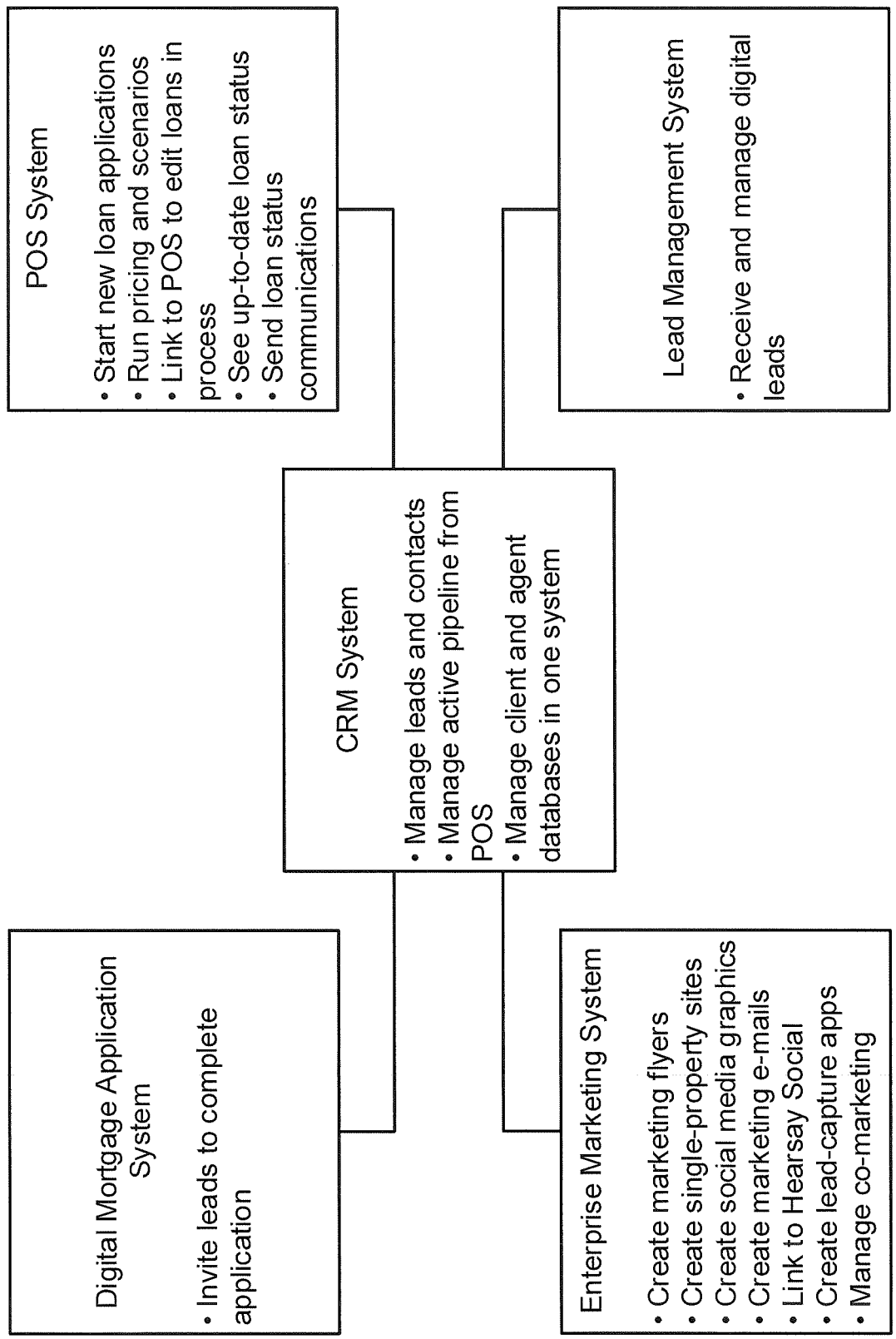
FIG. 1D illustrates an integrated lending-and-brokering environment in accordance with some embodiments.

FIG. 1D also illustrates the integrated lending-and-brokering environment 100 in accordance with some embodiments.

As shown in FIG. 1D, the integrated lending-and-brokering environment 100 includes, in some embodiments, a digital mortgage application system, an enterprise marketing system, a lead-management system, and a point-of-sale ("POS") system, each of which are communicatively coupled to a CRM system.

The digital mortgage application system is described in U.S. patent application Ser. No. 16/243,560, filed Jan. 9, 2019, titled "Digital Mortgage Application System and Processes Thereof," which is hereby incorporated herein by reference in its entirety. As shown, in FIG. 1D, a potential borrower can be invited to complete a digital mortgage application on the digital mortgage application system.

Figure 4A:
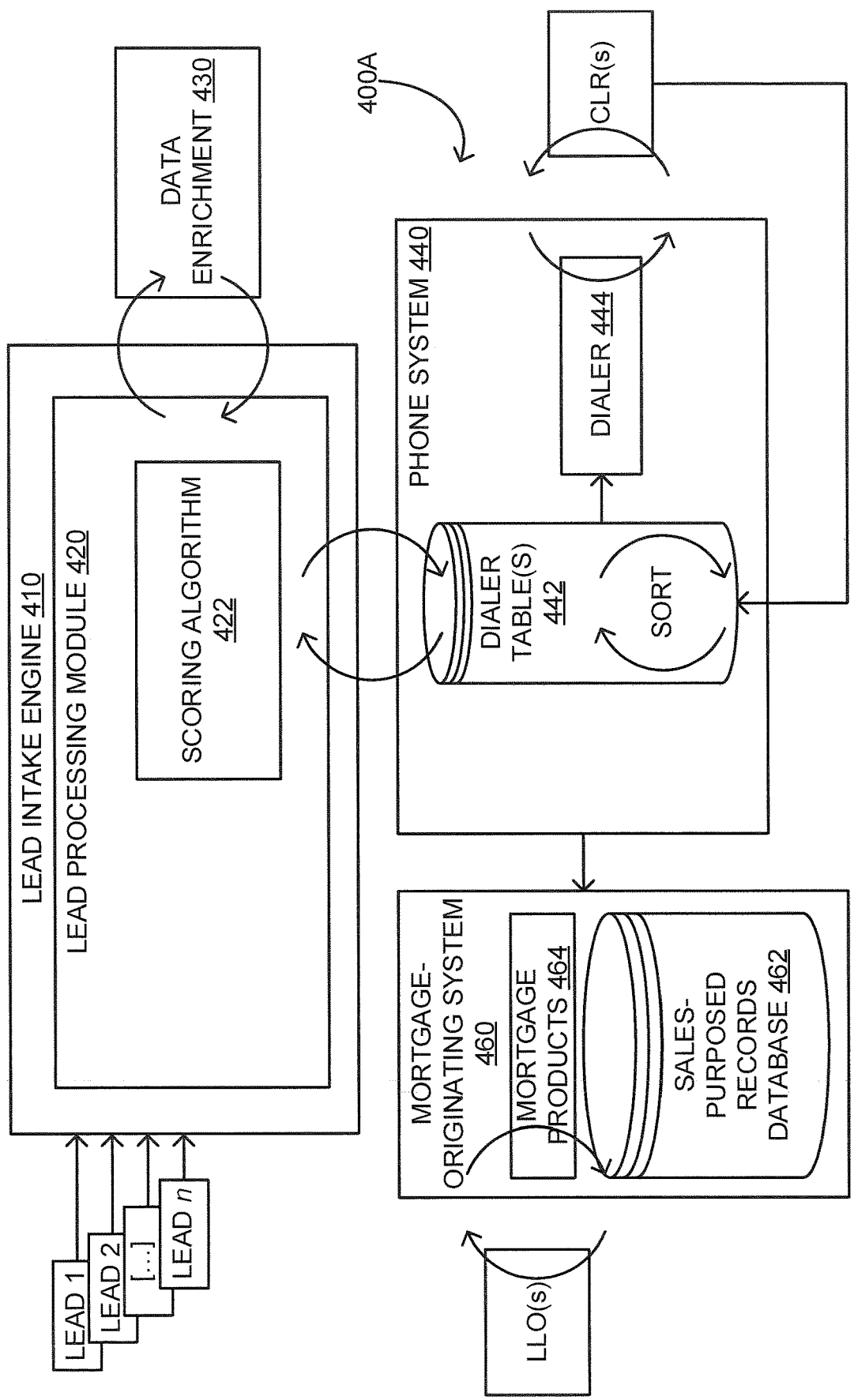
FIG. 4A illustrates a lead-management system in accordance with some embodiments.
Figure 4B:
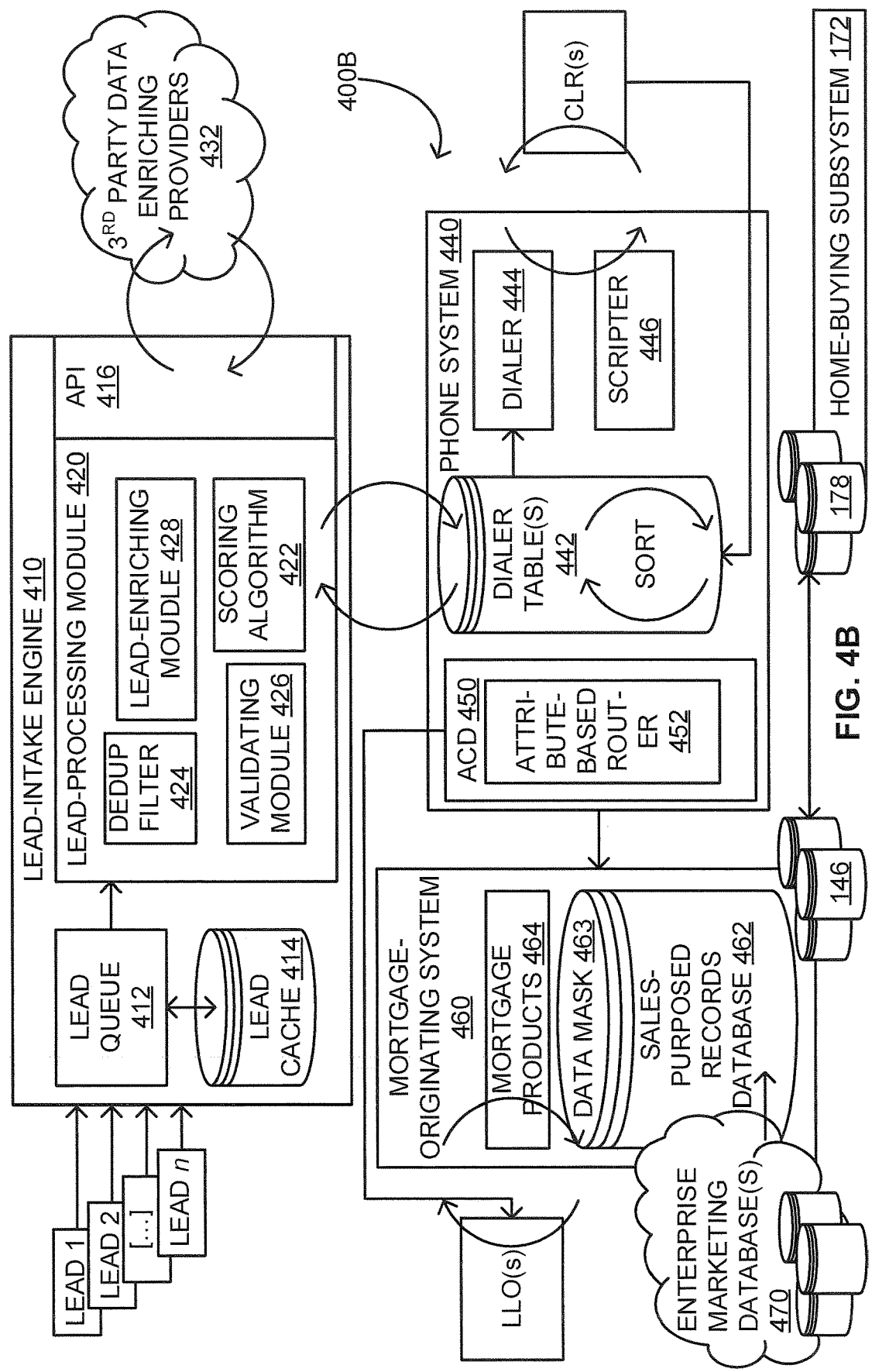
FIG. 4B illustrates a lead-management system in accordance with some embodiments.

The enterprise marketing system includes one or more marketing databases 470 as shown in FIG. 4B. As shown in FIG. 1D, the enterprise marketing system can be configured for creating marketing flyers, creating single-property sites, creating social-media graphics, creating marketing e-mails linking to Hearsay Social, or Hearsay Systems, creating lead-capture applications, and managing co-marketing.

The lead-management system, which can be configured to receive and manage sales leads, is described in more detail herein with respect to at least the lead-management system 400A, 400B, and 500.

The POS system can be configured for starting new loan applications, running prices and scenarios, linking to edit in-process loans, seeing up-to-date loan statuses, and sending loan-status communications. The POS system is described in more detail herein with respect to FIGS. 7N-7P, 7R, and 8B.

The CRM system is communicatively coupled to each of the digital mortgage application system, the enterprise marketing system, the lead-management system, and the POS system. As described in more detail herein, the CRM system can include a CRM subsystem of the lending platform 110 and a CRM subsystem of the brokering platform 160, each of which can have one or more CRM databases (see, for example, FIG. 4B). The CRM system can be configured as a central system for storing and managing borrower information and buyer information. The CRM system can also be configured for managing leads and contacts, managing active pipelines from the POS, and managing client and agent databases in one system.

Integrated Lending-and-Brokering Environment Architecture

Figure 2:
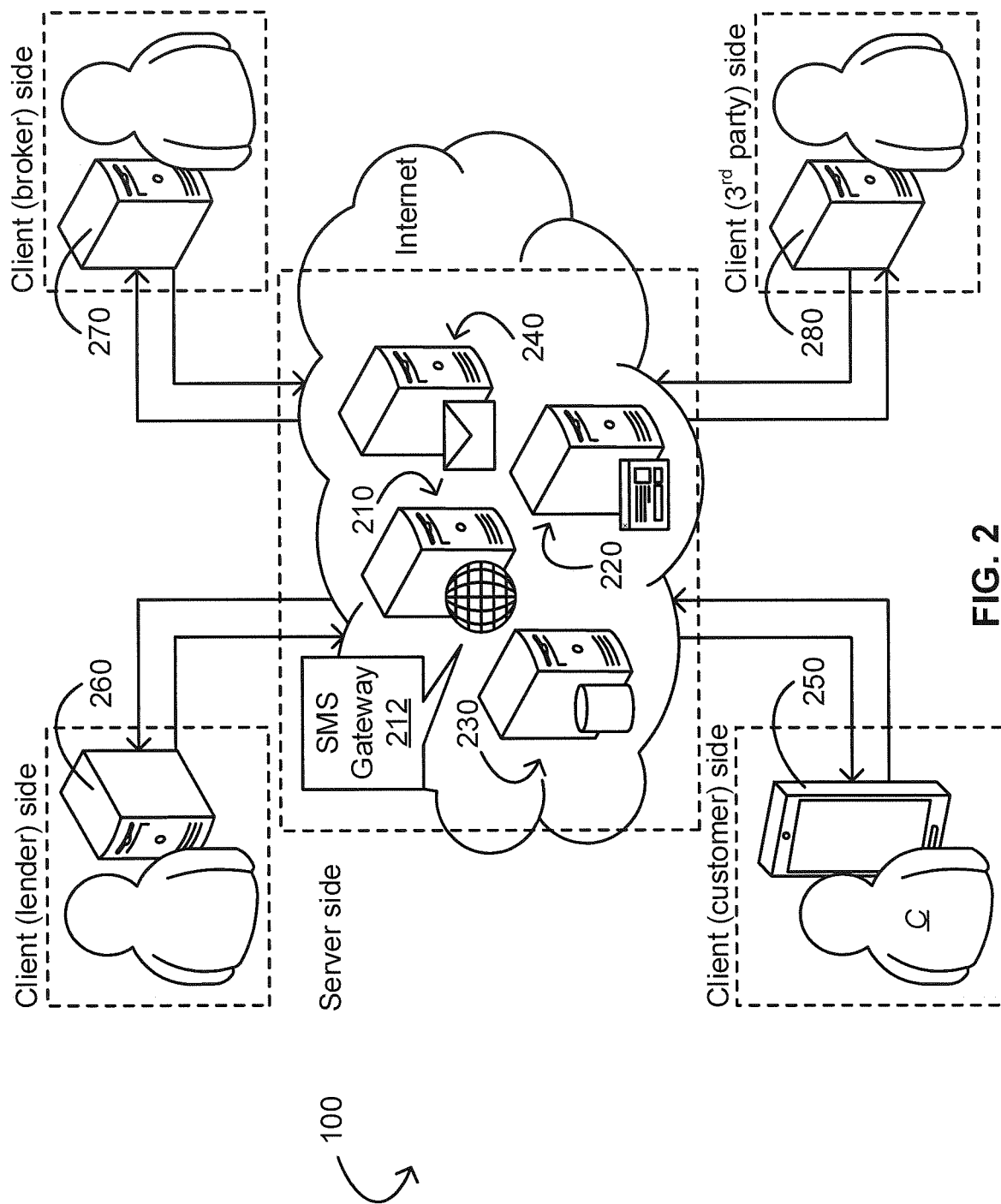
FIG. 2 illustrates the integrated lending-and-brokering environment supported by a number of server hosts networked with a number of client hosts in accordance with some embodiments.

FIG. 2 provides the integrated lending-and-brokering environment 100 supported by a number of server hosts 210, 220, 230, and 240 networked with a number of client hosts 250, 260, 270, and 280 in accordance with some embodiments.

The integrated lending-and-brokering environment 100 includes one or more application stacks, each application stack of which is independently configured to run at least in part from a primary memory of at least one server host of the server hosts 210, 220, 230, and 240 of the lending-and-brokering environment 100. The one or more application stacks include, but are not limited to, a customer-oriented application stack, a lender-oriented application stack, a broker-oriented application stack, a third party-oriented application stack, or a combination thereof.

As shown in FIG. 2, the server hosts 210, 220, 230, and 240 supporting the integrated lending-and-brokering environment 100 and the one or more application stacks thereof can include a web server, an application server, a database server with an associated database, an e-mail server configured to send and receive secured e-mail messages, or a combination thereof. For expository convenience, the server host 210 is shown to support the web server, the server host 220 is shown to support the application server, the server host 230 is shown to support the database server, and the server host 240 is shown to support the e-mail server; however, the web server, the application server, the database server, and the e-mail server can be supported by any one or more of the server hosts 210, 220, 230, and 240 in any of a number of ways. Optionally, the server hosts 210, 220, 230, and 240 further support mobile device-oriented server counterparts such as a mobile web server or a mobile application server if such mobile device-oriented server counterparts are not already integrated with their counterpart servers.

With respect to the customer-oriented application stack, an application server of the customer-oriented application stack supported by, for example, the server host 220 can include a customer-oriented web application server module (not shown) configured to service requests from one of more client hosts such as a customer's client host 250 for a customer-oriented web application. The customer-oriented web application server module can be a mobile web application server module configured to service requests from one of more mobile devices (e.g., smart phones, tablet computers, etc.) for a mobile web application version of the customer-oriented web application.

With respect to the lender-oriented application stack, the lender-oriented application stack is configured to run at least in part from a primary memory of at least one server host of the lending platform 110. The lender-oriented application stack includes one or more web servers, one or more application servers, and one or more database servers. The one or more application servers supported by, for example, the server host 220, can include a lender-oriented web application server module (not shown) configured to service requests from one of more client hosts such as a lender's client host 260 for a lender-oriented web application. The lender-oriented web application server module can be a mobile web application server module configured to service requests from one of more mobile devices (e.g., smart phones, tablet computers, etc.) for a mobile web application version of the lender-oriented web application. The web application can be configured for the secured loan-lending system 120, the unsecured loan-lending system 130, or both. The one or more database servers supported by, for example, the server host 230 can be configured to store the customer information in one or more databases for sharing among the lending personnel, the brokering personnel, or the one or more third parties.

With respect to the broker-oriented application stack, the broker-oriented application stack is configured to run at least in part from a primary memory of at least one server host of the brokering platform 160. The broker-oriented application stack includes one or more web servers, one or more application servers, and one or more database servers. The one or more application servers supported by, for example, the server host 220, can include a broker-oriented web application server module (not shown) configured to service requests from one of more client hosts such as a broker's client host 270 for a broker-oriented web application. The broker-oriented web application server module can be a mobile web application server module configured to service requests from one of more mobile devices (e.g., smart phones, tablet computers, etc.) for a mobile web application version of the broker-oriented web application. The web application can be configured for the real estate-brokering system 170, the home improvement-brokering system 180, or both. The one or more database servers supported by, for example, the server host 230 can be configured to store the customer information in one or more databases for sharing among the lending personnel, the brokering personnel, or the one or more third parties.

With respect to the third party-oriented application stack, an application server of the third party-oriented application stack supported by, for example, the server host 220 can include a third party-oriented web application server module (not shown) configured to service requests from one of more client hosts such as a third party's client host 280 for a third party-oriented web application. The third party-oriented web application server module can be a mobile web application server module configured to service requests from one of more mobile devices (e.g., smart phones, tablet computers, etc.) for a mobile web application version of the third party-oriented web application.

Thus, the integrated lending-and-brokering environment 100 further includes the customer-oriented web application, the lender-oriented web application, the broker-related web application, and, optionally, the third party-oriented web application in addition to the one or more application stacks thereof. The customer-oriented web application is configured to run at least in part from a primary memory of a first client host such as the customer's client host 250 (e.g., mobile device, personal computer, etc.). The lender-oriented web application is configured to run at least in part from a primary memory of a second client host such as the lender's client host 260 (e.g., personal computer, mobile device, etc.). The broker-oriented web application is configured to run at least in part from a primary memory of a third client host such as the broker's client host 270 (e.g., personal computer, mobile device, etc.). Optionally, the third party-oriented web application is configured to run at least in part from a primary memory of a fourth client host such as the third party's client host 280 (e.g., personal computer, mobile device, etc.). The customer-oriented web application, the lender-oriented web application, the broker-related web application, and the third party-oriented web application are configured for information sharing by way of the entity-relationship management layer 102.

While the foregoing sets forth a number of web applications for client hosts, it should be understood that such client hosts can alternatively run local applications native to the operating systems of the client hosts.

The customer-oriented web application is configured to accept customer information, inquiries regarding real estate, or a combination thereof by way of a web server of the customer-oriented application stack supported by, for example, the server host 210. The customer information can include, but is not limited to, details for real estate the customer would like to sell. The inquiries can include, but are not limited to, inquiries for details regarding real estate the customer would like to buy. A database server of the customer-oriented application stack supported by, for example, the server host 230 is configured to store the customer information or inquiries in one or more databases for sharing among the lending personnel, the brokering personnel, or the one or more third parties. A same or different web server than that of the server host 210 or an API can be configured to send the customer information or inquiries to the lending personnel, the brokering personnel, or the one or more third parties. Any information relevant to the customer information or inquiries received from the lending personnel, the brokering personnel, or the one or more third parties can be stored in the one or more databases for further sharing among the lending personnel, the brokering personnel, or the one or more third parties. The information relevant to the customer inquiries received from the one or more third parties can include, but is not limited to, an instant appraisal or one or more customer-specific artificial intelligence-generated predictive insights into existing and upcoming real estate for sale. The customer-oriented web application is further configured to display the information relevant to the customer information or inquiries received from the lending personnel, the brokering personnel, or the one or more third parties, as well as one or more options to proceed with a real estate transaction. The one or more options to proceed with a real estate transaction can be one or more financing options including at least a bridge loan based upon an instant appraisal for buying real estate corresponding to the details for real estate the customer would like to buy. From the perspective of the customer, the display of the information relevant to the customer information or inquiries occurs in real-time.

Figure 3:
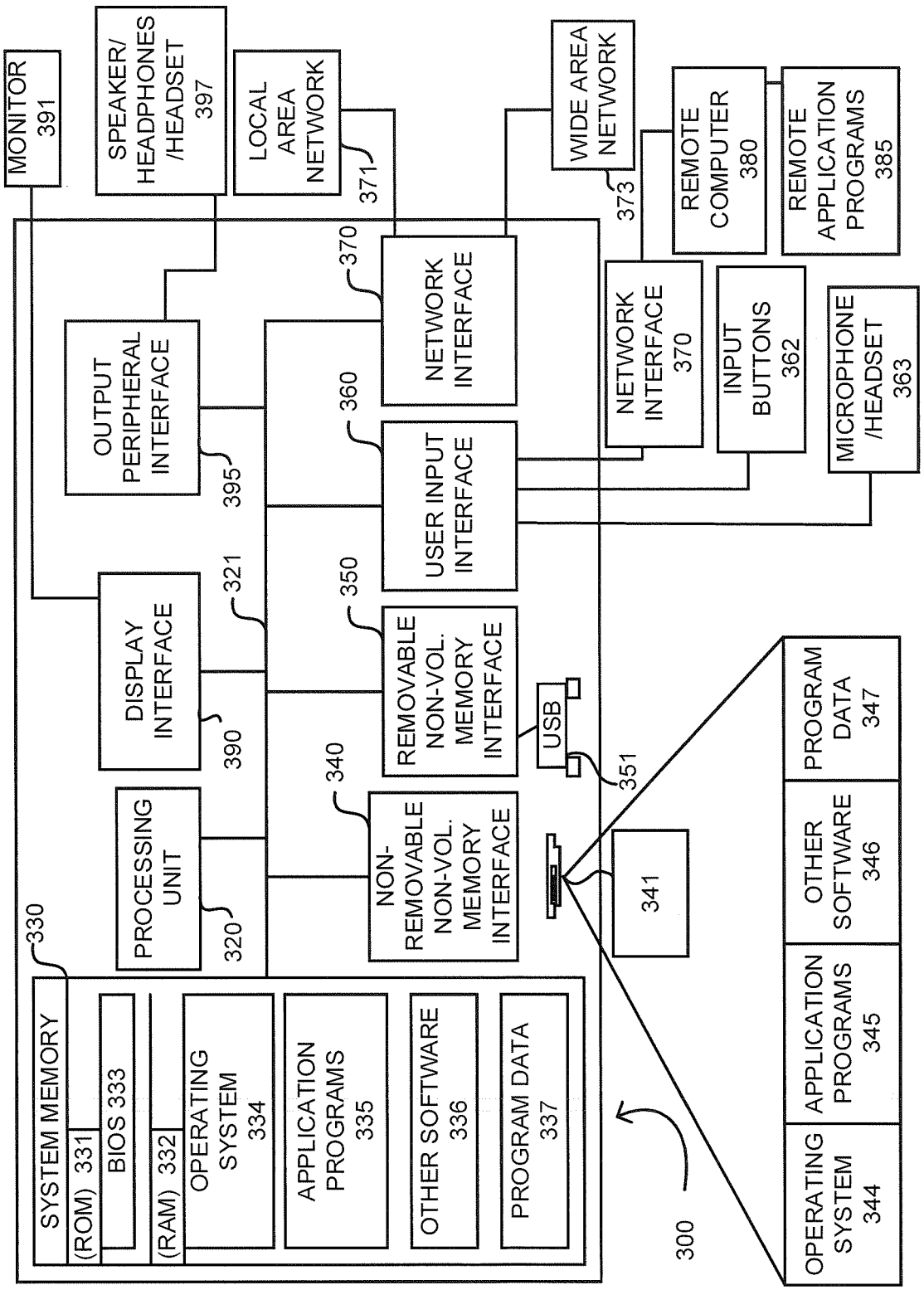
FIG. 3 illustrates components of a network host in accordance with some embodiments.

FIG. 3 provides a network host 300 such as any one or more server hosts of the lead-management system in accordance with some embodiments. Components of the network host 300 vary in accordance with host type. As such, each and every component shown and described in reference to FIG. 3 need not be included in each host type. Furthermore, each host type can further include components not shown or described in reference to FIG. 3 but otherwise described herein.

As shown, components of the network host 300 can include, but are not limited to, a processing unit 320 having one or more processing cores, a primary or system memory 330, and a system bus 321 that couples various system components including the system memory 330 to the processing unit 320. The system bus 321 can be any of several types of bus structures selected from a memory bus or memory controller, a peripheral bus, and a local bus using any of a variety of bus architectures.

The network host 300 can include a variety of computer-readable media. Computer-readable media can be any media that can be accessed by the network host 300 and includes both volatile and nonvolatile media, as well as removable and non-removable media. By way of example, and not limitation, use of computer-readable media includes storage of information, such as computer-readable instructions, data structures, other executable software, or other data. Computer-readable media includes, but is not limited to, RAM, ROM, EEPROM, flash memory or other memory technology, CD-ROM, digital versatile disks ("DVD") or other optical disk storage, magnetic cassettes, magnetic tape, magnetic disk storage or other magnetic storage devices, or any other tangible medium that can be used to store the desired information for access by the network host 300. Transitory media such as wireless channels are not included in the computer-readable media. Communication media typically embody computer-readable instructions, data structures, other executable software, or other transport mechanisms and includes any information delivery media. As an example, some client hosts on a network might not have optical or magnetic storage.

The system memory 330 includes computer-readable media in the form of volatile or nonvolatile memory such as read only memory ("ROM") 331 and random-access memory ("RAM") 332. A basic input-output system 333 ("BIOS") containing the basic routines that help to transfer information between elements within the network host 300, such as during start-up, is typically stored in ROM 331. RAM 332 typically contains software or data that are immediately accessible for operations by the processing unit 320. By way of example, and not limitation, FIG. 3 illustrates that RAM 332 can include a portion of the operating system 334, application programs 335, other executable software 336, and program data 337.

The network host 300 can also include other computer-readable media. By way of example only, FIG. 3 illustrates a solid-state memory 341. Other computer-readable media that can be used in the example operating environment include, but are not limited to, universal serial bus ("USB") drives and devices, flash memory cards, solid state RAM, solid state ROM, or the like. The solid-state memory 341 is typically connected to the system bus 321 through a non-removable memory interface such as interface 340, and USB drive 351 is typically connected to the system bus 321 by a removable memory interface such as interface 350.

The drives and their associated computer-readable media provide storage of computer-readable instructions, data structures, other executable software, or other data for the network host 300. In FIG. 3, for example, the solid-state memory 341 is illustrated for storing operating system 344, application programs 345, other executable software 346, or program data 347. Note that these components can either be the same as or different from operating system 334, application programs 335, other executable software 336, and program data 337. Operating system 344, application programs 345, other executable software 346, and program data 347 are given different numbers here to illustrate that, at a minimum, they are different copies.

A user can enter commands and information into the network host 300 through input devices such as a keyboard, touchscreen, or software or hardware input buttons 362, a microphone 363, a pointing device such as a mouse, or scrolling input component such as a trackball or touch pad. The microphone 363 can cooperate with speech recognition software. These and other input devices are often connected to the processing unit 320 through a user input interface 360 that is coupled to the system bus 321 but can be connected by other interface and bus structures, such as a parallel port, game port, or USB. A display monitor 391 or other type of display screen device is also connected to the system bus 321 via an interface such as a display interface 390. In addition to the monitor 391, the network host 300 can also include other peripheral output devices such as speakers 397, and other output devices, which can be connected through an output peripheral interface 395.

The network host 300 can operate in a networked environment using logical connections to one or more other network hosts such as network host 380. Like the network host 300, the network host 380 can be a personal computer, a server, a router, a network PC, a peer device, or another network node. The logical connections depicted in FIG. 3 can include a local area network ("LAN") 371 (e.g., Wi-Fi) and a wide area network ("WAN") 373 (e.g., Internet, cellular network, etc.), but can also include other networks. Such networking environments are commonplace in offices, enterprise-wide computer networks, intranets and the Internet. A browser application can be resident on the network host 300 and stored in the memory.

When used in a LAN networking environment, the network host 300 is connected to the LAN 371 through a network interface or adapter 370, which can be, for example, a Wi-Fi adapter. When used in a WAN networking environment (e.g., Internet), the network host 300 can include some means for establishing communications over the WAN 373. With respect to telecommunication technologies, for example, a radio interface, which can be internal or external, can be connected to the system bus 321 via the network interface 370, or another appropriate mechanism. In a networked environment, other software depicted relative to the network host 300, or portions thereof, can be stored in the remote memory storage device. By way of example, and not limitation, FIG. 3 illustrates remote application programs 385 as residing on the network host 380. It will be appreciated that the network connections shown are examples and other means of establishing a communications link between the network hosts can be used.

As discussed, the network host 300 can include a processor 320, a memory (e.g., ROM 331, RAM 332, etc.), an AC power input, a display screen, and built-in Wi-Fi circuitry to wirelessly communicate with other network hosts connected to the network.

Another device that can be coupled to bus 321 is a power supply such as a DC power supply (e.g., battery) or an AC adapter circuit. As discussed above, the DC power supply can be a battery, a fuel cell, or similar DC power source that needs to be recharged on a periodic basis. A wireless communication module can employ a Wireless Application Protocol to establish a wireless communication channel. The wireless communication module can implement a wireless networking standard.

In some embodiments, software used to facilitate algorithms discussed herein can be embodied into a non-transitory computer-readable medium. A computer-readable medium includes any mechanism that stores information in a form readable by a computer. For example, a non-transitory machine-readable medium can include ROM; RAM; magnetic disk storage media; optical storage media; flash memory devices; DVDs, EPROMs, EEPROMs, FLASH memory, magnetic or optical cards, or any type of media suitable for storing electronic instructions.

An application described herein includes, but is not limited to, software applications and programs that are part of an operating system or integrated with or on an application layer thereof. Some portions of this description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as C, C+, or other similar languages. Also, an algorithm can be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a network host, or similar electronic computing device, that manipulates and transforms data represented as physical (electronic) quantities within the computer system's registers and memories into other data similarly represented as physical quantities within the computer system memories or registers, or other such information storage, transmission or display devices.

Many functions performed by electronic hardware components can be duplicated by software emulation. Thus, a software program written to accomplish those same functions can emulate the functionality of the hardware components in input-output circuitry.

Lead-Management System

FIG. 4A provides a lead-management system 400A in accordance with some embodiments.

As shown in FIG. 4A, the lead-management system 400A in support of the lending-and-brokering environment 100 includes a lead-intake engine 410, data enrichment 430, a phone system 440, and a mortgage-originating system 460 (also mortgage-originating subsystem 142 of FIG. 1B). The lead-management system 400A is optimized for speed-to-contact with telecommunications regulatory compliance.

The lead-intake engine 410 includes a lead-processing module 420, which, in turn, includes a scoring algorithm 422. The lead-intake engine 410 is configured for processing sales leads. Processing sales leads includes enriching original data of at least a portion of incoming sales leads with complementary data to convert the portion of incoming sales leads into enriched sales leads. Processing sales leads also includes scoring the enriched sales leads and any of the incoming sales leads not converted to the enriched sales leads with scores by the scoring algorithm 422.

The complementary data is selected from TCPA-compliance data including phone type (e.g., wireline or wireless) and subscriber information; subject property information for secured loans such as mortgages including address, legal description, year built, or a combination thereof; borrower personal information including Social Security number, date of birth, age, ethnicity, race, gender, veteran status, disability status, education information, address history, marital status, dependent information, or a combination thereof; borrower employment information including employment history, income, or a combination thereof; and borrower financial information including credit rating, financial account information, asset information, value of one or more existing properties, equity in one or more existing properties, loan-to-value ratio, or a combination thereof.

The phone system 440 includes one or more dialer tables 442 and a dialer 444. The phone system 440 includes the dialer 444 configured to dial phone numbers for the sales leads from the one or more dialer tables 442 of the phone system 440. The one or more dialer tables 442 are sorted in accordance with the scores of the sales leads by the lead-intake engine 410.

The mortgage-originating system 460 includes a sales-purposed records database 462 and loan products 464. The mortgage-originating system 460 is configured to create a sales-purposed record in the sales-purposed records database 462 for each sales lead using the original data, the complementary data, or a combination thereof. The mortgage-originating system 460 is configured to create the record up to at least a time of the dialer 444 dialing a phone number associated with the record.

FIG. 4B provides a lead-management system 400B in accordance with some embodiments. As shown in FIG. 4B, the lead-management system 400B includes the lead-intake engine 410, the phone system 440, and the mortgage-originating system 460; however, the lead-management system 400B includes additional features as set forth herein below.

As set forth herein above, the lead-intake engine 410 includes the lead-processing module 420, which, in turn, includes the scoring algorithm 422. As shown in FIG. 4B, the lead-intake engine 410 can further include a lead queue 412 and a lead cache 414, and the lead-processing module 420 can further include a deduplicating filter 424, a validating module 426, and a lead-enriching module 428. The lead queue 412 is configured to queue the incoming sales leads, and the lead cache 414 is configured to cache the incoming sales leads should any adverse conditions occur downstream such as a processing bottleneck or a power outage. The deduplicating filter 424 is configured to remove duplicates of the sales leads. The validating module 426 is configured to validate loan inquiries of the sales leads, themselves, the original data of the incoming sales leads, or both. The lead-enriching module 428 is configured to coordinate with third-party data-enriching providers 432 to enrich original data of at least a portion of the incoming sales leads with the complementary data set forth herein above to convert the portion of incoming sales leads into enriched sales leads.

Again, the lead-intake engine 410 is configured for processing sales leads, and processing the sales lead includes enriching the original data of at least a portion of incoming sales leads with complementary data to convert the portion of incoming sales leads into enriched sales leads. The enriched sales leads can be intermittently further enriched at any time the complementary data is made available by the third-party data-enriching providers 432 by way of an API 416 of the lead-intake engine 410 or the lead-processing module 420 thereof exposed to the third-party data-enriching providers 432. Any of the enriched sales leads further enriched by the third-party data-enriching providers 432 can be subsequently rescored by the scoring algorithm 422. The one or more dialer tables 442 of the phone system 440 are concomitantly sorted in accordance with the scores of the sales leads by the lead-intake engine 410 while or, otherwise, at a same time as, the enriched sales leads are further enriched by the third-party data-enriching providers 432.

As set forth herein above, the phone system 440 includes the one or more dialer tables 442 and the dialer 444. As shown in FIG. 4B, the phone system 440 can further include a scripter 446 configured to provide customized scripts to Customer Liaison Representatives ("CLRs") in a call center. The scripter 446 is configured to provide each customized script with one or more questions for each sales lead in accordance with the original data of the sales lead, the complementary data provided by the third-party data-enriching providers 432, or the combination thereof. The one or more questions can be alternatively or additionally in accordance with an age of the sales lead, a campaign of the sales lead, or any combination of the foregoing.

Any answers provided by potential borrowers to the one or more questions asked by the CLRs from the customized scripts can be automatically logged in the one or more dialer tables 442 such as by an automated speech recognition service. Alternatively, the CLRs can manually enter any of the answers in the one or more dialer tables 442 to log in the one or more dialer tables 442 any of the answers provided by the potential borrowers. The answers can be logged in the one or more dialer tables 442 to enrich the original data of a different, as-of-yet-to-be-enriched portion of the incoming sales leads and, thereby, convert the different portion of incoming sales leads into normalized sales leads. The normalized sales leads effectively upconvert inexpensive or poor-quality sales leads into a more standard sales leads. The answers provided by the potential borrowers to the one or more questions asked by the CLRs from the customized scripts can also be logged in the one or more dialer tables 442 to further enrich already enriched sales leads. Each normalized sales lead or enriched sales lead further enriched with the answers provided by the potential borrowers can be re-scored by the scoring algorithm 422 up to at least a time of call transfer from a CLR to a licensed loan officer ("LLO") by way of the phone system 440.

As shown in FIG. 4B, the phone system 440 can further include an automatic call distributor ("ACD") 450 and an attribute-based router 452 thereof. Each LLO of a number of LLOs can be assigned a unique phone number with one or more associated LLO attributes configured for attribute-based routing of phone calls by the attribute-based router 452. The one or more attributes of the LLO are selected from, but are not limited to, one or more licensing states, experience with one or more loan products 464, one or more languages spoken, and combinations thereof. Call transfers from the CLRs to any available LLOs are in accordance with matches between the one or more LLO attributes and the normalized sales leads or enriched sales leads further enriched with the answers provided by the potential borrowers. As such, the phone system 440 includes a contextual awareness configured to connect the potential borrowers to the appropriate LLOs.

As set forth herein above, the mortgage-originating system 460 includes the sales-purposed records database 462 and the loan products 464. As shown in FIG. 4B, the lead-management system can further include one or more enterprise marketing databases 470 tied into the mortgage-originating system 460. The one or more enterprise marketing databases 470 are configured to store marketing information including one or more points of interaction for each potential borrower having established at least one point of interaction with the lending platform 110 or the lead-management system 410B. The mortgage-originating system 460 is configured to request the marketing information from the enterprise marketing database 470 and populate the sales-purposed record for each sales lead in the sales-purposed records database 462 with the one or more points of interaction for each potential borrower.

As shown in FIG. 4B, the lead-management system 410B can further include a configurable mask 463 or a mask-enabling viewing tool available to LLOs configured to mask information in the records database 462 not relevant to one or more sales strategies, information potentially detrimental to the one or more sales strategies, or a combination thereof.

As shown in FIG. 4B, the mortgage-originating system 460 includes a CRM database 146, and the home-buying subsystem 172 includes a CRM database 178. By way of respective database servers, borrower information in the CRM database 146 can be pushed to the CRM database 178, and buyer information in the CRM database 178 can be pushed to the CRM database 146. In this way, the borrower information and the buyer information respectively for a potential borrower and a potential buyer remains consistent among the CRM databases. It should be understood the potential borrower and the potential buyer represent the same entity to different personnel across the integrated lending-and-brokering platform environment 100.

Figure 5:
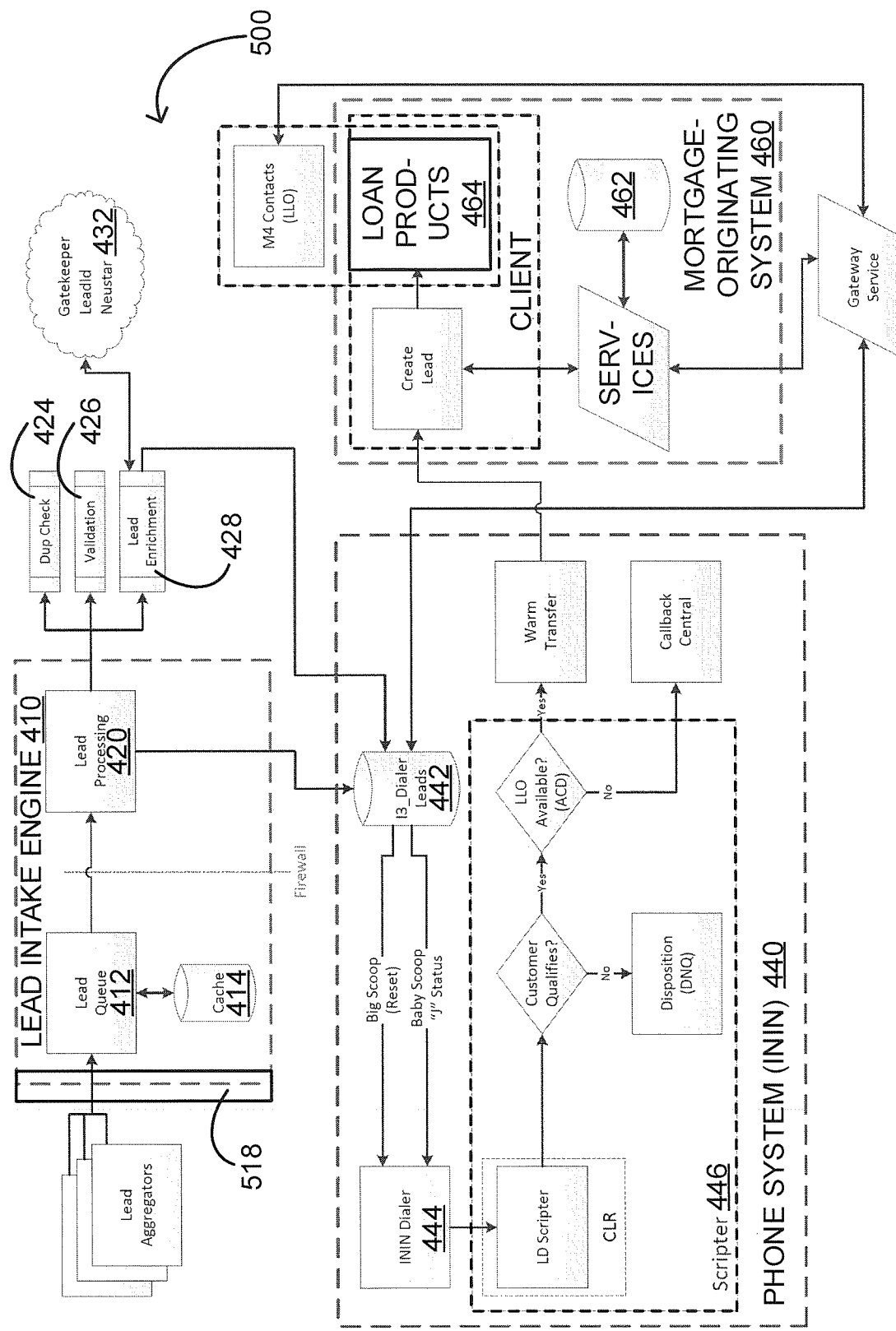
FIG. 5 illustrates a lead-management system including a process flow therethrough in accordance with some embodiments.

FIG. 5 provides a lead-management system 500 including a process flow in accordance with some embodiments. As shown in FIG. 5, the lead-management system 500 includes the lead-intake engine 410, the phone system 440, and the mortgage-originating system 460; however, the lead-management system 500 further includes the process flow as set forth herein below.

Sales leads corresponding to potential borrowers are generated through one or more lending exchanges. If, for example, an online lending exchange, potential borrowers fill in online applications for mortgages and submit the online applications, thereby providing incoming sales leads, which can be aggregated sales leads as shown in FIG. 5. An API 518 of the lead-intake engine 410 provides the original data of the incoming sales leads to the lead queue 412 and the lead cache 414, which lead cache 414 can be a Structured Query Language ("SQL") database in some embodiments. Submission of the online applications and population of the lead queue 412 occurs as quickly as supporting networks allow up to and including real-time. However, due to extrinsic factors that can affect timing of the incoming sales leads from submission of the online applications to receipt of the original data therefrom, the lead-intake engine 410 can include a tracking mechanism to determine ages of the incoming sales leads (e.g., a 5-second-old sales lead vs. a 5-hour-old sales lead). The ages of the sales leads can be used for purchasing decisions with respect to purchasing the sales leads, as well as metrics such as speed-to-contact. For example, speed-to-contact with the lead-management system is about 5-7 seconds in some embodiments.

As set forth herein above, the incoming sales leads and any of the sales lead already in the lead-management system 500 (e.g., any of the sales leads already in the dialer table 442) can be processed by way of the lead-intake engine 410. In no particular order, the lead-intake engine 410 is configured to remove duplicates of the sales leads by way of the deduplicating filter 424, validate loan inquiries of the sales leads by way of the validating module 426, and coordinate with the third-party data-enriching providers 432 by way of the lead-enriching module 428 to enrich and convert the incoming sales leads into enriched sales leads or further enrich already enriched sales leads. While not shown in FIG. 5, the scoring algorithm 422 is configured to continuously score or rescore the sales leads upon any enrichment of the sales leads by way of the lead-enriching module 428 and the third-party data-enriching providers 432, the answers provided by the potential borrowers to the questions asked by the CLRs from the customized scripts, or a combination thereof. (See FIG. 6.)

Figure 6:
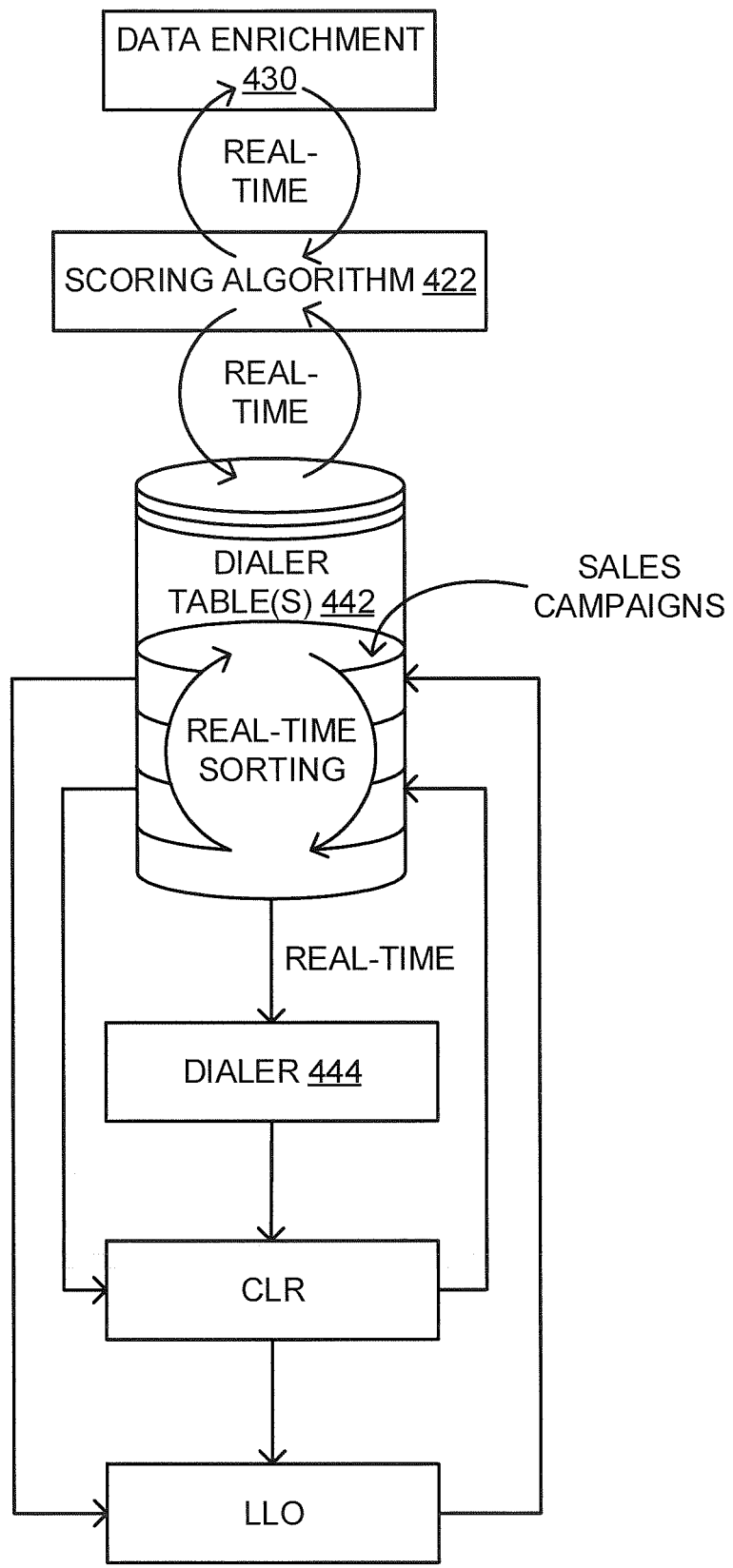
FIG. 6 illustrates real-time lead processing in accordance with some embodiments.

As the lead-intake engine 410 processes, enriches, and scores the sales leads, the sales leads are provided by the lead-intake engine 410 to the one or more dialer tables 442 of the phone system 440, which one or more dialer tables 442 can also be one or more SQL databases. As the sales leads are received by the one or more dialer tables 442, the one or more dialer tables 442 sort the sales leads in accordance with the scores for the sales leads provided by the scoring algorithm 422. Sorting the sales leads puts the sales leads into different sales campaigns, some of which campaigns are higher priority campaigns than other campaigns. (See FIG. 6.) Typically, the higher priority campaigns include potential borrowers with higher credit scores, lower loan-to-value ratios, and the like, which translates to lower risk loans. During the time sales leads are received by the one or more dialer tables 442 and sorted, the dialer 444, too, dials phone numbers for the sales leads from the one or more dialer tables 442 of the phone system 440, thereby, connecting the potential borrowers with the CLRs and their customized scripts generated on-the-fly. As such, the lead-intake engine 410 and the phone system 440 work together in concert and as quickly as supporting networks allow (e.g., up to and including real-time) to put the potential borrowers in contact with the CLRs. The CLRs, in turn, put the potential borrowers in contact with LLOs if the potential borrowers qualify. FIG. 6 provides a real-time lead processing in accordance with the foregoing. It should be noted that data enrichment of the sales leads continuously occurs throughout the lead-management system (including while CLRs and LLOs are on calls), and the sales leads are likewise continuously scored upon any data enrichment of any kind.

As set forth herein above, the scripter 446 of the phone system 440 is configured to provide each customized script with one or more questions for each sales lead. Any answers provided by a potential borrower to the one or more questions asked by a CLR from a customized script is logged in the one or more dialer tables 442. While such answers are used for data enrichment, the answers are also used to either disqualify (e.g., does not qualify ["DNQ"]) the potential borrower or immediately qualify the potential borrow to speak with an LLO. This is shown in the process flow of the scripter 446 in FIG. 5. If the potential borrower immediately qualifies to speak with an LLO, the CLR transfers the potential borrower to an available LLO having a good match between one or more LLO attributes and the sales leads in view of the answers provided by the potential borrower. At the time of transferring the potential borrower to the LLO, a sales-purposed record for the potential borrow is created in the records database 462 of the mortgage-originating system 460 for the LLO in his or her sales discussion with the potential borrower regarding the loan products 464.

Operation of the Lead-Management System

A non-transitory CRM including executable instructions can be executed on any one or more of the server hosts 210, 220, 230, or 240 by one or more processors thereof to cause the server host(s) to instantiate at least a portion of the lead-management system 400A, 400B, 500, or a combination thereof, as described herein. Once instantiated, the server host(s) can operate the lead-management system at least in part from primary memory. Operating the lead-management system includes operating the lead-processing engine 410, the phone system 440, and the mortgage-originating system 460.

Operating the lead-management system includes processing sales leads with the lead-processing module 420 of the lead-intake engine 410, sorting the one or more dialer tables 442 of the phone system 440, dialing phone numbers for the sales leads with the dialer 444 of the phone system 440, and creating a sales-purposed record for each sales lead with the mortgage-originating system 460. Processing the sales leads includes enriching original data of at least a portion of the incoming sales leads with complementary data to convert the portion of incoming sales leads into enriched sales leads. Processing the sales leads also includes scoring the enriched sales leads and any of the incoming sales leads not converted to the enriched sales leads with scores by the scoring algorithm 422. Sorting the one or more dialer tables 442 includes sorting the one or more dialer tables 442 in accordance with the scores of the sales leads by the lead-intake engine 410. Dialing the phone numbers for the sales leads includes dialing the phone numbers from the one or more dialer tables 442 with the dialer 444. Creating the sales-purposed record includes creating the record in the sales database 462 of the mortgage-originating system 460 for each sales lead using the original data, the complementary data, or a combination thereof. The record is created in the sales database 462 up to at least a time of the dialer 444 dialing a phone number associated with the record. Components of the lead-intake engine 410, the phone system 440, and the mortgage-originating system 460 form the lead-management system optimized for speed-to-contact with telecommunications regulatory compliance.

Operating the lead-management system further includes removing duplicates of the sales leads, validating loan inquiries of the sales leads, and enriching the original data of the portion of incoming sales leads. Removing the duplicates of the sales leads includes removing the duplicates with the deduplicating filter 424 of the lead-processing module 420. Validating loan inquiries of the sales leads includes validating the loan inquiries, themselves, of the sales leads, the original data of the incoming sales leads, or both with the validating module 426 of the lead-processing module 420. Enriching the original data of the portion of incoming sales leads includes enriching the original data with the complementary data to convert the portion of incoming sales leads into enriched sales leads by way of the lead-enriching module 428 configured to coordinate with the third-party data-enriching providers 432.

Operating the lead-management system further includes enriching already enriched sales leads, rescoring any of the already enriched sales leads, and sorting the one or more dialer tables 442 in accordance with the scores of the sales leads. Further enriching already enriched sales leads includes intermittently further enriching the already enriched sales leads by way of the third-party data-enriching providers 432 and the application programming interface 416 of the lead-management system exposed to the third-party data-enriching providers 432. Rescoring any of the already enriched sales leads includes rescoring by the scoring algorithm 422 any of the already enriched sales leads further enriched by the third-party data-enriching providers 432. Sorting the one or more dialer tables 442 includes concomitantly sorting the one or more dialer tables 442 in accordance with the scores of the sales leads by the lead-intake engine 410 while or, otherwise, at a same time as, the already enriched sales leads are further enriched by the third-party data-enriching providers 432.

Operating the lead-management system further includes providing the customized scripts with the scripter 446 of the phone system 440 to the CLRs in the call center. Each customized script includes one or more questions for each sales lead in accordance with the original data, the complementary data, or the combination thereof of the sales lead; an age of the sales lead; a campaign of the sales lead; or a combination thereof.

Operating the lead-management system further includes logging in the one or more dialer tables 442 any answers provided by the potential borrowers to the questions asked by the CLRs from the customized scripts, as well as rescoring by the scoring algorithm 422 each normalized sales lead or enriched sales lead further enriched with the answers provided by the potential borrowers. Logging in the one or more dialer tables 442 any answers provided by the potential borrowers includes automatically logging in the one or more dialer tables 442 any of the answers provided by the potential borrowers to the questions asked by the CLRs from the customized scripts. Alternatively, the CLRs can manually enter any of the answers in the one or more dialer tables 442 to log in the one or more dialer tables 442 any of the answers provided by the potential borrowers. Rescoring by the scoring algorithm 442 includes rescoring each normalized sales lead or enriched sales lead further enriched with the answers provided by the potential borrowers up to at least a time of call transfer from a CLR to an LLO by way of the phone system 440.

Operating the lead-management system further includes assigning to each LLO of a number of LLOs a unique phone number and one or more associated LLO attributes configured for attribute-based routing of phone calls by the automatic call distributor 450. Call transfers from CLRs to any available LLOs are in accordance with matches between the one or more LLO attributes and the normalized sales leads or enriched sales leads further enriched with the answers provided by the potential borrowers.

Operating the lead-management system further includes storing marketing information in the one or more enterprise marketing databases 470, requesting the marketing information from the one or more enterprise marketing databases 470 by the mortgage-originating system 460, and populating the sales-purposed record for each sales lead with the marketing information. The marketing information includes one or more points of interaction for each potential borrower having established at least one point of interaction with the lead-management system.

Operating the lead-management system further includes masking with the configurable mask or the mask-enabling viewing tool information not relevant to one or more sales strategies, information potentially detrimental to the one or more sales strategies, or a combination thereof in the sales database.

Methods of the Lead Routing with the Lead-Management System for Lending

Figure 7A:
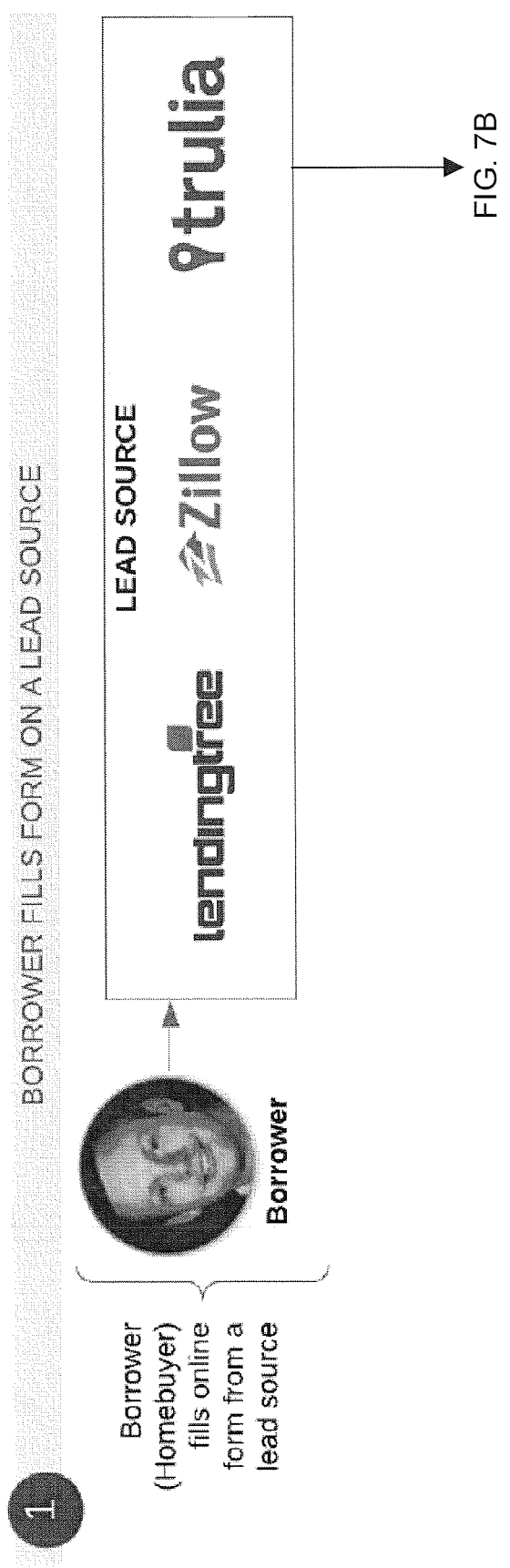
FIG. 7A illustrates a lead source generating incoming sales leads in accordance with some embodiments.
Figure 7C:
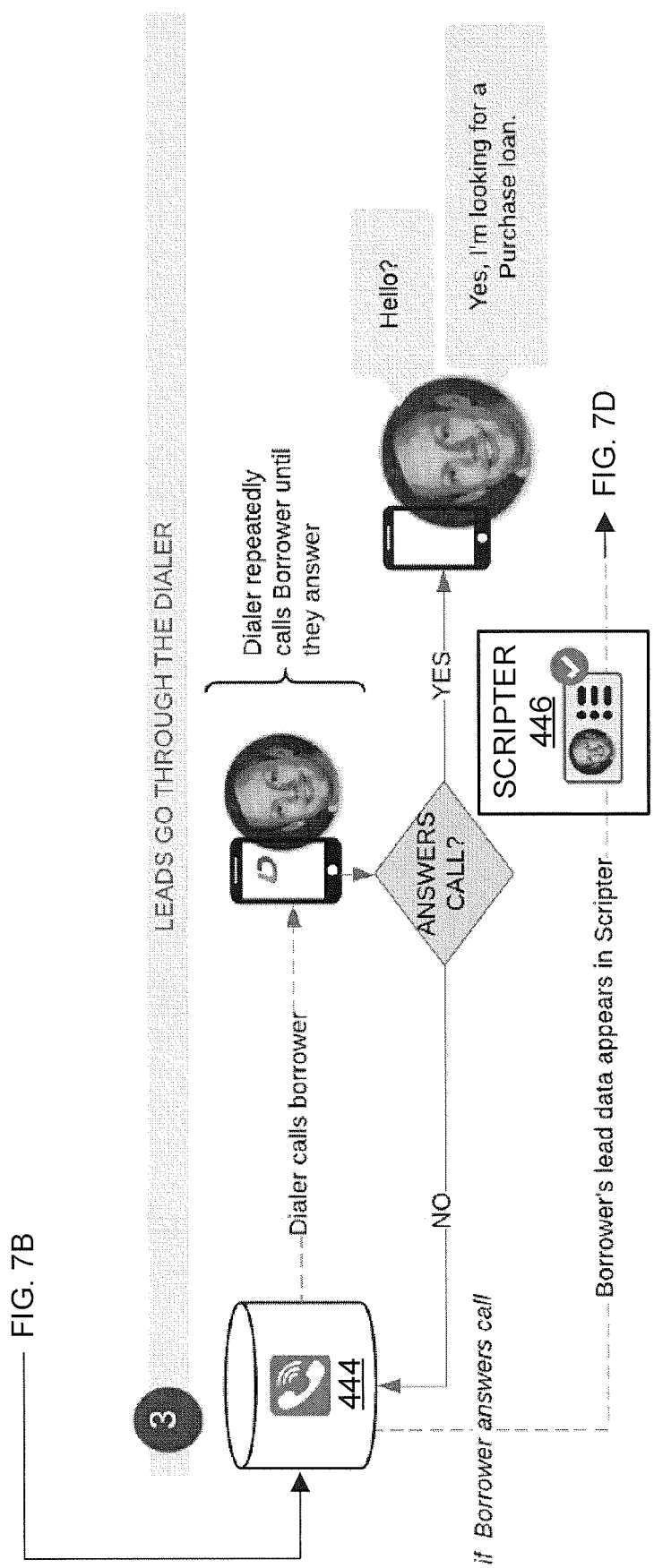
FIG. 7C illustrates a dialer dialing phone numbers in one or more dialer tables and a scripter populating scripts in accordance with some embodiments.
Figures 7C, 7D, 7E:
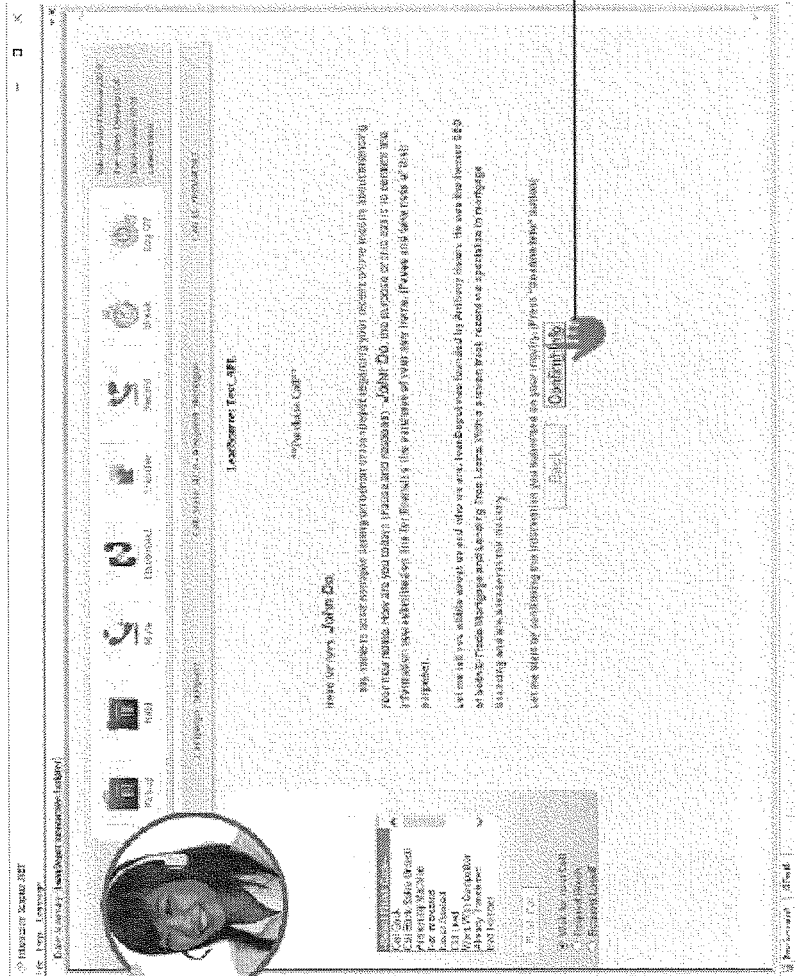
FIG. 7D illustrates a CLR using a script populated by a scripter in accordance with some embodiments.
FIG. 7E illustrates a CLR determining a real estate-buying status for a potential borrower in accordance with some embodiments.
Figure 7F:
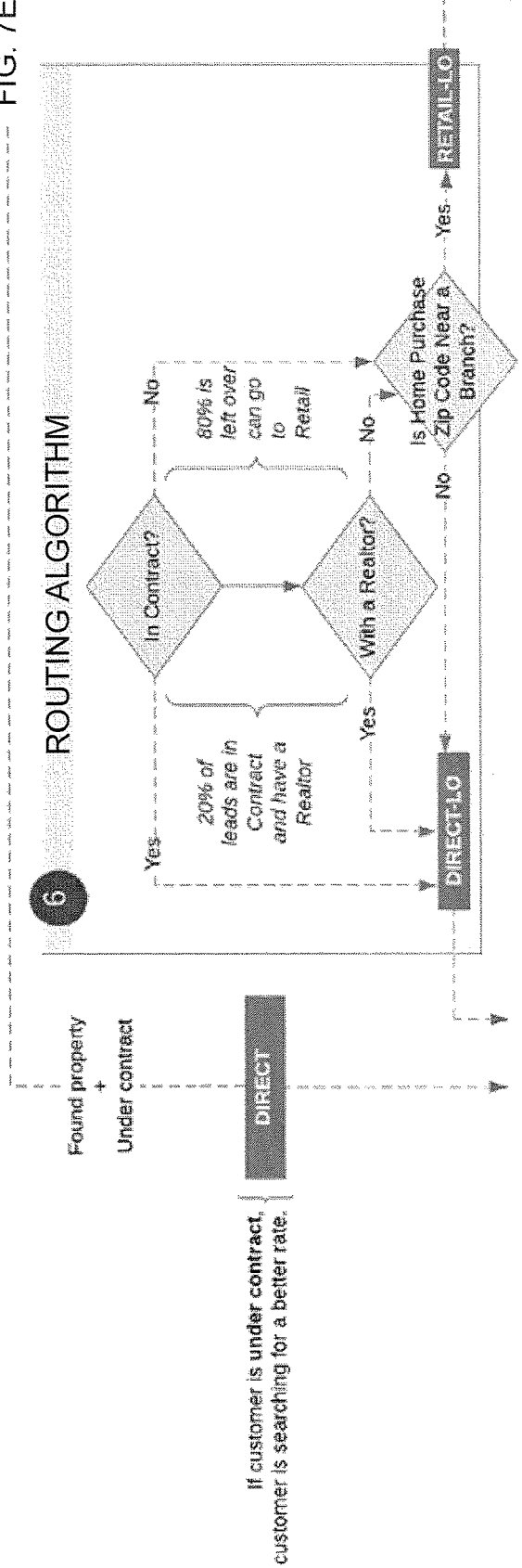
FIG. 7F illustrates routing a potential borrower to a loan officer with a routing algorithm including decisions based upon real estate-buying statuses of the potential borrower in accordance with some embodiments.
Figure 7G:
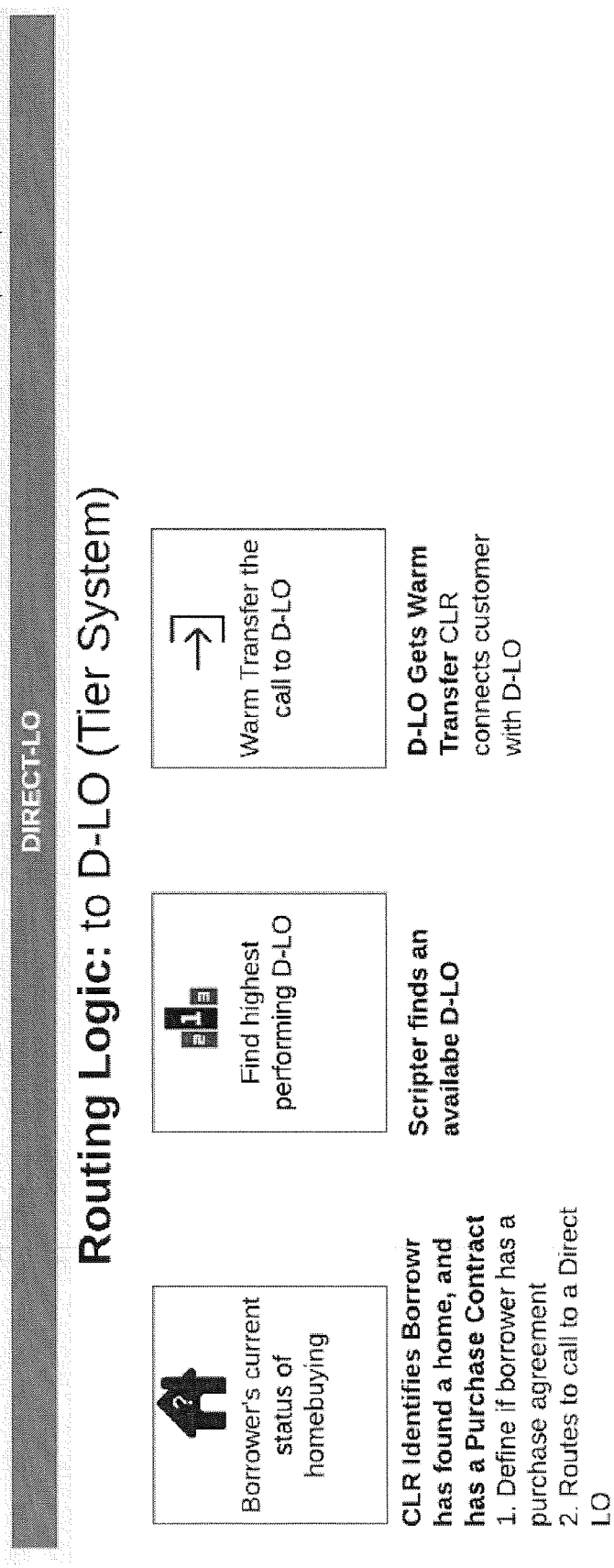
FIG. 7G illustrates routing potential a potential borrower to a direct loan officer ("DLO") with a routing algorithm including decisions based upon DLO availability in accordance with some embodiments.
Figure 7H:
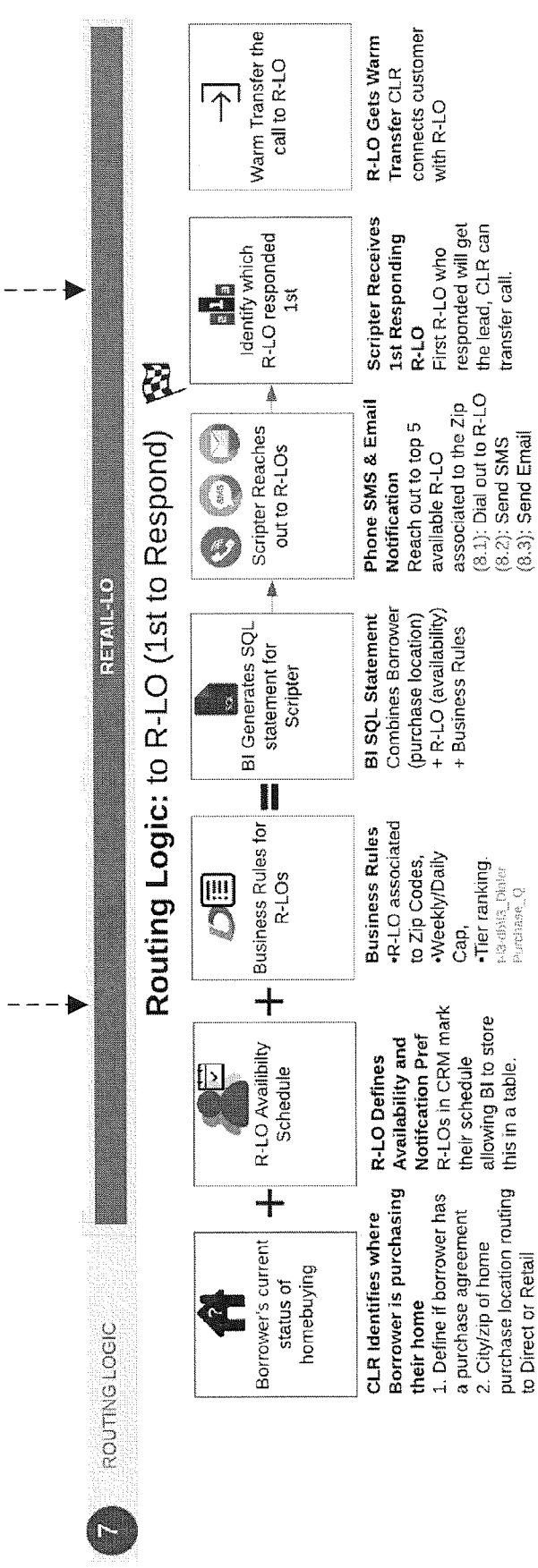
FIG. 7H illustrates routing a potential borrower to a retail loan officer ("RLO") with a routing algorithm including decisions based upon RLO availability in accordance with some embodiments.
Figure 7J:
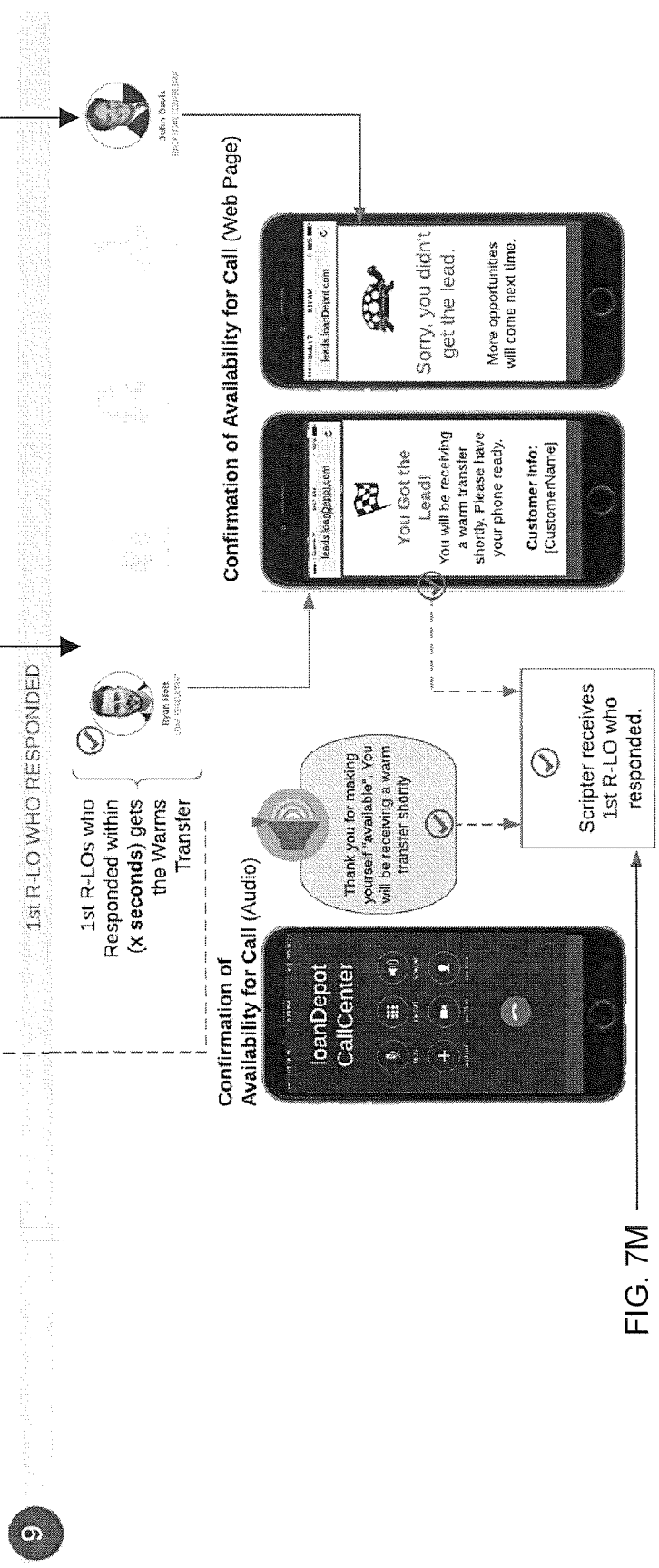
FIG. 7J illustrates available RLOs responding to notifications regarding one or more potential borrowers ready for retail sales in accordance with some embodiments.
Figure 7K:
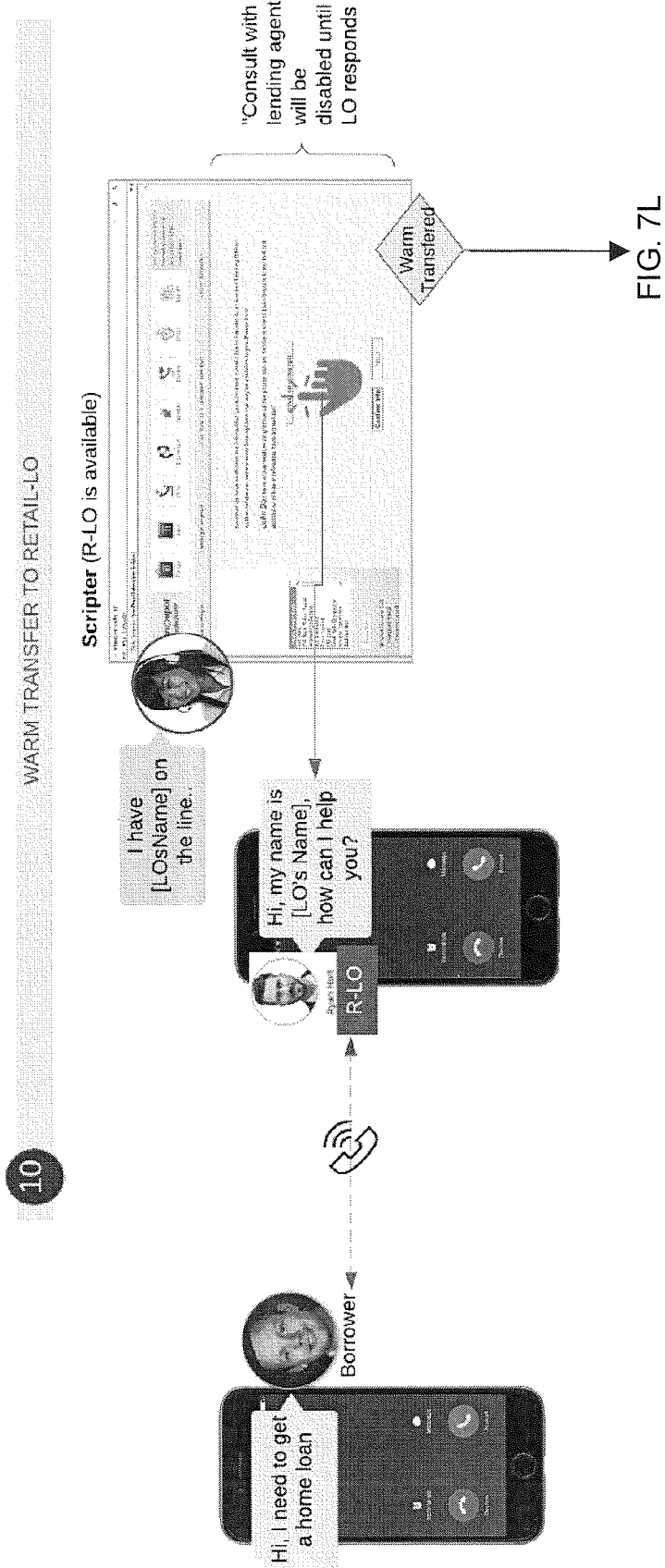
FIG. 7K illustrates a warm transfer from a CLR to an RLO in accordance with some embodiments.
Figures 7K, 7L:
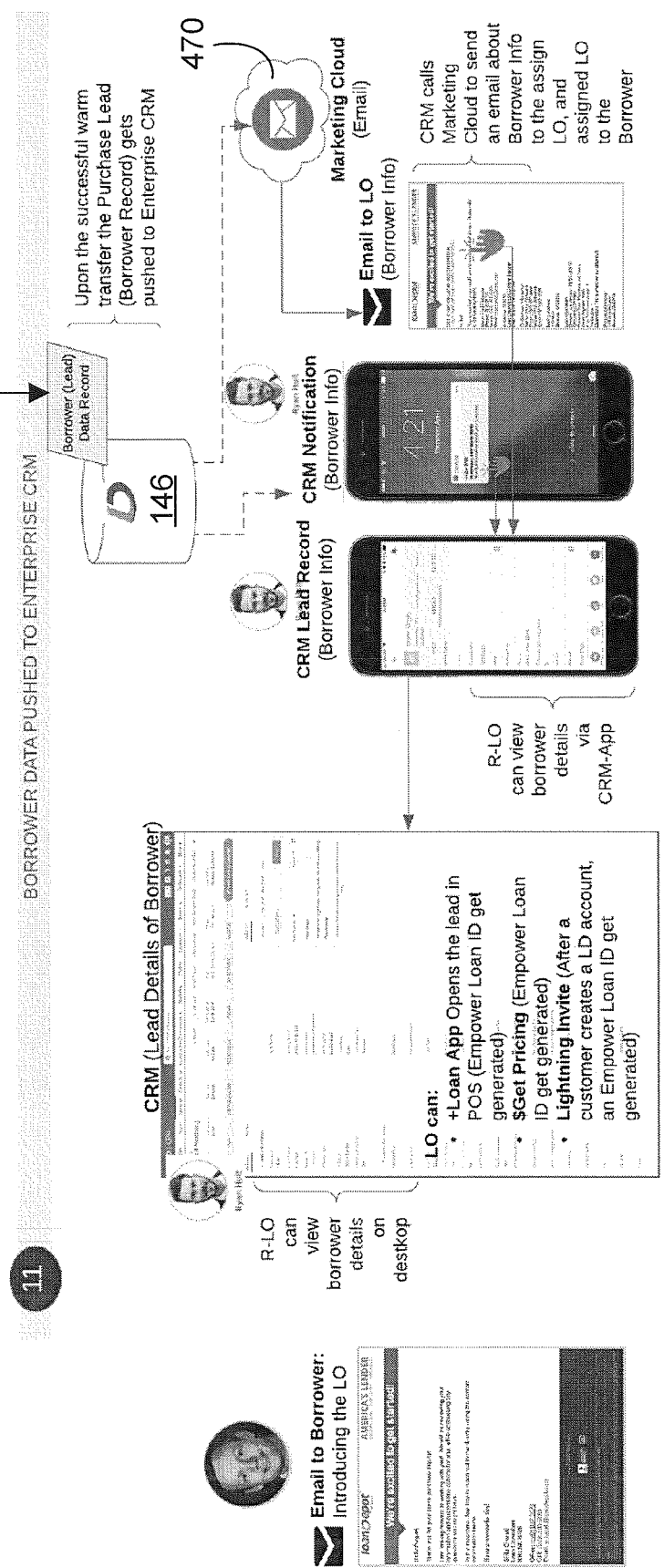
FIG. 7L illustrates pushing sales-lead data to a CRM database at a time of a warm transfer from a CLR to an RLO in accordance with some embodiments.
Figure 7M:
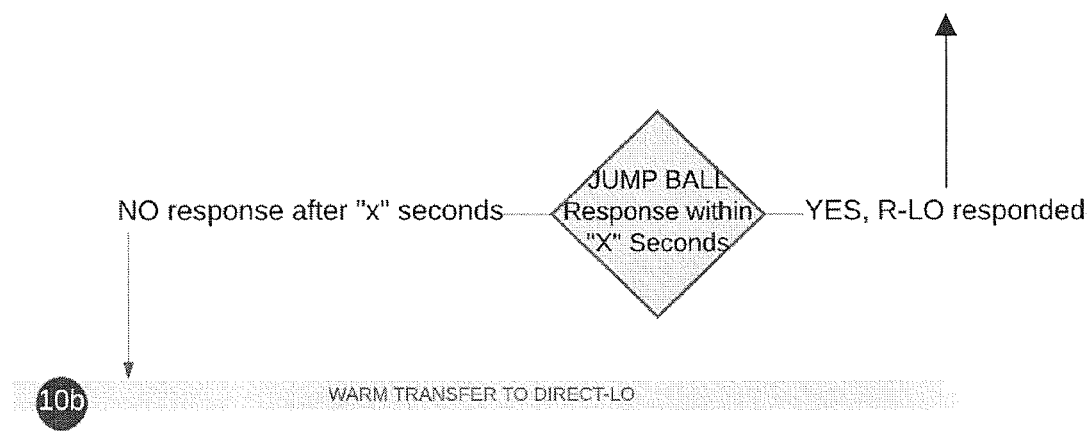
FIG. 7M illustrates populating a sales-purposed record in a sales-purposed database at a time of a warm transfer from a CLR to a DLO in accordance with some embodiments.
Figure 7M:
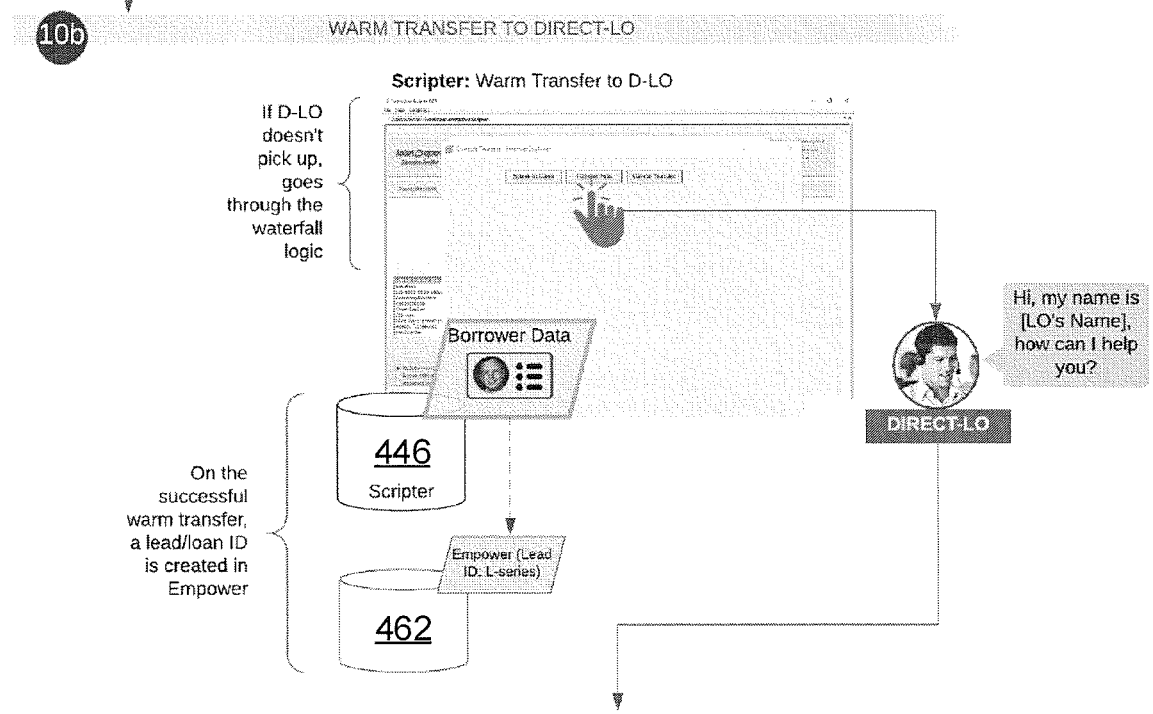
Figures 7N, 7O:
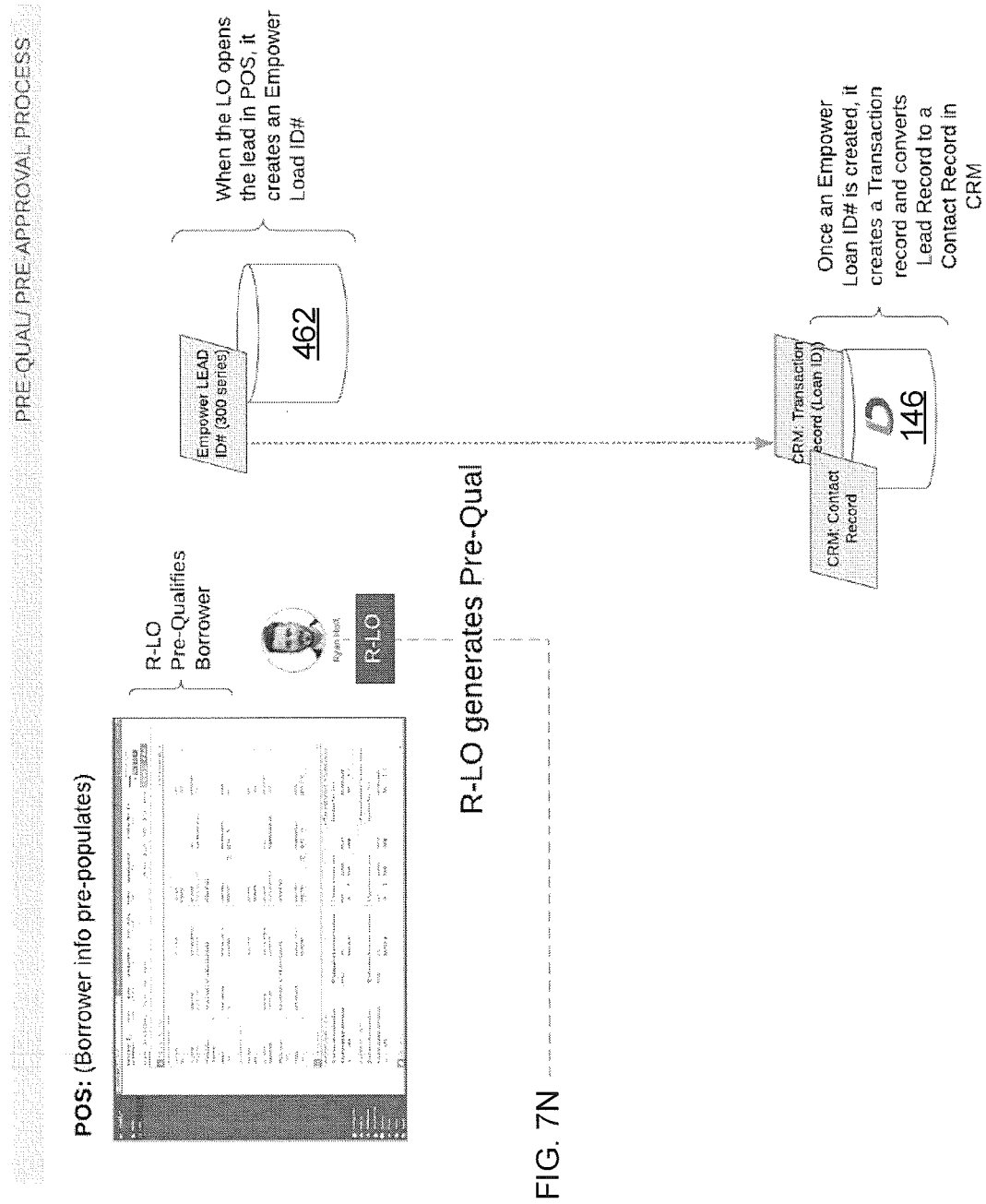
FIG. 7N illustrates generating pre-qualification letters for potential borrower in accordance with some embodiments.
FIG. 7O illustrates generating pre-qualification letters for a potential borrower in accordance with some embodiments.
Figure 7P:
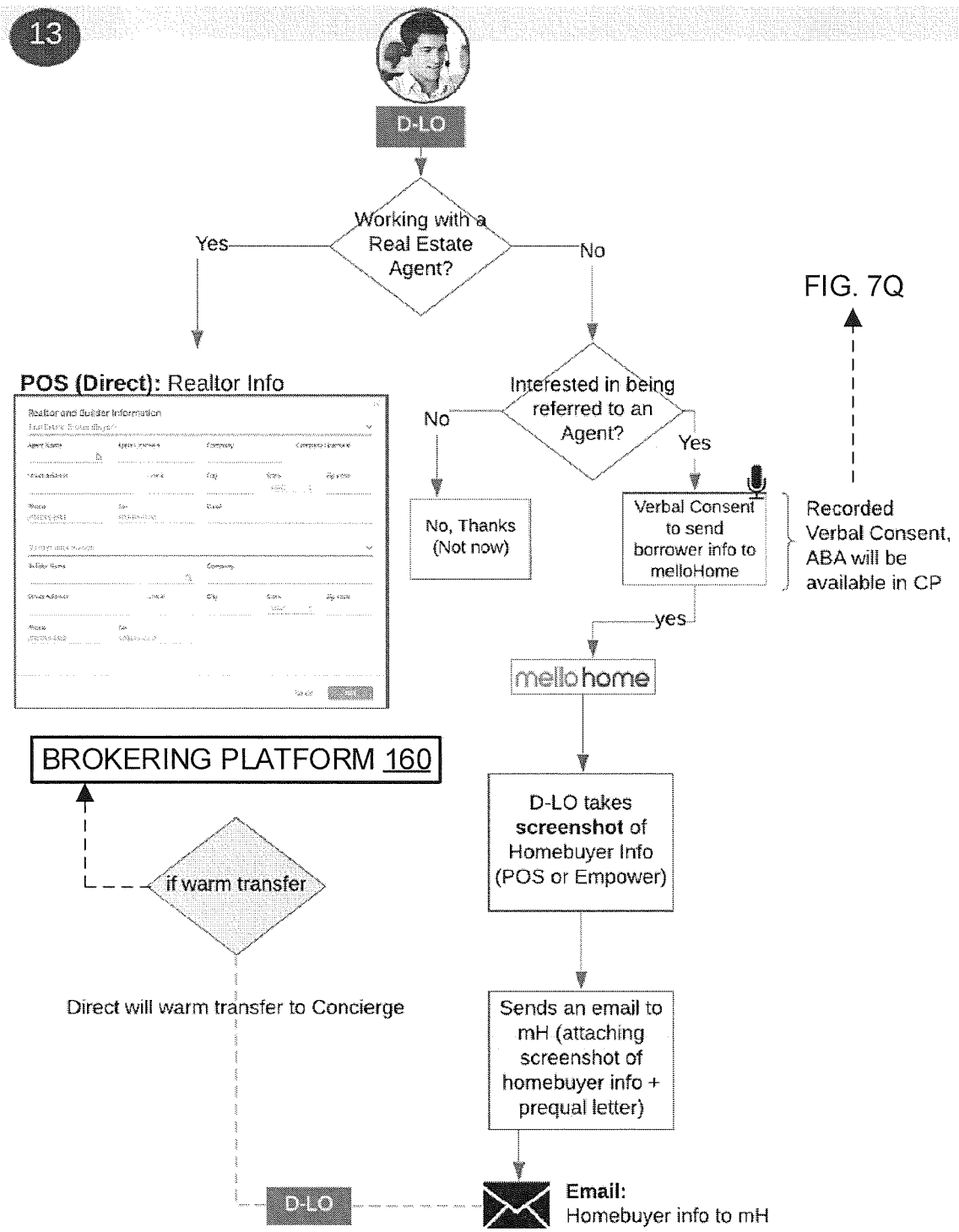
FIG. 7P illustrates transferring potential borrowers to one or more persons of brokering personnel on the brokering platform in accordance with some embodiments.
Figure 7Q:
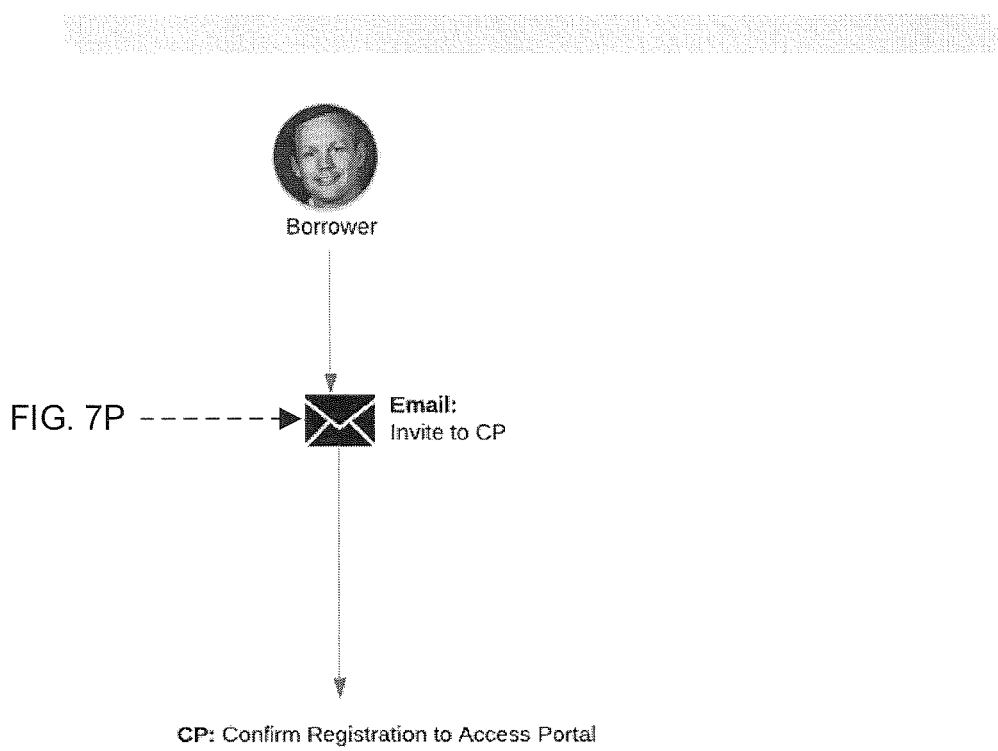
FIG. 7Q illustrates enabling consumer portal-access for one or more potential borrowers in accordance with some embodiments.
Figure 7Q:
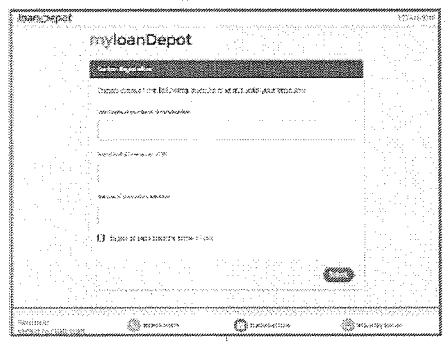
Figure 7Q:
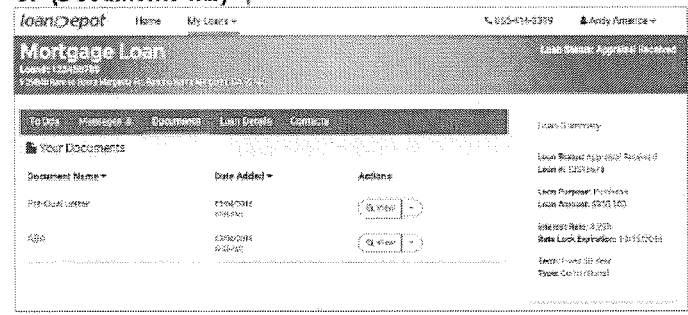
Figure 7R:
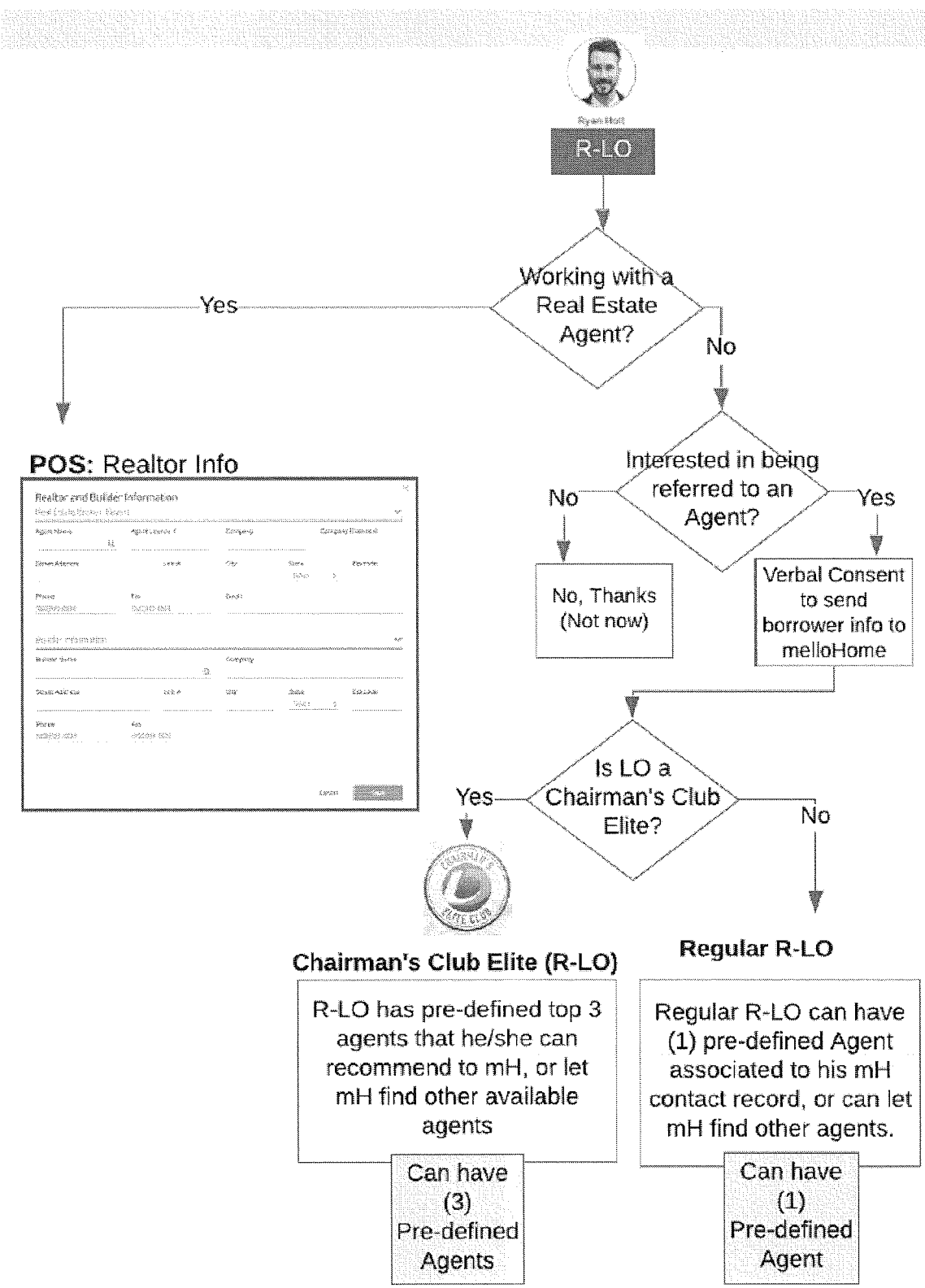
FIG. 7R illustrates part of transferring potential borrowers to one or more persons of brokering personnel on the brokering platform in accordance with some embodiments.
Figure 7S:
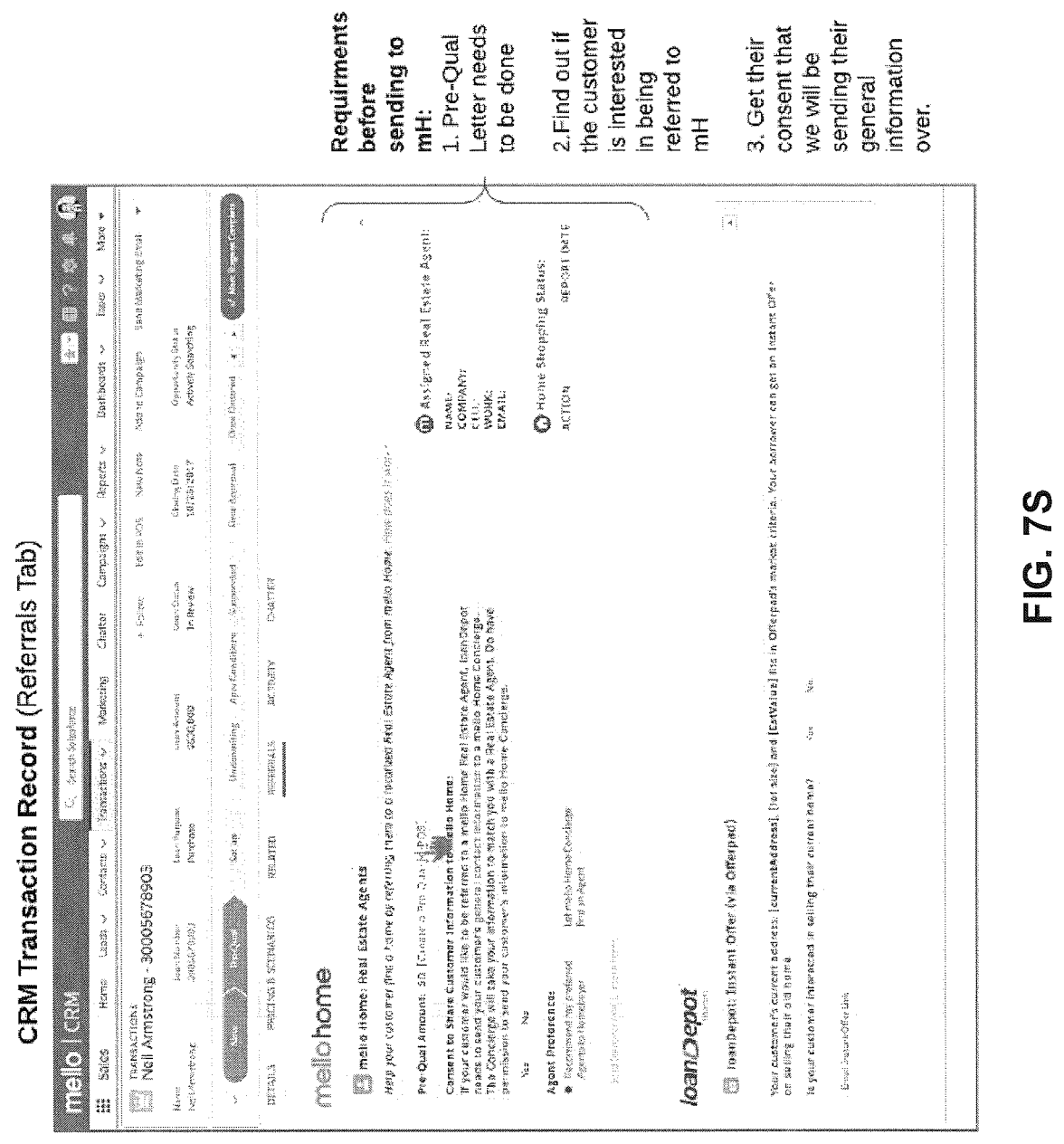
Figures 7T, 7U:
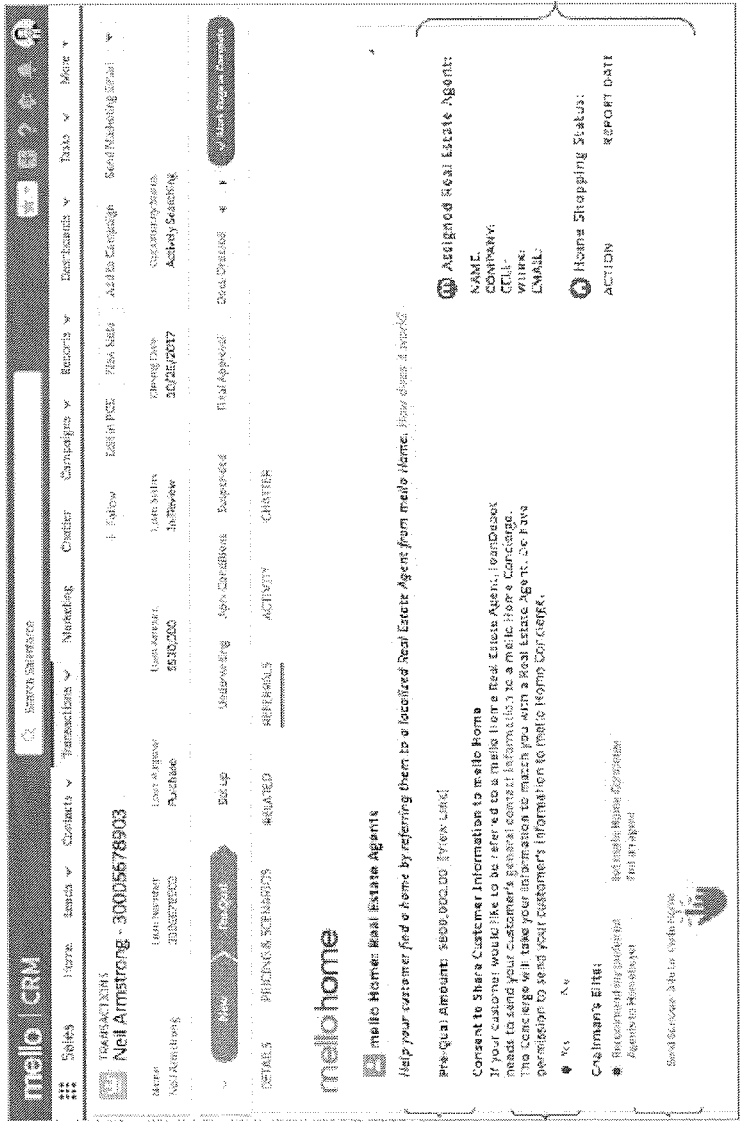
FIG. 7T illustrates a transaction record in a CRM database in a second state in accordance with some embodiments.
FIG. 7U illustrates part of transferring potential borrowers to one or more persons of brokering personnel on the brokering platform in accordance with some embodiments.

FIGS. 7A-7U illustrate one or more methods of lead routing with a lead-management system such as the lead-management system 400A, 400B, 500, or a combination thereof. While the methods are often described with reference to "a potential borrower" or "the potential borrower," "a CLR" or "the CLR," "a DLO" or "the DLO," "an RLO" or "the RLO," and the like, references to such individuals, as singular individuals, are a matter of expository expediency. It should be understood that the potential borrower refers to at least one potential borrower of a number of potential borrowers, the CLR refers to at least one CLR of a number of CLRs, the DLO refers to at least one DLO of a number of DLOs, and the RLO refers to at least one RLO of a number of RLOs in methods of lead routing with the lead-management system. That said, relationships (e.g., one-to-one, one-to-many, many-to-one, etc.) among such individuals are generally as indicated, but such relationships do not exclude other relationships among such individuals.

FIG. 7A illustrates a lead source generating incoming sales leads in accordance with some embodiments.

As shown in FIG. 7A, a borrower can fill in an online form of one or more lead sources (e.g., LendingTree, Zillow, Trulia, etc.), which generates an incoming sales lead corresponding to the borrower. A number of such borrowers can respectively fill in online forms generating a number of incoming sales leads.

FIG. 7B illustrates the lead queue 412 queueing incoming sales leads in accordance with some embodiments.

As shown in FIG. 7B, the incoming sales leads can be queued in the lead queue 412 of the lead-intake engine 410 for lead processing with the lead-processing module 420. Optionally, the incoming sales leads are aggregated by the one or more lead sources and processed to deaggregate or separate the incoming sales leads for queueing the incoming sales leads in the lead queue 412 of the lead-intake engine 410. The incoming sales leads can be cached in the lead cache 414 as a backup of the incoming sales leads in the lead queue 422. Caching the incoming sales lead prevents any loss of the incoming sales lead should an adverse condition occur including a lead-processing bottleneck or a power outage affecting the lead-management system.

FIG. 7C illustrates the dialer 444 dialing phone numbers in one or more dialer tables 442 and the scripter 446 populating scripts in accordance with some embodiments.

As shown in FIG. 7C, the dialer 444 of the phone system 440 can repeatedly dial a phone number in one or more dialer tables 442, the phone number corresponding to a potential borrower associated with a processed sales lead from the lead-processing module 420. The dialer can repeatedly dial the phone number until the potential borrower answers a phone call initiated by the dialer 444. Upon the potential borrower answering the phone call initiated by the dialer 444, the scripter 446 of the phone system 440 can populate a script with sales-lead data for the potential borrower. The script is configured for use by a CLR in determining at least a real estate-buying status of the potential borrower.

FIG. 7D illustrates a CLR using a script populated by the scripter 446 in accordance with some embodiments. FIG. 7E illustrates the CLR determining a real estate-buying status for a potential borrower in accordance with some embodiments.

As shown in FIGS. 7D and 7E, the CLR can use the script for familiarizing herself or himself with the potential borrower and determining at least the real estate-buying status of the potential borrower. In the course of determining the real estate-buying status of the potential borrower, the script directs the CLR to determine if the potential borrower is in a real-estate contract, working with a licensed real-estate professional, or both. If the potential borrower is not in a real-estate contract or already working with a licensed real-estate professional, the script further directs the CLR to determine what geographical area (e.g., zip code) the potential borrower is seeking real estate. Depending upon the real estate-buying status of the potential borrower, loan officer availability, business rules, or a combination thereof, the potential borrower can be routed to a DLO or an RLO.

FIG. 7F illustrates routing a potential borrower to a DLO or an RLO with a routing algorithm including decisions based upon the real estate-buying status of the potential borrower in accordance with some embodiments.

As shown in FIG. 7F, the routing algorithm includes decisions based upon the real estate-buying status of the potential borrower, loan officer availability, or a combination thereof. Business rules can also be a part of the routing algorithm as shown in FIG. 7H. The decisions based upon the real estate-buying status of the potential borrower include whether the potential borrower is in a real-estate contract, working with a licensed real-estate professional, or a combination thereof.

If the potential borrower is i) in a real-estate contract, ii) working with a licensed real-estate professional, or iii) not in a real-estate contract or working with a licensed real-estate professional but is seeking real estate outside a geographical area including an RLO that is local to the geographical area, then an available DLO is found, and the potential borrower can be routed to the available DLO in accordance with the routing algorithm. The scripter 446 or the ACD 450 of the phone system 440 can find the available DLO among a number of DLOs for routing the potential borrower. Routing the potential borrower to the DLO in accordance with the routing algorithm includes finding the available DLO and initiating a warm CLR-to-DLO transfer of the potential borrower to the available DLO.

If the potential borrower is i) not in a real-estate contract, ii) not working with a licensed real-estate professional, or iii) seeking real estate inside a geographical area including an RLO that is local to the geographical area, then an available RLO is found, and the potential borrower can be routed to the available RLO in accordance with the routing algorithm. The scripter 446 or the ACD 450 of the phone system 440 can find the available RLO among a number of RLOs for routing the potential borrower. Routing the potential borrower to the RLO in accordance with the routing algorithm includes finding the available RLO and initiating a warm CLR-to-RLO transfer of the potential borrower to the available RLO.

FIG. 7G illustrates routing potential a potential borrower to a DLO with a routing algorithm including decisions based upon DLO availability in accordance with some embodiments.

As shown in FIG. 7G, the CLR determines if the potential borrower is in a real-estate contract, working with a licensed real-estate professional, or both as directed by the script populated for use by the CLR with the potential borrower. If the potential borrower is in a real-estate contract or already working with a licensed real-estate professional, the phone system 440 including the scripter 446, the ACD 450, or a combination thereof can find an available DLO. Subsequently, a warm CLR-to-DLO transfer of the potential borrower to the available DLO can be initiated to connect the potential borrower to the available DLO.

FIG. 7H illustrates routing a potential borrower to an RLO with a routing algorithm including decisions based upon RLO availability in accordance with some embodiments.

As shown in FIG. 7H, the CLR determines if the potential borrower is in a real-estate contract, working with a licensed real-estate professional, or both as directed by the script populated for use by the CLR with the potential borrower. As further shown in FIG. 7H, the CLR determines if the potential borrower is seeking real estate inside a geographical area including an RLO that is local to the geographical area. If the potential borrower is not in a real-estate contract or already working with a licensed real-estate professional, and if the potential borrower is seeking real estate inside a geographical area including an RLO that is local to the geographical area, then the phone system 440 including the scripter 446, the ACD 450, or a combination thereof can find an available RLO. Business rules can also be applied such that RLOs exceeding a daily or weekly cap are ignored when finding an available RLO. Subsequently, a warm CLR-to-RLO transfer of the potential borrower to the available RLO can be initiated to connect the potential borrower to the available RLO. That said, before the warm CLR-to-RLO transfer, a number of available RLOs can be notified of the potential borrower that is ready for retail sales as shown in FIGS. 7I-7M.

FIG. 7I illustrates notifying available RLOs of a potential borrower that is ready for retail sales in accordance with some embodiments. FIG. 7J illustrates the available RLOs responding to notifications regarding the potential borrower that is ready for retail sales in accordance with some embodiments. FIG. 7K illustrates a warm transfer from a CLR to an RLO in accordance with some embodiments.

As shown in FIG. 7I, routing the potential borrower to the RLO in accordance with the routing algorithm includes notifying each available RLO up to at least five available RLOs by way of one or more notifications selected from a telephone call, an SMS-text message, and an e-mail message. Upon receiving the one or more notifications, an available RLO can choose to respond or not respond, wherein the first available RLO that responds has an opportunity sell one or more loan products 464 to the potential borrower as shown in FIG. 7J. If responding to a telephone call, the available RLO listens to the telephone call and responds by pressing a button (e.g., a physical button or on-screen button) associated with a desired response among one or more options for response provided in a spoken menu (e.g., press '1' if available for the potential borrower or press '2' if not available). Each notification of the SMS-text message and the e-mail message notifications includes a hyperlink configured to allow an available RLO to respond to the notification. If responding to an SMS-text message of an e-mail message, the available RLO reads the message and responds by selecting a hyperlink associated with a desired response among one or more options for response provided in the message. Regardless of the type of notification to which the first available RLO responds, the warm CLR-to-RLO transfer of the potential borrower can be subsequently initiated, upon which, the potential borrower is transferred from the CLR to the available RLO as shown in FIG. 7K.

As shown in FIG. 7M, if no RLO of the up to at least five available RLOs responds the one or more notifications after a number of seconds, a warm CLR-to-DLO transfer can be initiated instead of a warm CLR-to-RLO transfer.

FIG. 7L illustrates pushing sales-lead data to a CRM database 146 at a time of the warm CLR-to-RLO transfer in accordance with some embodiments.

As shown in FIG. 7L, at least some of the sales-lead data for the potential borrower can be pushed from the scripter (see FIG. 7K) to the CRM database 146 (see also FIGS. 1B and 4B) of the lending platform 110 at a time of the warm CLR-to-RLO transfer to create a CRM record for the potential borrower. In cooperation with the one or more enterprise marketing databases 470, an e-mail can be sent to the RLO including information about the potential borrower, and an e-mail can be sent to the potential borrower including information about the RLO. In addition to the e-mail sent to the RLO including information about the potential borrower, the borrower information can be made accessible to the RLO in a graphical user interface ("GUI") configured to display the borrower information in the CRM record for the potential borrower in the CRM database 146. The GUI can be configured for display on a display screen of a computer including a mobile device as shown in FIGS. 7S and 7T.

FIG. 7M illustrates populating a sales-purposed record in a sales-purposed database at a time of the warm CLR-to-DLO transfer in accordance with some embodiments.

As shown in FIG. 7M, at least some of the sales-lead data for the potential borrower can be pushed from the scripter 446 to the sales-purposed records database 462 (see FIGS. 4A and 4B) at a time of the warm CLR-to-DLO transfer to create a sales-purposed record for the potential borrower. The sales-purposed record includes a potential-borrower identification number, a loan identification number, or both, as well as at least some of the sales-lead data for the potential borrower. In addition, the borrower information can be made accessible to the DLO in a GUI configured to display the borrower information in the sales-purposed record for the potential borrower in the sales-purposed records database 462. The GUI can be configured for display on a display screen of a computer including a mobile device.

FIG. 7N illustrates generating pre-qualification letters for potential borrower in accordance with some embodiments.

As shown in FIG. 7N, at least a portion of the sales-purposed record for the potential borrower from the sales-purposed records database 462 can be made available to the DLO in a POS system. From the POS system, the DLO is able to generate a pre-qualification letter for the potential borrower. In cooperation with the one or more enterprise marketing databases 470, an e-mail can be sent from the DLO to the potential borrower including the pre-qualification letter as an attachment.

FIG. 7O illustrates generating pre-qualification letters for a potential borrower in accordance with some embodiments.

As shown in FIG. 7O, borrower information for the potential borrower such as borrower information from the scripter 446 can be made available to the RLO in the POS system. At a time of opening or viewing the borrower information in the POS system, a loan identification number for the potential borrower can be created as well as an associated sales-purposed record for the potential borrower in the sales-purposed records database 462. In addition, the borrower information can be used to populate a CRM record for the potential borrower in the CRM database 146. From the POS system, the RLO is able to generate a pre-qualification letter for the potential borrower. In cooperation with the one or more enterprise marketing databases 470, an e-mail can be sent from the RLO to the potential borrower including the pre-qualification letter as an attachment.

FIG. 7P illustrates transferring potential borrowers to one or more persons of brokering personnel on the brokering platform 160 in accordance with some embodiments.

As shown in FIG. 7P, if the potential borrower is already working with a licensed real-estate professional, information about the real-estate professional can be captured by the DLO by entry into the POS system. If the potential borrower is not already working with a licensed real-estate professional, and if the potential borrower is interested in being referred to a real-estate professional, the DLO can refer the potential borrower to a real-estate professional upon receipt of verbal consent. Then DLO can then transfer borrower information corresponding to the potential borrower including the prequalification letter to the brokering platform 1610, one or more persons of the brokering personnel on the brokering platform 160, or a combination thereof. In addition, a warm transfer of the potential borrower from the DLO to an available person (e.g., concierge) associated with the brokering platform 160 can be initiated.

FIG. 7Q illustrates enabling consumer portal-access for one or more potential borrowers in accordance with some embodiments.

As shown in FIG. 7Q, upon receipt of the verbal consent by the DLO and transfer of the borrower information for the potential borrower to at least the brokering platform 160, an e-mail can be sent to the potential borrower, optionally, in cooperation with the one or more enterprise marketing databases 470, inviting the borrower to a consumer portal. Upon registration, the potential borrower can view, for example, the pre-qualification letter previously generated and sent by e-mail.

FIG. 7R illustrates part of transferring potential borrowers to one or more persons of the brokering personnel on the brokering platform 160 in accordance with some embodiments.

As shown in FIG. 7R, if the potential borrower is already working with a licensed real-estate professional, information about the real-estate professional can be captured by the RLO by entry into the POS system. If the potential borrower is not already working with a licensed real-estate professional, and if the potential borrower is interested in being referred to a real-estate professional, the RLO can refer the potential borrower to a real-estate professional upon receipt of verbal consent.

FIG. 7S illustrates a transaction record in the CRM database 146 in a first state in accordance with some embodiments. FIG. 7T illustrates a transaction record in the CRM database 146 in a second state in accordance with some embodiments.

Again, as shown in FIGS. 7S and 7T, the borrower information can be made accessible to at least the RLO in the GUI configured to display the borrower information in the CRM record for the potential borrower in the CRM database 146. In the first state of the transaction record shown by the GUI, the pre-qualification letter for the potential borrower needs to be generated and e-mailed to the potential borrower, verbal consent is needed for referring the potential borrower to a licensed real-estate professional, and verbal consent is needed for transferring the borrower information corresponding to the potential borrower to the brokering platform 160, one or more persons of the brokering personnel on the brokering platform 160, or both. In the second state of the transaction record shown by the GUI, the pre-qualification letter for the potential borrower has been generated and e-mailed to the potential borrower, verbal consent has be acquired for referring the potential borrower to a licensed real-estate professional, and verbal consent has been acquired for transferring the borrower information corresponding to the potential borrower to the brokering platform 160, one or more persons of the brokering personnel on the brokering platform 160, or both.

FIG. 7U illustrates part of transferring potential borrowers to one or more persons of the brokering personnel on the brokering platform 160 in accordance with some embodiments.

As shown in FIG. 7U, at least some of the sales-lead data for the potential borrower can be pushed from the CRM database 146 of the lending platform 110 to a CRM database 178 of the brokering platform 160 at a time of the RLO receiving verbal consent from the potential borrower for referring the potential borrower to a licensed real-estate professional, as well as verbal consent for transferring the borrower information corresponding to the potential borrower to the brokering platform 160, one or more persons of the brokering personnel on the brokering platform 160, or both. In cooperation with the one or more enterprise marketing databases 470, an e-mail can be sent to the potential borrower indicating his or her borrower information has been transferred to the brokering platform 160, one or more persons of the brokering personnel on the brokering platform 160, or both.

Methods of the Lead Routing with the Lead-Management System for Real-Estate Referrals FIGS. 8A-8P illustrate one or more methods of lead routing with a lead-management system such as the lead-management system 400A, 400B, 500, or a combination thereof. While the methods are often described with reference to "a potential buyer" or "the potential buyer," "a concierge" or "the concierge," "a real-estate professional" or "the real-estate professional," and the like, references to such individuals, as singular individuals, are a matter of expository expediency. It should be understood that the potential buyer refers to at least one potential buyer of a number of potential buyers, the concierge refers to at least one concierge of a number of concierges, and the real-estate professional refers to at least one real-estate professional of a number of real-estate professionals in methods of lead routing with the lead-management system. That said, relationships (e.g., one-to-one, one-to-many, many-to-one, etc.) among such individuals are generally as indicated, but such relationships do not exclude other relationships among such individuals.

FIG. 8A illustrates a method of lead routing with at least the lead-management system 400B within at least the real estate-brokering system 170 of the brokering platform 160 in accordance with some embodiments.

As shown in FIG. 8A, borrower information for a potential borrower from the lending platform 110 can be supplied to the brokering platform 160 for buyer information for a potential buyer of real estate. If the borrower information is supplied on behalf of an RLO, any missing information required for the potential buyer to buy real estate can be identified during a review for subsequently capturing the missing information from the potential buyer. If the borrower information is supplied by the DLO, the borrower information can be present in one or more documents. The borrower information can be manually transferred to the brokering platform 160 from the one or more documents, and, in doing so, any missing information required for the potential buyer to buy real estate can be identified for subsequently capturing the missing information from the potential buyer.

If the potential buyer is not transferred to a concierge associated with the brokering platform 160 by way of a warm transfer from an RLO or DLO associated with the lending platform 110, the concierge can call the potential buyer using existing contact information from the borrower information if not yet processed as buyer information. The concierge can capture the missing information from the potential buyer as well as real estate-buying criteria of the potential buyer during such a call. The real estate-buying criteria can include, but is not limited to, a geographical area (e.g., zip code) in which the potential buyer is seeking real estate, a real estate-buying time frame, a target purchase price or price range, a type of real estate (e.g., land, land with one or more building, etc.), a preferred lot size, a type of home (e.g., single family home, duplex, etc.), a home style, a preferred square footage, a number of bedrooms, a number of bathrooms, or a combination thereof.

If the potential buyer is not transferred to a concierge by way of a warm transfer from an RLO or DLO, or if the concierge cannot execute a call with the potential buyer using the existing contact information, an e-mail can be sent to the potential buyer. The e-mail can include contact information for the concierge, as well as information regarding how the concierge can find a best-matching, licensed real-estate professional for the potential buyer.

As set forth in more detail below, the concierge can assign the potential buyer to an assigned real-estate professional that best matches the real estate-buying criteria of the potential buyer.

FIG. 8B illustrates receiving the borrower information for the potential borrower from the lending platform 110 by the brokering platform 160 for the buyer information for the potential buyer in accordance with some embodiments.

As shown in FIG. 8B, the concierge can receive a telephone call from a DLO (see also FIG. 7P) initiating a warm transfer of the potential borrower to the concierge, the potential borrower becoming the potential buyer in the process (i.e., the potential borrower and the potential buyer include the same entity). At a time of the warm transfer, the borrower information can be supplied by the DLO in one or more documents, the one or more documents selected from the pre-qualification letter for the potential borrower, one or more screenshots of the borrower information from the sales-purposed database 462 (see FIG. 4A or 4B), and one or more screenshots of the borrower information from the POS system. The borrower information supplied by the DLO in the one or more documents occurs at a time of the potential borrower providing consent (e.g., verbal consent) to the DLO for referring the potential borrower to one or more persons of the brokering personnel associated with the brokering platform 160. In addition, the consent includes consent for sending the borrower information, itself, to one or more persons of the brokering personnel associated with the brokering platform 160. The borrower information present in the one or more documents can be manually transferred to the brokering platform 160 from the one or more documents by the concierge while speaking with the potential buyer in the telephone call, subsequent to speaking with the potential buyer, or a combination thereof. Any missing information required for the potential buyer to buy real estate can be identified from the one or more documents supplied by the DLO and captured from the potential buyer while speaking with the potential buyer in the telephone call. For example, the real estate-buying criteria of the potential buyer can be captured by asking scripted questions in the telephone call with the potential buyer.

FIG. 8C illustrates receiving borrower information for a potential borrower from the lending platform 110 by the brokering platform 160 for the buyer information for the potential buyer in accordance with some embodiments.

As shown in FIG. 8C, the concierge can receive a telephone call from an RLO (see also FIG. 7U) initiating a warm transfer of the potential borrower to the concierge, the potential borrower becoming the potential buyer in the process. At a time of the warm transfer, the borrower information for the potential borrower can be pushed from the CRM database 146 of the lending platform 110 by a database server of the lending platform 110 to the CRM database 178 of the brokering platform 160 through a database server of the brokering platform 160 to supply the brokering platform 160 and brokering personnel (e.g., concierges) associated with the brokering platform 160 buyer information for the potential buyer of real estate. Pushing the borrower information from the lending platform 110 to the brokering platform 160 occurs at a time of the potential borrower providing consent (e.g., verbal consent) to the RLO for referring the potential borrower to one or more persons of the brokering personnel associated with the brokering platform 160. In addition, the consent includes consent for sending the borrower information, itself, to the brokering platform 160. Any missing information required for the potential buyer to buy real estate can be identified from the borrower information received by the CRM database 178 and captured from the potential buyer while speaking with the potential buyer in the telephone call. Alternatively, any missing information such as the real estate-buying criteria of the potential buyer can be captured by collecting the missing information from a digitally finable form to which the potential buyer has been given access (e.g., consumer portal).

FIG. 8C also illustrates the buyer information in a GUI configured to display the buyer information from the CRM database 178 in accordance with some embodiments. FIG. 8D also illustrates the buyer information in the GUI configured to display the buyer information from the CRM database 178 in accordance with some embodiments.

As shown in FIGS. 8C and 8D, using the buyer information from the CRM database 178, up to at least five licensed real-estate professionals can be selected for the potential buyer at least in part by matching the potential buyer with real-estate professionals in the geographical area in which the potential buyer is seeking real estate. Other real estate-buying criteria can also be used in matching the potential buyer with real-estate professionals. Matching the potential buyer with the real estate-professionals can be automatic by way of a matching algorithm of the brokering platform 160, manual by way of the concierge in view of at least some suggestions by the DLO or the RLO, or a combination thereof. After matching the potential buyer with the up-to-at-least-five licensed real-estate professionals, the real-estate professionals can be notified, and the potential buyer can be assigned to a first-responding real-estate professional.

FIG. 8E illustrates notifying licensed real-estate professionals of the potential buyer in accordance with some embodiments.

As shown in FIG. 8E, assigning the potential buyer to the assigned real-estate professional includes notifying each real-estate professional of the up-to-at-least-five licensed real-estate professionals of the potential buyer. The concierge can notify each real-estate professional of the up-to-five licensed real-estate professionals of the potential buyer by way of the GUI shown in FIGS. 8C and 8D, but notifying the real-estate professionals need not be limited to the concierge or the concierge actively notifying the real-estate professionals through the GUI.

As shown in FIG. 8E the real-estate professionals can be simultaneously notified by way of a telephone call to each of the real-estate professionals. However, the real-estate professionals can alternatively be simultaneously notified by an SMS-text message to each of the real-estate professionals sent by a web server of the brokering platform 160 through the SMS gateway 212. (See the SMS gateway 212 of FIGS. 2 and 8D. See, also, FIG. 9C.) Regardless, assigning the potential buyer to the assigned real-estate professional includes assigning to the potential buyer the first-responding real-estate professional as the assigned real-estate professional at a time the first-responding real-estate professional responds to the telephone call or the SMS-text message.

FIG. 8F illustrates initiating a warm transfer of the potential buyer from the concierge to the assigned real-estate professional in accordance with some embodiments.

As shown in FIG. 8F, in view of FIG. 8E, the concierge can initiate the warm transfer of the potential buyer to the assigned real-estate professional after i) the concierge notifies each real-estate professional of the up-to-five licensed real-estate professionals of the potential buyer and ii) the first-responding real-estate professional responds to the telephone call or the SMS-text message.

A transaction record in the CRM database 178 of the brokering platform can be generated for the potential buyer at a time the first-responding real-estate professional responds to the telephone call or the SMS-text message. Alternatively, the transaction record in the CRM database 178 of the brokering platform 160 can be generated for the potential buyer at a later time the potential buyer is actually assigned to the real-estate professional. Regardless, permissions in the CRM database 178 of the brokering platform can be set for the transaction record at the time of assigning the potential buyer to the assigned real-estate professional, thereby allowing the assigned real-estate professional to view the buyer information for the potential buyer.

FIG. 8G illustrates sending an e-mail to the potential buyer notifying the potential buyer of his or her assigned real-estate professional in accordance with some embodiments.

As shown in FIG. 8G, the e-mail can be sent to the potential buyer in cooperation with the one or more enterprise marketing databases 470. The e-mail can be sent by an e-mail server at a time of generating the transaction record in the CRM database 178, thereby notifying the potential buyer of the assigned real-estate professional as the transaction is readied for viewing by the real-estate professional. Sending the potential buyer the e-mail includes copying e-mail recipients including the assigned real-estate agent and a loan officer associated with the potential borrower.

FIG. 814 illustrates buyer the information in a number of screens of a mobile GUI configured to display the buyer information in accordance with some embodiments.

As shown in FIG. 8H, the number of screens of the mobile GUI include at least a summary screen including brief summaries of potential buyers that the real-estate professional is currently working with. Selection of any one potential buyer from the summary screen provides access to additional details for the potential buyer in one or more additional screens available from a menu. For example, the one or more additional screens include a screen including contact information for the potential buyer, a screen for the real estate-buying criteria of the potential buyer, or a screen for real estate-buying status of the potential buyer. The buyer information can be provided to the one or more screens of the mobile GUI by the CRM database 178 of the brokering platform 160. It should be understood that the mobile GUI is an alternative to, for example, the GUI of FIGS. 8C and 8D, as well as the GUI of FIG. 8I.

FIG. 8I illustrates buyer information in a GUI configured to display the buyer information and any updates to the real estate-buying status in accordance with some embodiments.

As shown in FIG. 8I, the GUI can be configured to display for brokering personnel of the brokering platform 160 the buyer information for the potential buyer from the CRM database 178 of the brokering platform 160. For example, the transaction record for the potential buyer from the CRM database 178 can be displayed for review of any updates to the real estate-buying status of the potential buyer. Updating the transaction record in the CRM database 178 of the brokering platform 160 for the potential buyer with any updates to the real estate-buying status for the potential buyer is reflected in the GUI configured to display the buyer information.

FIG. 8J illustrates pushing updates to the real estate-buying status for the potential buyer from the brokering platform 160 to the lending platform 110 in accordance with some embodiments.

As shown in FIG. 8J, the updates to the real estate-buying status, as part of the transaction record for the potential buyer, can be pushed from the CRM database 178 of the brokering platform 160 to the CRM database 146 of the lending platform 110 for access by one or more persons of lending personnel associated with the lending platform 110.

FIG. 8K illustrates the borrower information in a GUI configured to display the borrower information and any updates to the real estate-buying status in accordance with some embodiments.

As shown in FIG. 8K, the GUI can be configured to display for lending personnel of the lending platform 110 the borrower information for the potential borrower from the CRM database 146 of the lending platform 110. For example, the transaction record for the potential buyer or one or more elements of the buyer information pushed to the CRM database 146 can be displayed for review of any updates to the real estate-buying status of the potential borrower.

FIGS. 8L-8O illustrate a number of screens of a mobile GUI configured for use by real-estate professionals in accordance with some embodiments.

As shown in FIGS. 8L and 8M, the mobile GUI can be configured to display for brokering personnel of the brokering platform 160 real-estate-professional information for one or more real estate professionals. For example, the mobile GUI can be configured to display availability, biographies of the one or more real-estate professionals, and statistics of the one or more real-estate professionals (see FIG. 8N). As shown in FIGS. 8N-8O, the mobile GUI can be configured to display for brokering personnel of the brokering platform 160 the buyer information for the potential buyer from the CRM database 178 of the brokering platform 160. For example, the transaction record for the potential buyer from the CRM database 178 can be displayed for review of any updates to the real estate-buying status of the potential buyer. Updating the transaction record in the CRM database 178 of the brokering platform 160 for the potential buyer with any updates to the real estate-buying status for the potential buyer is reflected in the mobile GUI configured to display the buyer information.

FIG. 8P a screen of a mobile GUI configured for use by a potential buyer in accordance with some embodiments.

As shown in FIG. 8P, the potential buyer can rate his or her experience with the assigned agent such as in the consumer portal. The experience as rated by the potential buyer can be provided to the assigned agent by way of the mobile GUI configured to display for brokering personnel of the brokering platform 160.

Additional Description for the Lead-Management System, Operation of the Lead-Management System, and Methods Thereof FIG. 9A illustrates a first portion of a lead-management system 900A including a first process flow in accordance with some embodiments. FIG. 9B illustrates a second portion of a lead-management system 900B including a second process flow in accordance with some embodiments. FIG. 9C illustrates a third portion of a lead-management system 900C including a third process flow in accordance with some embodiments. Collectively, the first portion of the lead-management system 900A, the second portion of the lead-management system 900B, and the third portion of the lead-management system 900C, is referred to herein as the lead-management system 900. The lead management system 900 can be the same as lead management systems 400A, 400B, or 500—albeit with one or more additional features set forth below—or the lead management system 900 can be different than the foregoing lead-management systems. That said, for expository expediency, description for features shared between the lead-management system 800 and the lead management systems 400A, 400B, or 500 is not repeated below. Instead, such description is hereby incorporated by reference herein.

As shown in FIG. 9A, the lead-management system 900 can include a communication service and a communications store (e.g., database) coupled to the communication service. The lead-management system 900 can also include a partner service and a partner store (e.g., database) coupled to the partner service. As described at least in part with respect to FIGS. 8C and 8D, a number of licensed real-estate professionals can be matched to the potential buyer and up to at least five real-estate professionals can be selected for the potential buyer. Matching the potential buyer with the real estate-professionals utilizes the partner service and the partner store. Matching the potential buyer with the real estate-professionals can be automatic by way of a matching algorithm, manual by way of the concierge in view of at least some suggestions by the DLO or the RLO, or a combination thereof. After matching the potential buyer with the real-estate professionals, the up-to-at-least-five real-estate professionals can be selected and notified through the communications service using the communications store.

As shown in FIG. 9B, the lead-management system 900 can include the phone system 440 described at least in part with respect to FIGS. 4A, 4B, and 5 configured for interactive communications with the selected real-estate professionals. The phone system 440 includes the one or more dialer tables 442 and a dialer list. The lead-management system 900, or the phone system 440 thereof, can include an interactive voice response ("IVR") system configured to interact with the real-estate professionals and write to a call queue configured to queue at least one real-estate professional. As described at least in part with respect to FIG. 8E, each of the selected real-estate professionals can be simultaneously notified of a potential-buyer referral through the communications service by way of a telephone call to each of the real-estate professionals. Any of the notified real-estate professionals can claim the referral by interacting with the IVR system upon answering the telephone call; however, only the first-responding real-estate professional becomes the assigned real-estate professional upon claiming the referral through the IVR system. The IVR system is configured to put the first-responding real-estate professional claiming the referral in the call queue for a warm transfer to the potential buyer from the concierge.

As shown in FIG. 9C, the lead-management system 900 can include a push-communications API coupled to the communication service configured for push communications with the selected real-estate professionals. The lead-management system 900 can include a partner application coupled to the communication service. Like that described with respect to FIG. 9B, each of the selected real-estate professionals can be additionally or alternatively simultaneously notified of a potential-buyer referral through the communications service by way of a push communication to each of the real-estate professionals. Such a push communication includes an SMS-text message, an e-mail message, or a push notification through the partner application when enabled in the partner application installed on the real-estate professional's phone. Any of the notified real-estate professionals can claim the referral by selecting, or activating, a hyperlink to the partner application in the push communication associated with a desired response among one or more options for response provided in the push communication; however, only the first-responding real-estate professional becomes the assigned real-estate professional upon claiming the referral. The partner application is configured to put the first-responding real-estate professional claiming the referral in contact with the concierge through the communication service for a warm transfer to the potential buyer.

FIG. 10 illustrates a method 1000 for interactive communications over the phone system 440 in accordance with some embodiments.

As shown in FIG. 10, and with reference to FIGS. 9A and 9B, the method includes matching licensed real-estate professionals (e.g., real-estate agents) to a potential buyer, which can be automatic by way of a matching algorithm or manual by way of a concierge searching for the real-estate professionals in the CRM database. The method also includes the concierge selecting up to at least five real-estate professionals to compete for a referral to the potential buyer in a competition (e.g., "jump ball") to claim the referral. The method also includes the concierge initiating the competition for the referral through a call to the communication service. The method also includes the communication service creating the contact list for the dialer 444, which dials, or calls, the real-estate professionals for the competition for the referral. Any of the called real-estate professionals can claim the referral by interacting with the IVR system upon connecting to the IVR system. For example, any of the called real-estate professional can press '1' when prompted by the IVR system to claim the referral. The method also includes the IVR system writing the first-responding real-estate professional claiming the referral to the call queue for the concierge. The method also includes routing the first-responding real-estate professional claiming the referral to the concierge for the concierge to initiate a warm transfer to the potential buyer such as by way of the GUI configured to display the potential buyer information from the CRM database 178. (See FIG. 8C.) The method also includes a connection handler calling the communication service and indicating the first-responding real-estate professional claiming the referral. The method also includes the foregoing GUI displaying the first-responding real-estate professional claiming the referral.

FIG. 11 illustrates a method 1100 for push communications over the push communications system in accordance with some embodiments.

As shown in FIG. 11, and with reference to FIGS. 9A and 9C, the method includes matching licensed real-estate professionals (e.g., real-estate agents) to a potential buyer, which can be automatic by way of a matching algorithm or manual by way of a concierge searching for the real-estate professionals in the CRM database. The method also includes the concierge selecting up to at least five real-estate professionals to compete for a referral to the potential buyer in a competition (e.g., "jump ball") to claim the referral. The method also includes the concierge initiating the competition for the referral through a call to the communication service. The method also includes the communication service calling the push-communications API, which sends push communications to the real-estate professionals for the competition for the referral. Each of the push communications includes a hyperlink to the partner application installed on the real-estate professional's phone. Any of the notified real-estate professionals can claim the referral by selecting, or activating, the hyperlink, opening the partner application, and claiming the referral in the partner application, upon which the partner application calls an API of the communication service. The method also includes the communication service updating the contact list of the phone system 440 with the first-responding real-estate professional claiming the referral for the dialer to dial, or call, the concierge to initiate a warm transfer of the real-estate professional to the potential buyer. The method also includes the same GUI configured to display the potential buyer information displaying the first-responding real-estate professional claiming the referral.

With respect to automatically or manually matching licensed real-estate professionals to a potential buyer, the lead-management system 400A, 400B, 500, or 800 includes a matching logic for the real-estate professionals. All real-estate professionals and only the real-estate professionals meeting the following criteria of the matching logic are made available to the concierge for selection: 1) A matchable real-estate professional must have his or her availability toggled to "available," or the like, in the partner application. 2) The matchable real-estate professional must have a favorable status in the lead-management system 400A, 400B, 500, or 800 such as "approved" or "watched." 3) The matchable real-estate professional must have a zip code in his or her list of markets shared with lead-management system 400A, 400B, 500, or 800 that is within a certain number of miles (e.g., 30 miles) of a zip code associated with a potential real-estate transaction. The number of miles corresponds to that of a beeline between geographical centers of zip codes. When the potential real-estate transaction is a sale, the zip code associated with the property for sale is the zip code associated with the potential real-estate transaction. When the potential transaction is a purchase, the zip code associated with each of the potential purchases is the zip code associated with the potential real-estate transaction.

With respect to presenting the matched real-estate professionals to the concierge for selecting the real-estate professionals to compete for a potential-buyer referral, the lead-management system 400A, 400B, 500, or 800 presents the matched real-estate professionals to the concierge in accordance with the following: 1) A matched real-estate professional with a favorable status in the lead-management system 400A, 400B, 500, or 800 such as "approved" is presented before a matched real-estate professional with a favorable status such as "watch." 2) For matched real-estate professionals having the same favorable status, a matched real-estate professional serving a zip code closest to the potential real-estate transaction is presented before a matched real-estate professional serving a zip code farther from the potential real-estate transaction. For comparison purposes, mileage can be rounded to the nearest tenth of a mile. 3) For matched real-estate professionals the same distance from the potential real-estate transaction, a matched real-estate professional having a fewer referral opportunities for potential buyers is presented before a matched real-estate professional having more referral opportunities. 4) For matched real-estate professionals having the same number of referral opportunities, a matched real-estate professional having more languages shared with the potential buyer is presented before a matched real-estate professional having fewer languages shared with the potential buyer.

The concepts provided herein including the particular embodiments thereof represent a technological advancement in lead management, which includes, inter alia, a technological advancement in at least timely connecting borrowers with appropriate lending personnel and brokering personnel such as licensed real-estate professionals. Due to the computer-related technology in which the integrated lending-and-brokering environment including the lead management system is currently based, the lead-management system disclosed herein is also necessarily rooted in computer-related technology in order to offer timely connections for borrowers with appropriate lending personnel and brokering personnel.

While some particular embodiments have been disclosed herein, and while the particular embodiments have been disclosed in some detail, it is not the intention for the particular embodiments to limit the scope of the concepts provided herein. Additional adaptations and/or modifications can appear to those of ordinary skill in the art, and, in broader aspects, these adaptations and/or modifications are encompassed as well. Accordingly, departures may be made from the particular embodiments disclosed herein without departing from the scope of the concepts provided herein.

What is claimed is:

1. A method of lead routing with a lead-management system for receiving and managing sales leads, comprising:
   instantiating, by one or more server hosts, an application stack of the lead-management system in an integrated lending-and-brokering environment communicatively coupled with one or more databases including a records database, wherein the instantiated application stack is configured to manage a lead intake engine, a communication system, and a mortgage-originating system;
   sending borrower information for a potential borrower from a database server of a lending platform to a database server of a brokering platform to supply the brokering platform and brokering personnel associated with the brokering platform buyer information for a potential buyer of real estate,
  wherein the potential borrower and the potential buyer are the same entity, and the borrower information of the potential borrower/buyer is obtained from enriched sales leads processed by the lead intake engine, and
  enriching original data of a portion of incoming sales leads with complementary data using the lead intake engine;
  wherein the lead intake engine comprises an API that provides the original data of the incoming sales leads to a lead queue and a lead cache;
capturing real estate-buying criteria of the potential buyer including at least a geographical area in which the potential buyer is seeking real estate;
matching the potential buyer with up to five licensed real-estate professionals associated with the brokering platform using at least in part some of the real estate-buying criteria;
configuring a data mask to mask information in the records database; and
notifying each real-estate professional of the up-to-five licensed real-estate professionals of the potential buyer by way of at least a Short Message Service ("SMS")-text message sent by a web server of the brokering platform through an SMS gateway.

2. The method of claim 1,
  wherein capturing the real estate-buying criteria is effected by i) asking scripted questions in a telephone call with the potential buyer or ii) collecting the real estate-buying criteria from a digitally fillable form to which the potential buyer has been given access, and
  wherein the real estate-buying criteria of the potential buyer further includes a real estate-buying time frame, a target purchase price or price range, a type of real estate, a preferred lot size, a type of home, a home style, a preferred square footage, a number of bedrooms, a number of bathrooms, or a combination thereof.

3. The method of claim 1,
  wherein matching the potential buyer with the up-to-five licensed real-estate professionals is effected at least in part by matching at least the geographical area in which the potential buyer is seeking real estate with that of the up-to-five licensed real-estate professionals.

4. The method of claim 1,
  wherein sending the borrower information from the database server of the lending platform to the database server of the brokering platform to supply the brokering platform the buyer information further includes pushing the borrower information from a customer relationship-management ("CRM") database of the lending platform to a CRM database of the brokering platform at a time of the potential borrower providing consent for i) referring the potential borrower to one or more persons of the brokering personnel associated with the brokering platform and ii) sending the borrower information to the brokering platform.

5. The method of claim 4, further comprising:
generating a transaction record in the CRM database of the brokering platform for the potential buyer at a time a first-responding real-estate professional responds to the SMS-text message; and
assigning to the potential buyer an assigned real-estate professional corresponding to the first-responding real-estate professional at the time the first-responding real-estate professional responds to the SMS-text message.

6. The method of claim 5, further comprising:
setting permissions in the CRM database of the brokering platform for the transaction record, thereby allowing the assigned real-estate professional to view the buyer information for the potential buyer.

7. The method of claim 5, further comprising:
sending the potential buyer an e-mail by way of an e-mail server at a time of generating the transaction record in the CRM database, thereby notifying the potential buyer of the assigned real-estate professional.

8. The method of claim 7,
  wherein sending the potential buyer the e-mail includes copying e-mail recipients including the assigned real-estate agent and a loan officer associated with the potential borrower.

9. The method of claim 5, further comprising:
initiating a warm transfer of the potential buyer from a concierge of the brokering personnel to the assigned real-estate professional,
  wherein the concierge initiates the warm transfer of the potential buyer to the assigned real-estate professional after the concierge notifies each real-estate professional of the up-to-five licensed real-estate professionals of the potential buyer.

10. The method of claim 5, further comprising:
updating the transaction record in the CRM database of the brokering platform for the potential buyer with any updates to real estate-buying status for the potential buyer; and
pushing any of the updates to the real-estate-buying status for the potential buyer to the CRM database of the lending platform for access by one or more persons of lending personnel associated with the lending platform.

11. A method of lead routing with a lead-management system, comprising:
instantiating, by one or more server hosts, an application stack of the lead-management system in an integrated lending-and-brokering environment, wherein the instantiated application stack is configured to manage a lead intake engine, a communication system, and a mortgage-originating system communicatively coupled with a records database;
pushing borrower information for a potential borrower from a customer relationship-management ("CRM") database of the lending platform by a database server of a lending platform to a CRM database of the brokering platform through a database server of a brokering platform to supply the brokering platform and brokering personnel associated with the brokering platform buyer information for a potential buyer of real estate,
  wherein the potential borrower and the potential buyer are the same entity, and the borrower information of the potential borrower/buyer is obtained from enriched sales leads processed by the lead intake engine, and
  enriching original data of a portion of incoming sales leads with complementary data;
  wherein the lead intake engine comprises an API that provides the original data of the incoming sales leads to a lead queue and a lead cache;
assigning the potential buyer to an assigned real-estate professional selected from up to five licensed real-estate professionals associated with the brokering platform using at least in part some real estate-buying criteria of the potential buyer;
generating a transaction record in the CRM database of the brokering platform for the potential buyer at a time of matching the potential buyer with the assigned real-estate professional;
updating the transaction record in the CRM database of the brokering platform for the potential buyer with any updates to real estate-buying status for the potential buyer;
providing a configurable data mask to mask information in the records database; and
pushing any of the updates to the real-estate-buying status for the potential buyer to the CRM database of the lending platform for access by one or more persons of lending personnel associated with the lending platform.

12. The method of claim 11,
wherein assigning the potential buyer to the assigned real-estate professional includes i) notifying each real-estate professional of the up-to-five licensed real-estate professionals of the potential buyer by way of at least a Short Message Service ("SMS")-text message sent by a web server of the brokering platform through an SMS gateway and ii) assigning to the potential buyer a first-responding real-estate professional as the assigned real-estate professional at a time the first-responding real-estate professional responds to the SMS-text message.

13. The method of claim 12,
wherein the transaction record in the CRM database of the brokering platform is generated for the potential buyer at the time the first-responding real-estate professional responds to the SMS-text message.

14. The method of claim 11, further comprising:
setting permissions in the CRM database of the brokering platform for the transaction record at a time of assigning the potential buyer to the assigned real-estate professional, thereby allowing the assigned real-estate professional to view the buyer information for the potential buyer.

15. The method of claim 11, further comprising:
sending the potential buyer an e-mail by way of an e-mail server at a time of generating the transaction record in the CRM database, thereby notifying the potential buyer of the assigned real-estate professional.

16. The method of claim 15,
wherein sending the potential buyer the e-mail includes copying e-mail recipients including the assigned real-estate agent and a loan officer associated with the potential borrower.

17. The method of claim 11, further comprising:
capturing the real estate-buying criteria of the potential buyer, the real estate-buying criteria including a geographical area in which the potential buyer is seeking real estate, a real estate-buying time frame, a target purchase price or price range, a type of real estate, a preferred lot size, a type of home, a home style, a preferred square footage, a number of bedrooms, a number of bathrooms, or a combination thereof, and
wherein matching the potential buyer with the up-to-five licensed real-estate professionals is effected at least in part by matching at least the geographical area in which the potential buyer is seeking real estate with that of the up-to-five licensed real-estate professionals.

18. The method of claim 17,
wherein the real estate-buying criteria of the potential buyer is captured by i) asking scripted questions in a telephone call with the potential buyer, ii) collecting the real estate-buying criteria from a digitally fillable form to which the potential buyer has been given access, or a combination thereof.

19. The method of claim 11,
wherein pushing the borrower information from the lending platform to the brokering platform occurs at a time of the potential borrower providing consent for i) referring the potential borrower to one or more persons of the brokering personnel associated with the brokering platform and ii) sending the borrower information to the brokering platform.

20. The method of claim 11, further comprising:
initiating a warm transfer of the potential buyer from a concierge of the brokering personnel to the assigned real-estate professional,
wherein the concierge initiates the warm transfer of the potential buyer to the assigned real-estate professional after the concierge notifies each real-estate professional of the up-to-five licensed real-estate professionals of the potential buyer.

\* \* \* \* \*